United States Patent [19]

Farrell et al.

[11] 4,136,390
[45] Jan. 23, 1979

[54] GRINDING CONTROL SYSTEM FOR FORMING NON-CIRCULAR PUNCHING TOOLS

[75] Inventors: John H. Farrell, Buffalo; Eugene G. Lawrie, North Tonawanda; Zeev Sagi, Buffalo, all of N.Y.

[73] Assignee: Houdaille Industries, Inc., Buffalo, N.Y.

[21] Appl. No.: 743,059

[22] Filed: Nov. 18, 1976

[51] Int. Cl.² .................... B24B 19/08; G06F 15/46
[52] U.S. Cl. ...................... 364/474; 51/97 NC; 51/165.71; 364/107; 364/118
[58] Field of Search .................. 235/151.11, 151.1; 51/97 NC, 165.71, DIG. 32; 364/474, 475, 107, 118

[56] References Cited
U.S. PATENT DOCUMENTS

| | | | |
|---|---|---|---|
| 3,616,578 | 11/1971 | Clark, Jr. | 51/326 |
| 3,633,011 | 1/1972 | Bederman et al. | 235/151.11 |
| 3,797,173 | 3/1974 | Pettee et al. | 51/3 |
| 3,812,474 | 5/1974 | Linn et al. | 235/151.11 X |
| 3,970,830 | 7/1976 | White et al. | 51/165.71 X |
| 4,025,764 | 5/1977 | Tack | 51/165.71 |

*Primary Examiner*—Felix D. Gruber
*Attorney, Agent, or Firm*—Hill, Gross, Simpson, Van Santen, Steadman, Chiara & Simpson

[57] ABSTRACT

Grinding apparatus and control system for forming non-circular punching tools comprising a grinding wheel having a cylindrical grinding surface, a rotary table with its axis parallel to the grinding wheel axis and carrying orthogonally movable slides such that one slide at a time may be actuated to generate successive flat sides of a punching tool, the table axis being positionable to define a center of rotation for an arcuate face of the punching tool which is generated upon rotation of the table, a fixture for the grinding wheel dressing tool serving to automatically define the location of the grinding wheel surface relative to the axis of the rotary table, and a computer-controlled digital system which senses the shape to be formed, parameters of the shape to be formed and which causes the slides or rotary table to be properly actuated so as to grind a punching tool of appropriate size and shape.

16 Claims, 13 Drawing Figures

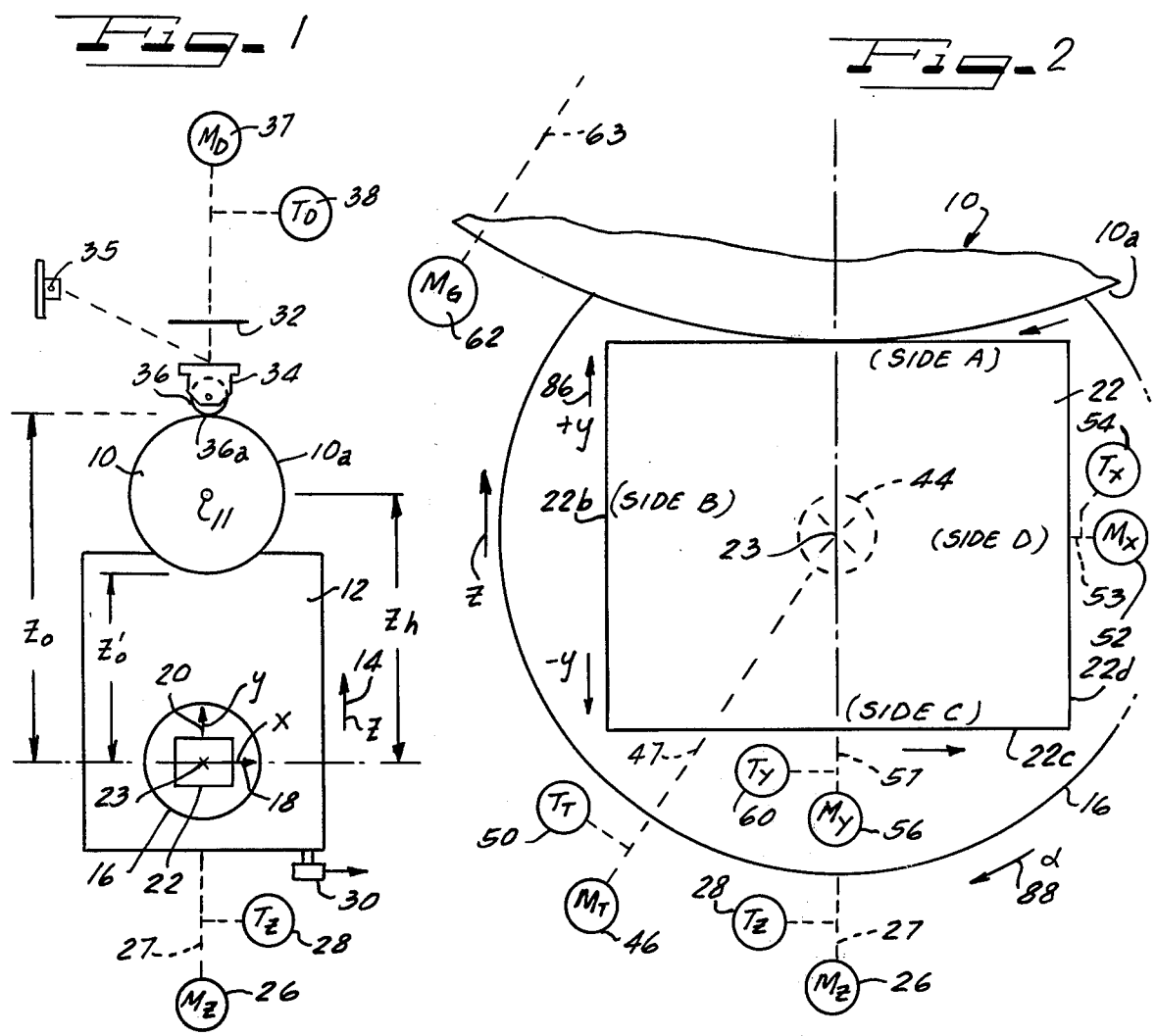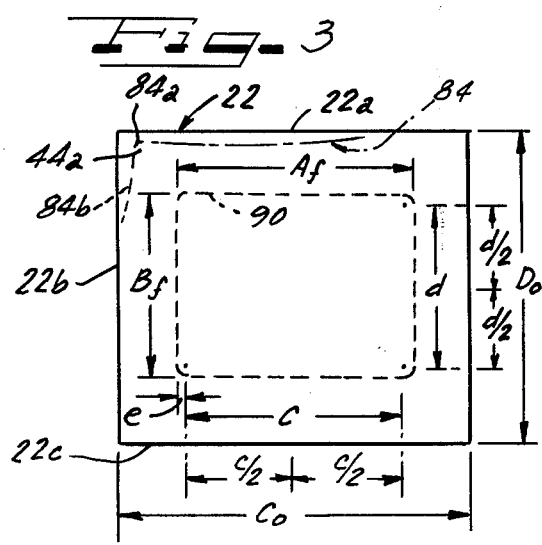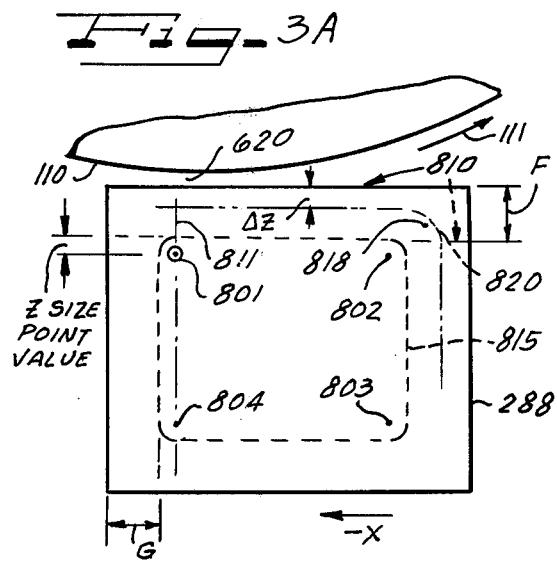

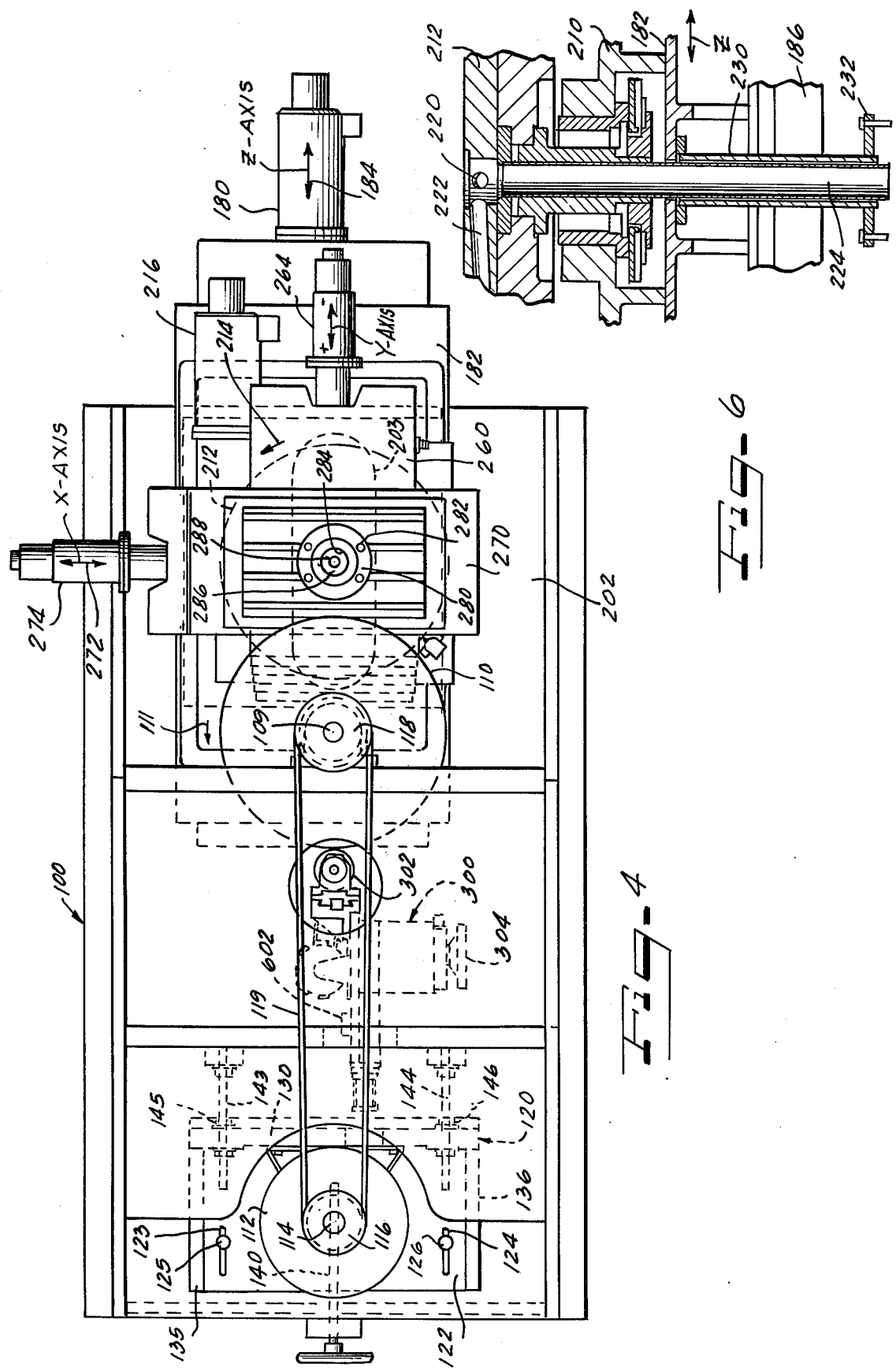

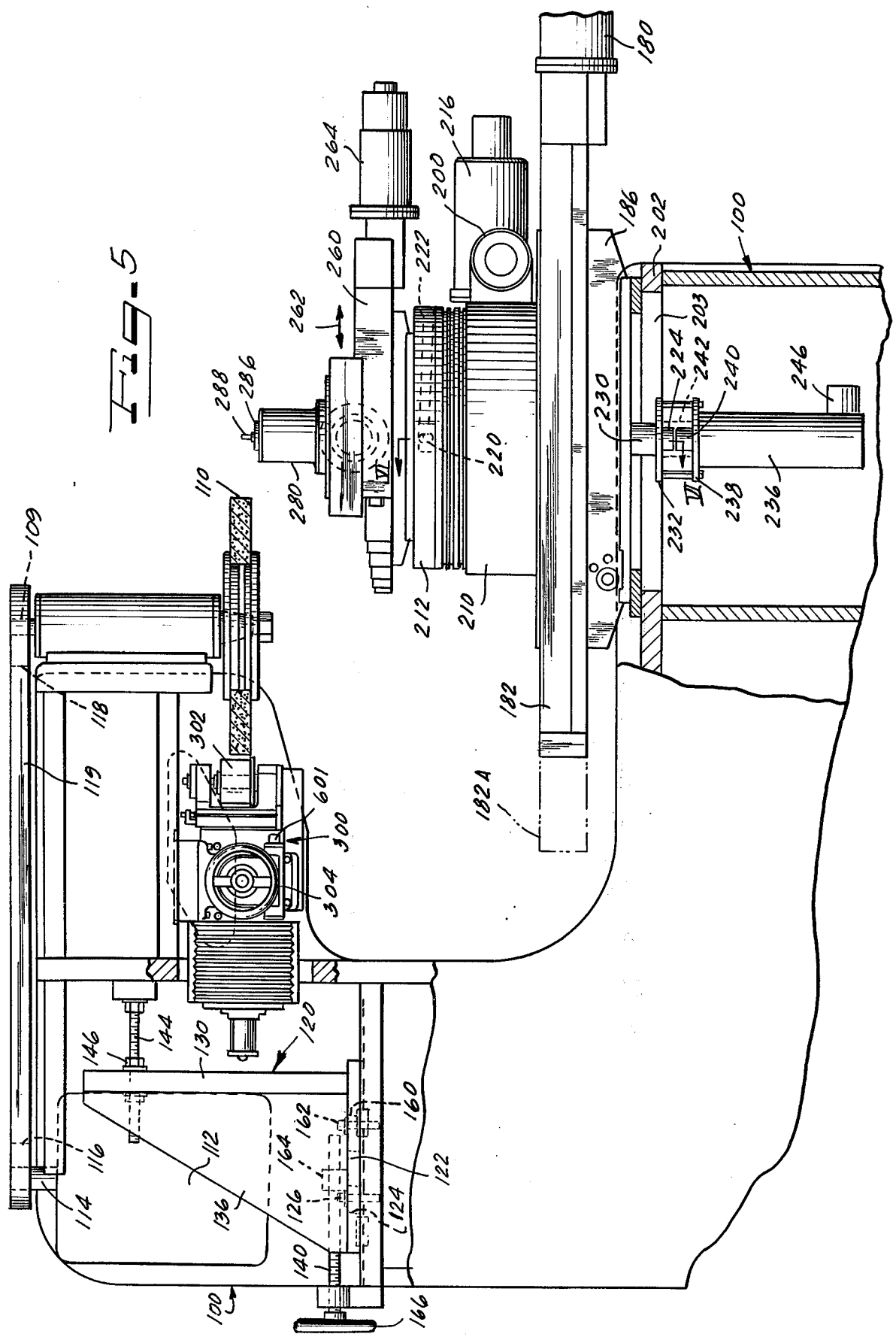

GRINDING CONTROL SYSTEM FOR FORMING NON-CIRCULAR PUNCHING TOOLS

CROSS REFERENCE TO RELATED APPLICATION

Cross-reference is hereby made to related copending application, Ser. No. 707,947, filed July 23, 1976, which has been allowed as U.S. Pat. No. 4,084,349 and which is entitled "Shape Grinder and Method".

SUMMARY OF THE INVENTION

This invention relates to a machine tool apparatus control system and method, and particularly to a grinding machine for the production of non-circular punching tools such as have heretobefore been produced by means of specially manufactured control cams.

It is an important object of the present invention to provide a simplified and highly adaptable machine tool apparatus and method for forming non-circular punching tools and the like.

Another object of the invention is to provide a grinding apparatus and method for forming non-circular punching tools which is adapted for digital control and which is operable by means of a sequential activation of individual axes of movement for improved accuracy and ease of programming.

Another object of the invention is to provide a grinding apparatus and method for forming non-circular punching tools which is suited for producing a given high volume part of particular dimensions.

A further important object of the invention is to provide a grinding apparatus and method which greatly facilitates the setup of the tool blank at a predetermined distance from the grinding wheel face.

It is a feature of the invention to provide a work forming system and method wherein a radially symmetrical rotary cutter acts on the work piece at the same side of the cutter periphery throughout the formation of a workpiece into a desired non-circular configuration.

Another feature of the invention resides in the provision of a grinding system and method wherein the grinding wheel axis is stationary during forming of generally obround, square and rectangular shapes, the workpiece being moved substantially continuously in a path such that the perimeter of the workpiece maintains a substantially continuous pressure engagement at a given point about the periphery of the grinding wheel as successive cuts are made in a given direction about the perimeter of the workpiece.

Another feature of the invention resides in the ease with which an operator may specify the shape and size of the desired non-circular punch.

Other objects, features and advantages of the present invention will be apparent from the following detailed description, given by way of preferred example and not by way of limitation.

BRIEF DESCRIPTION OF THE DRAWINGS

FIG. 1 is a diagrammatic plan view of a grinding apparatus in accordance with the present invention and illustrating the condition of the apparatus during initiation of a grinding wheel dressing operation for a new grinding wheel;

FIG. 2 is an enlarged diagrammatic view showing the apparatus of FIG. 1 in position to begin a grinding operation;

FIG. 3 is a diagrammatic plan view indicating the initial cross-sectional configuration of a tool blank, and indicating an exemplary desired final configuration to be formed from the blank;

FIG. 3A is a view similar to that of FIG. 3 but illustrating the actual operation of the system of FIGS. 4-12;

FIG. 4 is a diagrammatic plan view of an actual embodiment of the present invention;

FIG. 5 (on sheet three of the drawings) is a somewhat diagrammatic partial longitudinal sectional view of the apparatus of FIG. 4, and illustrating various of the parts in side elevation;

FIG. 6 (on sheet three of the drawings) is a somewhat diagrammatic partial enlarged longitudinal sectional view taken in a plane through the axis of rotation of the rotary table of the apparatus of FIG. 4;

DETAILED DESCRIPTION OF THE PREFERRED EMBODIMENT

Figure 7:
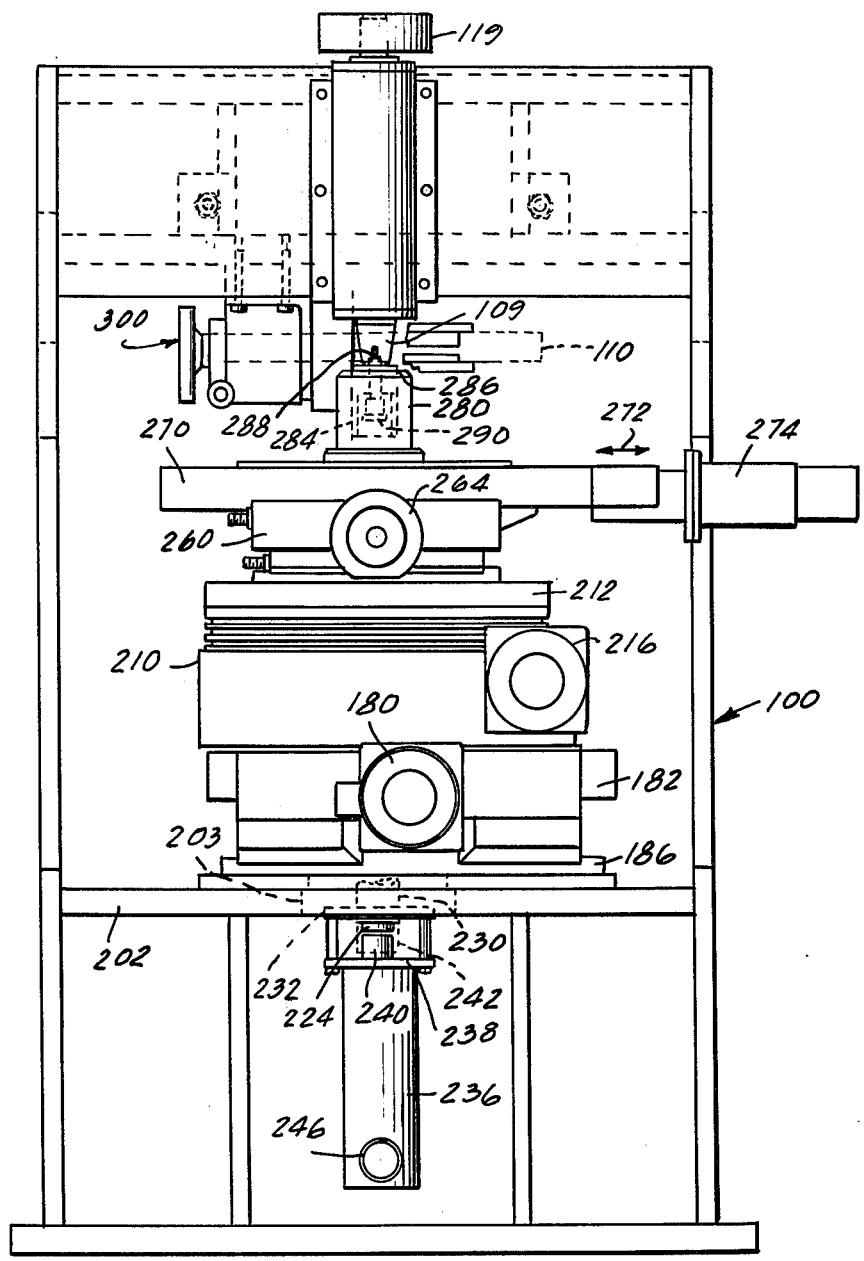
FIG. 7 is a somewhat diagrammatic end elevational view of the apparatus of FIG. 4 as viewed from the right hand side of FIG. 4.

Referring to FIG. 1, there is illustrated a grinding wheel 10 having a cylindrical peripheral surface 10a and rotatable on a central axis indicated at 11. Associated with the grinding wheel is a slide 12 reciprocally movable along a Z axis such as indicated by arrow 14 toward and away from the grind wheel 10. The slide 12 carries a rotary table 16 rotatable on a central axis and carrying slides movable along X and Y axes as indicated by arrows 18 and 20. A tool blank is indicated at 22 having a central tool axis 23 coincident with the axis of rotation of table 16. By way of example, tool blank 22 may be fixed to the X slide, and the X slide be carried by a Y slide which in turn is mounted on the rotary table 16. A drive for the slide 12 is diagrammatically indicated at 26 having a mechanical coupling as indicated at 27 with the slide 12, and the coupling 27 being shown as also driving a position transducer device such as a rotary encoder 28. A limit switch is indicated at 30 for actuation when the slide 12 reaches a zero position.

For the sake of a diagrammatic illustration, reference numeral 32 indicates a mechanical gage and reference numeral 34 indicates a portion of a slide assembly for mounting a rotary diamond roll dresser 36. The slide assembly 34 may be moved from engagement with gage 32 to an initial position at a predetermined distance from gauge 32 by means of a handwheel 35. For example, the handwheel 35 may have an associated dial calibrated in thousandths of an inch between zero and one hundred (100 mils), and may be set to a predetermined number in preparation for an automatic new wheel dressing cycle so as to bring the face 36a of the rotary diamond roll dresser 36 to an accurate distance from the gauge 32. At that time, the distance between point 23 which is coincident with the center of rotation of table 16 and the central axis of the tool blank 22, and face 36a of the dresser will be known. The dresser 36 can then be automatically fed by means of drive 37 to a position for dressing wheel 10 to a desired initial diameter, transducer 38 or the equivalent keeping track of the dresser position.

With the arrangement of FIG. 1, after dressing of the surface 10a of grinding wheel 10, the dressed grinding wheel surface will be precisely a distance $Z_0$ from point 23. If a Z axis counter (not shown) is set to zero at the completion of a dressing operation, then a program written on the basis of an initial distance of $Z_0$ between point 23 and the surface of grinding wheel 10 will be immediately operative. Otherwise a suitable grinding wheel offset value can be introduced into the initial position of the Z slide 12.

Referring to FIG. 2, rotary table 16 is diagrammatically indicated as having a central shaft 44 which is rotatably driven by means of a table drive 46 via a mechanical coupling indicated at 47. A position transducer such as a digital encoder is indicated at 50 and is shown as being mechanically coupled with the coupling 47. A drive for the X slide is indicated at 52 and includes a mechanical coupling 53 to the X slide and to a position transducer such as a digital encoder 54. A drive for the Y slide is indicated at 56 and is indicated as having a mechanical coupling 57 which is also in driving relation to a position transducer such as a digital encoder 60.

As indicated in FIG. 2, grinding wheel 10 may be provided with an adjustable speed drive 62 having a mechanical coupling 63 with the central shaft of the grinding wheel. It is contemplated that the surface speed of the grinding wheel 10 may be maintained at a precise optimum speed by adjusting the speed of drive 62 as the radius of the grinding wheel changes.

It will be noted that with the slide 12 in the home position where microswitch 30 is actuated as shown in FIG. 1, the distance $Z_h$ between the axis of the grinding wheel (indicated at 11 in FIG. 1), and the axis of the rotatable table 16 (as indicated at 23) will be known. By thereafter keeping a count of the output from the transducers and by keeping track of adjustments of the dressing tool 36, the distance between the center of the tool blank 22 and the dressed surface 10a of the grinding wheel will be known at all times. If, then, it is desired to move the tool blank 22 from the position shown in FIG. 1 to the position shown in FIG. 2, a suitable count value could be entered into a Z command register and the drive 26 could be energized under the control of a suitable comparator circuit. When the Z position counter connected to Z position encoder 28 registered a count value corresponding to the commanded count value in the command register, the comparator circuitry would cause the drive component 26 to be deenergized, with rotary table 16 and tool blank 22 positioned as indicated in FIG. 2.

If, for example, it were desired to make an initial cut of five mils about the perimeter of the blank 22, and at the same time to form rounded corners with a radius of curvature of two mils, then the axis of rotation of table 16 would be placed at a distance of seven mils from edge 22a of blank 22. For the purpose of a preliminary example, the dimensions indicated in FIG. 3 for the blank 22 may be converted to units of mils (one mil equals 0.001 inch). Accordingly sides 22b and 22d could be 1,250 mils, while sides 22a and 22c might be 1,500 mils. With this specific example, one-half the width of blank 22 would be 625 mils, and blank 22 might be retracted by means of the Y-axis slide in the minus Y direction 618 mils, and then the Z slide 12 advanced 623 mils. The final Z axis value would then be Z = 14.998 where a distance $Z_0'$ of fifteen inches initially existed between the center of the blank 22 and the surface 10a in FIG. 1. The grinding wheel 10 would be in grinding contact with the surface 22a at side A of the blank 22 during the last five mils of movement of the Z axis slide.

With the Z axis slide 12 fixed at a position Z = 14.998, the X slide could be activated to shift the blank 22 to the right for progressively removing five mils of material along the left half of side A. Where one-half of the length of the side A is equal to 750 mils, the X slide might be moved 743 mils, whereupon the drive 46 would be activated to rotate table 16 through ninety degrees. For the sake of a diagrammatic indication, referring to FIG. 3, the axis of the rotary table 16 would be located as indicated at 44a during the time that the rotary table was being rotated through ninety degrees, the point 44a being seven mils from the initial side face 22a and from the adjacent side face 22b. Of course, the distance of point 44a from sides 22a and 22b is greatly exaggerated for the purpose of clearer illustration. In order to assist in visualizing the operation so far, a dot dash line is indicated at 84 in FIG. 3 which would indicate the outline of the blank 12 after the rotary table 16 has completed a rotation of ninety degrees. The arcuate dot dash line at 84a would represent the arcuate face of the blank as produced during the rotation of the table 16, while the curvature indicated at 84b is intended to diagrammatically indicate the curvature of the grinding wheel, so as to indicate the appearance of side B of the blank immediately at the completion of the rotation of the table 16 through ninety degrees. For the specific example given, the arcuate portion 84a would have a radius of two mils and a center at the point 44a.

Since the X and Y slides rotate with the table 16, it can be visualized that the Y axis slide should now be moved in the direction of arrow 86, FIG. 2 (after rotation through an angle α as indicated by arrow 88 in FIG. 2 of ninety degrees). If the initial dimension of side 22b is 1,250 mils, the Y move should be fourteen mils less or 1,236 mils.

The table I on the following pages will serve to illustrate or tabulate the successive moves which might be effected automatically or by manual entry of successive axis count commands so as to produce a finished cross-section configuration for the tool such as indicated at 90 in FIG. 3.

TABLE I

| Side | X Move(Mils) | Y Move(Mils) | Z Move(Mils) | Minimum Depth of Cut(Mils) | Table Rotation (Degrees) | Maximum Depth of Cut(at corner) | Final Position of center of Rotary table($Z_0'$=15") |
|---|---|---|---|---|---|---|---|
|  |  | −618 |  |  |  |  | 14.375 |
| A1 |  |  | 623 | 5 |  |  | 14.998 |
| A1 | 743 |  |  | 5 | 90 | 7.898 |  |

TABLE I-continued

| Side | X Move(Mils) | Y Move(Mils) | Z Move(Mils) | Minimum Depth of Cut(Mils) | Table Rotation (Degrees) | Maximum Depth of Cut(at corner) | Final Position of center of Rotary table($Z_0=15''$) |
|---|---|---|---|---|---|---|---|
| B1 |  | 1236 |  | 5 | 90 | 7.898 |  |
| C1 | −1486 |  |  | 5 | 90 | 7.898 |  |
| D1 |  | −1236 |  | 5 | 90 | 7.898 |  |
| A1 | 743 |  |  | 5 |  |  |  |
|  |  |  | −1 |  |  |  | 14.997 |
| A2 |  | 6 |  | 5 |  |  |  |
| A2 | 737 |  |  | 5 | 90 | 7.484 |  |
| B2 |  | 1224 |  | 5 | 90 | 7.484 |  |
| C2 | −1474 |  |  | 5 | 90 | 7.484 |  |
| D2 |  | −1224 |  | 5 | 90 | 7.484 |  |
| A2 | 737 |  |  | 5 |  |  |  |
|  |  |  | −1 |  |  |  | 14.996 |
| A3 |  | 6 |  | 5 |  |  |  |
| A3 | 731 |  |  | 5 | 90 | 7.484 |  |
| B3 |  | 1212 |  | 5 | 90 | 7.484 |  |
| C3 | −1462 |  |  | 5 | 90 | 7.484 |  |
| D3 |  | −1212 |  | 5 | 90 | 7.484 |  |
| A3 | 731 |  |  | 5 |  |  |  |
|  |  |  | 0 |  |  |  | 14.996 |
| A4 |  | 5 |  | 5 |  |  |  |
|  |  |  | −1 |  |  |  | 14.952 |
| A48 |  | 6 |  | 5 |  |  |  |
| A48 | 467 |  |  | 5 | 90 | 7.484 |  |
| B48 |  | 684 |  | 5 | 90 | 7.484 |  |
| C48 | −934 |  |  | 5 | 90 | 7.484 |  |
| D48 |  | −684 |  | 5 | 90 | 7.484 |  |
| A48 | 467 |  |  | 5 |  |  |  |
|  |  |  | −1 |  |  |  | 14.951 |
| A49 |  | 6 |  | 5 |  |  |  |
| A49 | 461 |  |  | 5 | 90 | 7.484 |  |
| B49 |  | 672 |  | 5 | 90 | 7.484 |  |
| C49 | −922 |  |  | 5 | 90 | 7.484 |  |
| D49 |  | −672 |  | 5 | 90 | 7.484 |  |
| A49 | 461 |  |  | 5 |  |  |  |
|  |  |  | −1 |  |  |  | 14.950 |
| A49 |  | 4 |  | 3 |  |  |  |
| A49 | 452 |  |  | 3 | 90 | 7.484 |  |
| B49 |  | 654 |  | 3 | 90 | 7.484 |  |
| C49 | −904 |  |  | 3 | 90 | 7.484 |  |
| D49 |  | −654 |  | 3 | 90 | 7.484 |  |
| A49 | 452 |  |  | 3 |  |  |  |
| A50 |  |  |  |  |  |  | 14.950 |
| A50 |  | 3 |  | 3 |  |  |  |

DESCRIPTION OF THE GRINDING MACHINE OF FIGS. 4-7

Referring to FIG. 4, a grinding machine as successfully built and operated is illustrated in a top plan view. A machine frame 100 mounts a spindle 109 for grinding wheel 110. The grinding wheel is driven in the direction of arrow 111 from a motor 112 having a motor shaft 114. A sheave 116 on the motor shaft 114 drives a sheave 118 on the grinding wheel shaft 109 by means of a drive belt 119. Motor 112 is carried on a motor mount 120 which includes a horizontal plate 122 with elongated slots such as 123 and 124. Thus reciprocal movement of the motor mount 120 is guided by means of cap screws such as 125 and 126. A vertically disposed motor plate 130 is secured to horizontal plate 122 by means of side flange members 135 and 136. An adjusting screw is indicated at 140 (at the left center in FIG. 4) for shifting the motor mount 120 over the range of adjustment permitted by the slots 123 and 124. The motor mount 120 is locked in a desired position by means of screw members 143 and 144 having cooperating nuts such as 145 and 146. The arrangement is such that the position of the motor 112 may be adjusted to accommodate desired sheave diameters by means of the adjusting screw 140, the nuts associated with screws 143 and 144 serving to lock the motor mount 120 at a position providing the desired tension of belt 119.

As seen in FIG. 5, horizontal motor plate 122 may have further elongated slots such as indicated at 160 receiving further cap screws such as 162, and the adjusting screw 140 may cooperate with a threaded block 164 secured to the horizontal plate 122. A hand wheel is indicated at 166 on the end of the adjusting screw 140 for use in adjusting the motor mount 120.

Referring to FIG. 4, a Z-axis drive motor 180 is indicated at the extreme right which is operable for moving a Z-axis slide 182 in a Z direction as indicated by the double headed arrow 184. As indicated in FIG. 6, the Z slide 182 may be supported by means of a base 186. The motor 180 may be secured to the base 186 as shown in FIG. 7. The drive for the Z slide 182 may include a lead screw (not shown) extending parallel to the Z-axis indicated by arrow 184 with a resolver (not shown) and a tachometer (not shown) in line with the lead screw without any gear reduction between the motor 180 and the lead screw.

By way of example, the Z slide 182 may have a range of travel in the Z direction as indicated at 184 in FIG. 4 of 460 millimeters (18,110 inches). The Z slide 182 is shown in FIGS. 4 and 5 at a midpoint in its range of travel, and the extreme of its travel in a direction toward the grinding wheel 110 is indicated in dot dash outline at 182A in FIG. 5. As seen in FIG. 7, the frame 100 includes a bed plate 202 which is provided with an elongated apertures 203 for accommodating movement along the Z-axis of certain parts movable with the slide 182.

Mounted on the Z-axis slide 182 is a table support structure 210, FIG. 6, carrying a rotary table 212 which is angularly movable in a counter-clockwise direction as indicated by arrow 214 in FIG. 4. The table 212 is driven in the direction of arrow 214 by means of a R-axis drive motor 216, FIG. 5. The motor 216 drives the table 212 via a suitable speed reduction, for example of 180 to 1, and a resolver (not shown) may be mounted in line with the motor for direct drive by the motor without any speed reduction. Thus, the resolver rotates 180 times per table revolution. The table 212 is indefinitely rotatable in the direction of arrow 214 and makes a number of revolutions as the grinding wheel 110 makes successive cuts on the workpiece. As indicated at 220 and 222 in FIGS. 5 and 6, the table 212 is provided with radially extending passages which open at the outer perimeter of the table for receiving electric cables which are lead via the passages to a central tube 224, FIG. 6.

The passages 220 and 222 provide for electrical connections with the drives for the X and Y axes which are carried on the table 212. As seen in FIG. 6, the Z-axis slide 182 carries a depending sleeve 230 having a flange 232. The flange 232 serves to support a slip ring assembly 236, FIG. 5, which has a cooperating flange 238 at the upper end thereof. Rotatably mounted within the slip ring assembly 236 is a slip ring shaft 240 which is coupled for joint rotation with tube 224 by means of a rubber hose coupling as indicated at 242. The purpose of the coupling 242 is to prevent the exertion of any lateral forces on the slip ring bearings. By way of example the slip ring assembly 236 may be provided with stationary silver carbide brushes which cooperate with the slip rings to transmit the various electrical signals via a fitting indicated at 246, FIG. 5.

Mounted on the rotary table 212 is a Y-axis slide 260 which may have a range of movement parallel to a Y axis as indicated by arrow 262 in FIG. 5. The slide 260 is driven by means of a Y-axis motor 264, and by way of example may have a range of movement of 160 millimeters (6.3000 inches). The Y-axis slide 260 is shown at a midpoint in its range of movement in FIG. 4. Referring to FIG. 7 an X-axis slide 270 is shown for reciprocal movement as indicated by arrow 272 on the Y-axis slide 260, and an X-axis drive motor 274 is indicated for reciprocating the slide 270 relative to the X axis. By way of example, slide 270 may have a range of movement of 160 millimeters (6.300 inches), the same as the Y-axis range of movement.

Mounted on the X-axis slide 270 is a hydraulic expansion chuck 280 secured to the X-slide 270 by means of cap screws such as indicated at 282, FIG. 4. The chuck may have a central bore 284, FIG. 4, with a diameter for example of 3.000 inches. At a lower portion of the bore 284, the chuck may be provided with radial holes opening into the bore 284 from the outer periphery and disposed at angles such as zero degrees, 45° degrees, ninety degrees, 120° degrees, 150° degrees, 210° degrees, 240° degrees and 315° degrees to provide for the positioning of interchangeable sleeves such as sleeve 286 at different desired angles relative to the X-axis. The various sleeves such as 286 are designed to rigidly retain work blanks such as the workpiece indicated at 288 in FIG. 4. As seen in FIG. 5, workpiece 288 is thus fixedly supported in the chuck at a level so as to cooperate with the outer cylindrical periphery of grinding wheel 110. As seen in FIg. 7, a keying pin such as 290 may be inserted through aligned holes in the wall of the chuck 280 and in the sleeve 286 so as to retain the workpiece 288 at the desired angular relationship to the X axis. Generally, the chuck 280 is provided with a thin wall surrounding the sleeve 286, with a cavity interiorly of the thin wall receiving a silicone substance which can be pressurized by means of a screw operated piston so as to deform the thin wall into locking engagement with the exterior cylindrical wall of the sleeve 286. The construction of the chuck 280 is consistent with overall accuracies of about three tenthousandths of an inch.

A grinding wheel dressing mechanism is indicated at 300 in FIG. 5 and includes a diamond dresser 302 which is arranged to be moved parallel to the Z axis into dressing relation to the outer cylindrical surface of the grinding wheel 110. The dressing mechanism may include a manually operated hand wheel 304 for manual control of the dresser when desired, and may also include an automatic drive for accurately positioning the dresser 302 relative to the grinding wheel during a dressing cycle.

Coolant is applied to the grinding wheel 110 in advance of its contact with the work 288, the work is flooded with coolant, and the wheel is cleaned by counter-forced coolant. By way of example, the coolant nozzles may be kept in proper close relation to the wheel 110, and the position of the coolant nozzles may be adjusted as the diameter of the grinding wheel changes through successive dressing cycles by means of the dressing mechanism 300. For example, if the grinding wheel might have an initial diameter of 24 inches, and be suited to dressing down to an eighteen inch diameter, then the coolant nozzles might be adjustable over a three inch range relative to the grinding wheel axis. The position of the coolant nozzles could be automatically adjusted inwardly in response to successive dressing cycles of the dressing mechanism 300 if desired, so as to maintain an optimum close relationship between the nozzles and the outer periphery of the grinding wheel.

THE GRINDER CONTROL SYSTEM OF FIGS. 8–12

Figure 8:
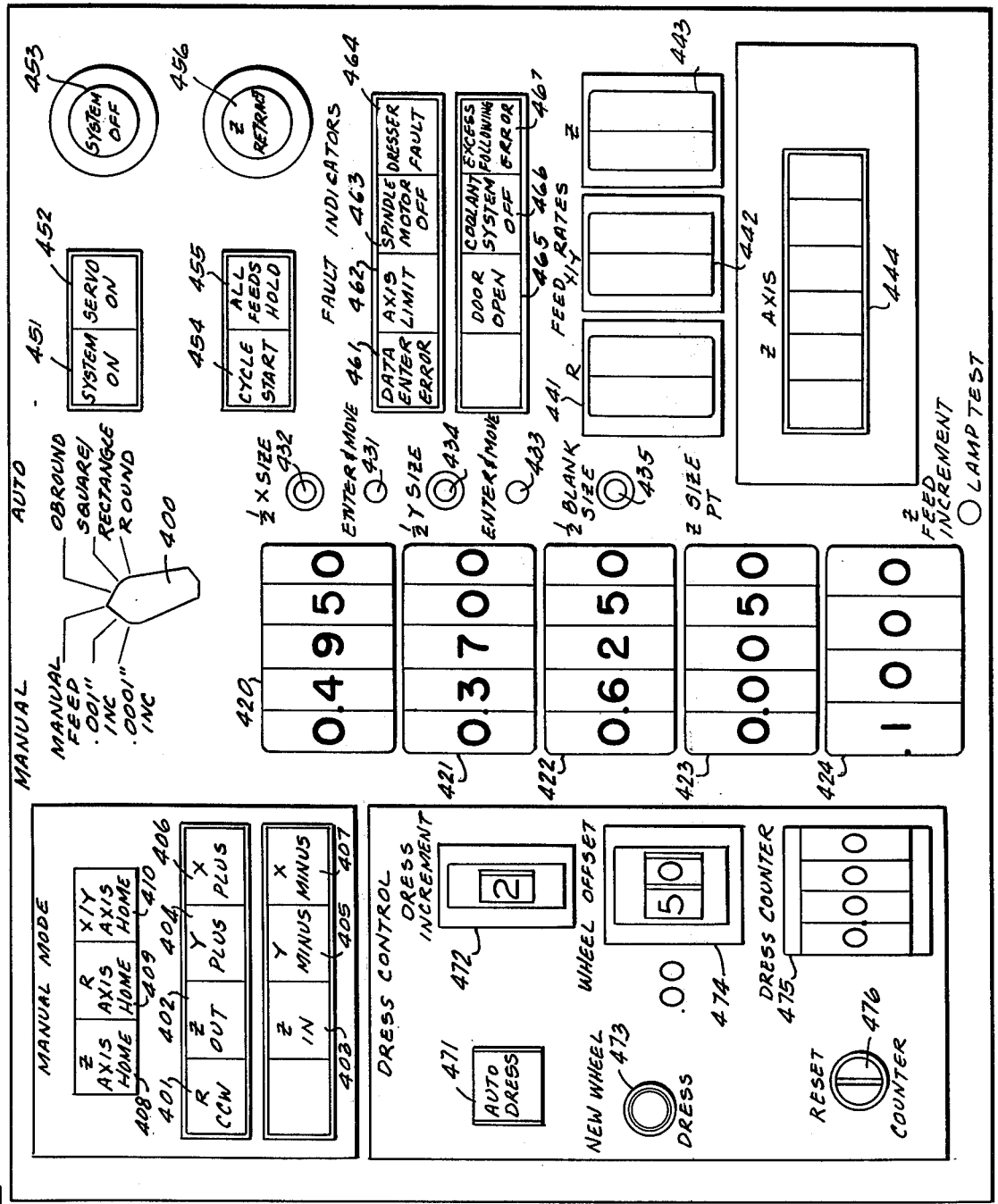
FIG. 8 is a diagrammatic plan view showing the layout of a control panel for the apparatus of FIGS. 4 through 7.

FIG. 8 is a diagrammatic illustration of a control panel for the grinding machine of FIGS. 4–7. A mode selector is indicated at 400 which has three manual control positions and three automatic positions. In the first two manual positions of selector 400, the drives are operated in a step mode so as to step a predetermined increment (one ten-thousandth of an inch in the first position and one thousandth of an inch in the second position) upon each actuation of the manual mode control buttons 401–407. In the third "Manual Feed" position of selector 400, a drive is energized so long as the corresponding control button 401–407 is held actuated. In any of the manual mode positions of selector 400, actuation of the control buttons 408–410 result in the return of the Z-axis slide 182, rotary table 212 and the Y-axis and X-axis slides 260 and 270 to their respective home positions.

If the workpiece such as 288 is to be ground to an obround configuration by automatic operation of the system, selector 400 is to be placed in its fourth position, while the fifth position is used for automatic grinding of square or rectangular configurations, and the extreme clockwise position of selector 400 is used for the grinding of round work configurations.

In setting up the system for automatic operation, parameters relating to the workpiece are entered by means of manually operated data input switches 420–424. Once a dimension has been set-up on the one-half X size switch 420 (such as 0.4950 inch as shown in FIG. 8), an enter move button 431 may be actuated to cause the dimension to be stored in memory and automatically executed. At the completion of the X-axis move in accordance with the entered dimension, an indicator light 432 will be lit to indicate to the operator that the desired move has been executed.

Similarly for the one-half Y size switch 421, once a dimension (such as 0.3700 inch as shown) is entered, a button 433 may be depressed to cause the dimension to be entered and automatically executed. When the Y-axis move has been executed, indicator light 434 is energized.

The switch 422 serves to enter a dimension (such as 0.6250 inch) representing one-half of the width dimension of the blank or workpiece such as 22, FIGS. 1–3, this dimension in the illustrated embodiment being disposed parallel to the Y axis. An indicator light 435 is energized at a suitable point in the automatic operation as will hereafter be explained.

The switch 423 serves to enter a dimension (such as 0.0050 inch) which represents a "Z size point" as will hereafter be explained.

The switch 424 serves to introduce a value (such as 0.1000 inch) which is termed the "Z feed increment", and represents the desired normal advance of the Z-axis slide 182.

Further manual data input devices are indicated at 441–443 for selecting desired feed rates for the R(rotary table) axis, the X-axis and the Y-axis slides, and the Z-axis slide, respectively.

The reference numeral 444 designates a six decimal digit readout section which is under the control of the computer and serves to supply a readout of Z-axis position.

Control buttons 451 through 456 are designated respectively "System On", "Servo On", "System Off", "Cycle Start", "All Feeds Hold", and "Z Retract".

Fault indicator lights are indicated at 461–467 and may be selectively controlled by the computer to indicate the following respective conditions: "Data Enter Error", "Axes Limit", "Spindle Motor Off", "Dresser Fault", "Door Open", "Coolant System Off", and "Excess Following Error".

A dress control section of the control panel at the lower left comprises elements 471–476. Reference numeral 471 designates a control switch for activating an "Auto Dress" feature whereby the grinding wheel is automatically dressed. The actuating button 471 is illuminated in response to a first actuation to indicate auto dress mode, and the illumination is extinguished when the button 471 is actuated a second time to leave auto dress mode.

Element 472 is a manual data input switch having one decimal digit representing dress increments in thousandths of an inch. Thus with the switch 472 set to the numeral two as shown, 0.002 inch is removed from the grinding wheel in each dressing cycle.

The control 473 serves to initiate a dressing operation of a new grinding wheel, and may bear the notation "New Wheel Dress".

The manual data input switch 474 may have two decimal digits of adjustment representing thousandths and ten-thousandths of an inch of grinding wheel offset, so that in the illustrated condition, the grinding wheel offset is 0.0050 inch.

Element 475 is a mechanical dress counter which serves to maintain a count of dress cycles independent of power supply for the system. Accordingly, after a power shut-down, the dress counter 475 will still register the relevant dress count, so that the computer can determine the condition of the grinding wheel, and resume operation accordingly. Element 476 is manually actuated to reset the dress counter 475.

Figure 9:
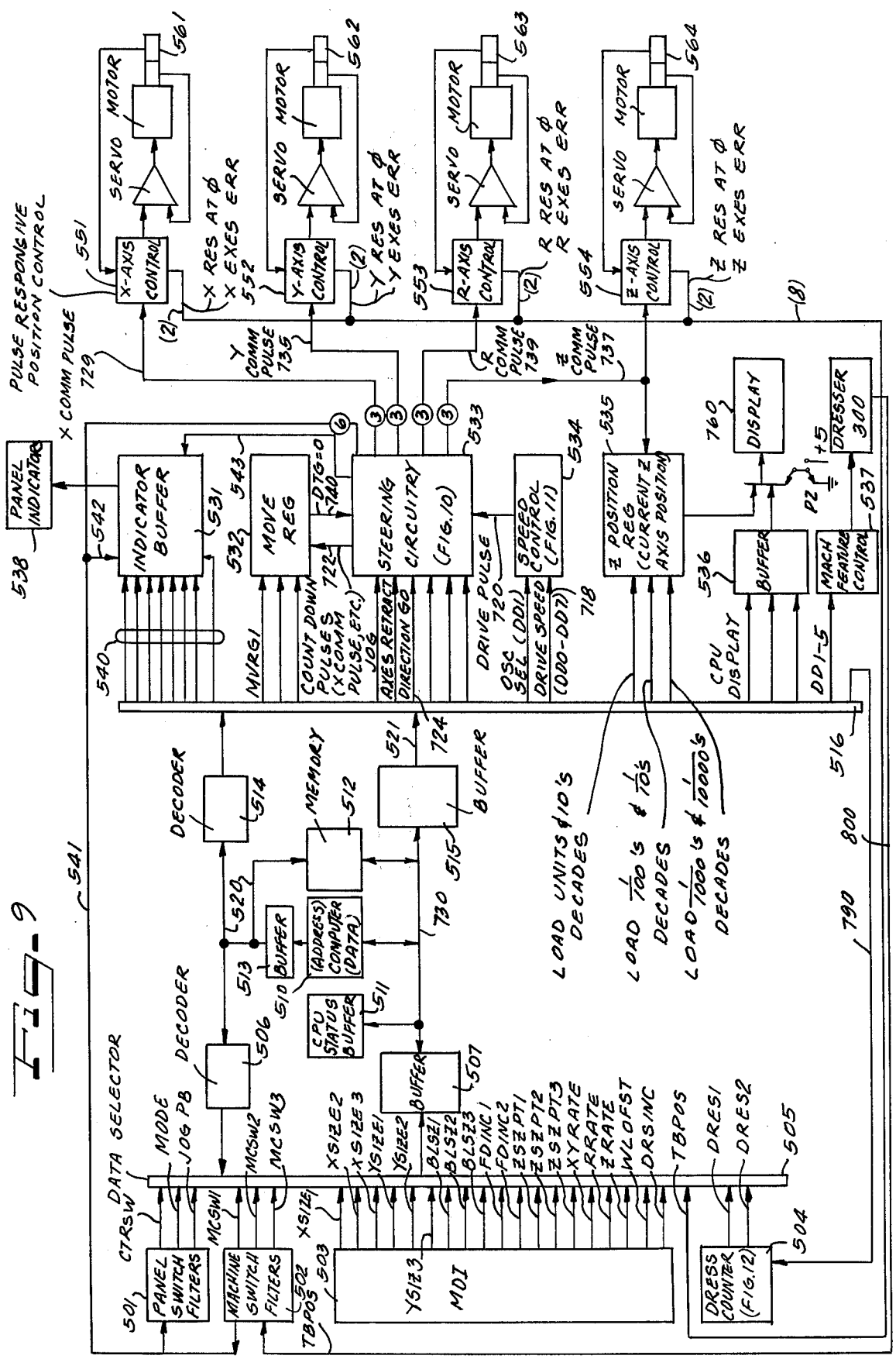
FIG. 9 is a block diagram illustrating, for purposes of example only, a control system which has been successfully applied to the apparatus of FIGS. 4 through 8.

FIG. 9 is a block diagram of the control system for the grinding machine of FIGS. 4–7. Panel switch filters component 501 represents switch filter circuitry for supplying logical output signals to respective eight channel input ports as represented by the designations CTRSW, MODE, and JOGPB. These output signals are generated in response to actuation of respective switches of the control panel of FIG. 8 as set forth in the tabulations on the following pages.

| Tabulation of Logical Outputs from the Panel Switch Filters Component 501, FIG. 9 | | |
|---|---|---|
| Switch Designation | Ref. No. | Logical Output Signal |
| R Axis Home | 409 | R TO HM |
| X/Y Home | 410 | X/Y TO HM |
| ½ X Size Offset | 431 | X OFST |
| ½ Y Size Offset | 433 | Y OFST |
| Cycle Start* | 454 | CYCL STRT |
| Feed Hold | 455 | FEED HLD |
| Emergency Z Retract ** | 456 | EMR Z RTRCT |
| Servo On*** | 452 | SERVO ON RY SF |

*The cycle start switch 454, FIG. 8, upon closing produce a signal CYCL STRT CTRL which is logically OR ed with a signal CYCL STRT MACH SF produced by a switch designated "CYCL STRT MACH" located on the grinding machine proper. Actuation of either switch will serve to transmit the signal "CYCL STRT" at bit 4 of the control switch input port.
**The emergency Z retract switch 456, FIG. 8, produces a signal EMR Z RTRCT CTRL which is logically OR ed with a signal EMR Z RETRCT MACH SF from a switch "EMERGNCY Z RTRCT MACH" located at the grinding machine proper. Either signal, of course, will be effective to generate the EMR Z RTRCT signal.
***The servo on switch 452, FIG. 8, controls a servo-on relay. A circuit including a normally open contact of this relay is coupled to a switch filter so that when the relay is energized, the switch filter supplies the signal SERVO ON RY SF.

| Mode Input Port (MODE) | |
|---|---|
| Switch Designation | Logical Output Signal |
| Selector Switch 400 | |
| Position One | .0001 INC |
| Position Two | .001 INC |
| Position Three | MAN FEED |
| Position Four | OBROUND |
| Position Five | SQ/REC |
| Position Six | ROUND |
| Auto Dress Switch 471 | AUTO DRS |
| New Wheel Dress Switch 473 | NEW WHL DRS |

| Jog Pushbutton Input Port (JOG PB) | | |
|---|---|---|
| Switch Designation | Ref. No. | Logical Output Signal |
| X Plus | 406 | X PLS |
| X Minus | 407 | X MINUS |
| Y Plus | 404 | Y PLS |
| Y Minus | 405 | Y MINUS |
| Z Out | 402 | Z OUT |
| Z In | 403 | Z IN |
| R CCW | 401 | RCCW |
| Z Axis Home | 408 | Z TO HM |

The control panel of FIG. 8 in an existing embodiment is located remote from the grinding machine per se, and the grinding machine per se is completely enclosed for safety purposes, with a door which provides access to the grinding machine being closed during normal operation of the machine so that the machine operates out of the view of the operator. In order to supply information as to the operation of the grinding machine, various switches are provided at the grinding machine, and the condition of these switches is transmitted by means of a machine switch filters component 502 indicated in FIG. 9. The various switches which are provided in the existing installation are listed in the following tabulation which shows the logical outputs which are transmitted via the respective eight-channel ports designated MCSW1, MCSW2 and MCSW3 in FIG. 9.

Tabulation of Logical Outputs from the Machine Switch Filters Component 502, FIG. 9

Machine Control Switch Input Port One (MCSW1)

| Switch Designation | Logical Output |
|---|---|
| Plus X-Axis Overtravel | X + O.T SF |
| Minus X-Axis Overtravel | X − O.T SF |
| X-Axis Home Zone | X ZERO SF |
| Plus Y-Axis Overtravel | Y + O.T SF |
| Minus Y-Axis Overtravel | Y − O.T. SF |
| Y-Axis Home Zone | Y ZERO SF |
| R-Axis Slow Down | R SLO DN SF |
| R-Axis Home Zone | R ZERO SF |

Machine Control Switch Input Port Two (MCSW2)

| Switch Designation | Logical Output |
|---|---|
| Plus Z-Axis Overtravel | Z + O.T SF |
| Minus Z-Axis Overtravel | Z − O.T SF |
| Z-Axis Slow Down | Z SLO DN SF |
| Z-Axis Home Zone | Z ZERO SF |
| Dress Cycle On | DRS CYCL ON SF |
| R-Axis Brake On | R BRAKE ON SF |
| Machine indicator on (See FIG. 10 for the logical circuitry controlling this output signal.) | MACH IND ON |

Machine Control Switch Input Port Three (MCSW3)

| Switch Designation | Logical Output |
|---|---|
| Spindle off | SPINDL OFF SF |
| Door Open | DOOR OPN SF |
| Coolant Off | CLNT OFF SF |
| Dresser Fault | DRSR FLT SF |

Component 503 in FIG. 9 is designated MDI, and represents the circuitry associated with the various manual data input switches of FIG. 8 for registering and transmitting (in binary coded decimal notation) the manually entered numbers. The coded information associated with the respective eight-channel ports such as X SIZE1 in FIG. 9 are set forth in the following tabulation which is self-explanatory.

MANUAL DATA INPUT COMPONENT 503, FIG. 9

| Input Port Designation in FIG. 9 | Description of the Associated MDI Component of FIG. 8 |
|---|---|
| X SIZE 1 | Two least significant digits of ½ X size input switch 420 (in binary coded decimal) |
| X SIZE 2 | Hundredths and tenths digits of ½ X size input switch 420 |
| X SIZE 3 | Most significant (units) digit of ½ X size input switch 420 |
| Y SIZE 1 | Two least significant digit of ½ Y size input switch 421 |
| Y SIZE 2 | Hundredths and tenths digits (0.01 inch and 0.1 inch) of the ½ Y size input switch 421. |
| Y SIZE 3 | Most significant (units) digit of ½ Y size input switch 421. |
| BLSZ1 | Two least significant digits of the ½ blank size switch 422. |
| BLSZ2 | Hundredths and tenths digits of the ½ blank size switch 422. |
| BLSZ3 | Most significant (units) digit of the ½ blank size switch 422. |
| FDINC1 | The ten thousandths and thousandths digits (eight bits in binary coded decimal notation) from the Z feed increment switch 424. |
| FDINC2 | The hundredths and tenths digits from the Z feed increment switch 424. |
| ZSZPT1 | The ten thousandths and thousandths (of an inch) digits from the Z size point switch 423. |

-continued

MANUAL DATA INPUT COMPONENT 503, FIG. 9

| Input Port Designation in FIG. 9 | Description of the Associated MDI Component of FIG. 8 |
|---|---|
| ZSZPT2 | The hundredths and tenths digits from switch 423. |
| ZSZPT3 | The units digit from switch 423. |
| XYRATE | The two digits from the X/Y feed rate manual input device 442. |
| RRATE | The two digits from the R feed rate input device 441. |
| ZRATE | The two digits from the Z feed rate input device 443. |
| WLOFST | The two digits of the wheel offset input switch 474 (representing ten thousandths and thousandths of an inch) |
| DRSINC | The single decimal digit of dress increment input switch 472 (representing thousandths of an inch and transmitted in parallel as four bits with weights of 1, 2, 4 and 8 in binary coded decimal notation) |

Dress counter component 504 in FIG. 9 is shown as having two eight-channel ports DRES1 and DRES2 for supplying the count of the mechanical counter component 475, FIG. 8. The following table with respect to these two ports is presented for the sake of uniformity.

DRESS COUNTER COMPONENT 504, FIG. 9

| Import Port Designation in FIG. 9 | Description of the Associated Component of FIG. 8 |
|---|---|
| DRES1 | The two least significant digits from the dress counter 475 (each transmitted in parallel as four binary bits with weights of 1, 2, 4 and 8 in binary coded decimal notation). |
| DRES2 | The two higher order digits of dress counter 475 (each transmitted in binary coded decimal as for DRES1) |

The foregoing eight channel ports are all connected as inputs to a data selector component 505 which may be implemented as a conventional multiplex arrangement controlled by means of decoder component 506. The selected eight bit word is supplied by component 505 to a buffer component 507. Buffer component 507 is illustrated as being conventionally associated by means of a suitable data bus configuration with a data processing system including a computer component 510, a central processing unit (CPU) status buffer component 511 and a memory component 512. The address of data to be supplied from the data selector 505 may be transmitted from the computer 510 via a buffer 513 to the decoder 506. In the existing installation, the input line to buffer 507 from selector 505 is an eight-channel bus, and the input line to decoder component 506 is also an eight channel bus.

Since the computer system represented by components 505–507, and 510–516 in FIG. 9 is essentially a commercially available system, detailed discussion is deemed unnecessary. The computer system basically receives data words from the respective eight-channel input ports such as CTRSW under the control of data selector 505. The data selector 505 receives the address of a desired input port from the computer system via decoder component 506. After processing in accordance with information received from the inputs ports, the computer system may supply a desired address to decoder 514 via an eight-channel buss 520, the decoder 514 controlling the data selector or multiplex component 516 so that the data word is transmitted from buffer component 515 via eight channel buss 521 to a selected one of the components such as indicated at 531–537.

The reference numeral 540 represents an output port consisting of eight channels which serve to transmit the following respective signals:

CYCL STRT, FEED HLD, DATA ENTR ERR, X SIZE, Y SIZE, BLANK SIZE, Z IN FLASH, Z HM FLASH.

The indicator buffer component 531 responds to the respective signals received by output port 540 to energize the respective corresponding indicator lamps on the control panel of FIG. 8, the panel indicators being collectively represented by component 538. In particular, the foregoing listed signals transmitted by the respective channels of the output port 540 will cause the energization of the lamps associated with elements 454, 455, 461, 431, 433, 435, 403 and 408 of the control panel of FIG. 8. Line 541 which is shown extending from the machine switch filters component 502 may include a five conductor line indicated at 542 connecting with the indicator buffer component 531. The signals transmitted by lines 541 and 542 to component 531 may be the following:

$\overline{\text{SPINDL OFF}}$, $\overline{\text{DRSR FLT}}$, $\overline{\text{DOOR OPN}}$, and $\overline{\text{CLNT OFF}}$.

These respective signals control the energization of indicator lamps associated with indicators 463, 464, 465 and 466, these indicators being designated respectively "spindle motor-off", "dresser fault", "door open", and "coolant-off". Thus, indicators 463–466 are shown as being directly controlled from machine switch filters component 502 at the grinding machine, independently of the transmission of these signals via the input port MCSW3.

Other signals are supplied from steering circuitry component 533 to buffer component 531 as indicated by line 543. By way of example, line 543 may include conductors for transmitting the following signals:

X/Y AT HM, Z AT HM, R AT HM, $\overline{\text{AXS LIMIT}}$ and $\overline{\text{EXES FWG ERR}}$ These signals may control the energization of indicator lights associated with components 410, 408, 409, 462 and 467 of FIG. 8. The steady energization of these indicator lights indicate respectively the following conditions: both X-axis and Y-axis slides at the respective home positions, the X-axis slide at the home position, the R-axis table at its home orientation, one or moreof the X-axis, Y-axis and Z-axis limit switches actuated to indicate an overtravel condition of the associated slide, and an excess servo error from any one of the X-axis control 551, the Y-axis control 552, the R-axis control 553 or the Z-axis control 554.

The information supplied by the axis control components 551–554 to the input port designated TBPOS are listed as follows:

X RES AT $\phi$, X EXES ERR, Y RES AT $\phi$, Y EXES ERR, R RES AT $\phi$, R EXES ERR, Z RES AT $\phi$, and Z EXES ERR.

The first of the signals from each of the controls 551–554 reflects an electrical zero condition of the corresponding resolver, the resolver components being indicated at 561–564 at the right in FIG. 9. Component 533 may receive signals such as X RES AT $\phi$ and $\overline{\text{X ZERO SF}}$ and generate the signals such as X AT HM.

The wheel dress assembly 300 is a commercially available unit known as a Tru-Grid Rotary Diamond Dressing Wheel Assembly manufactured by Wheel Trueing Tool Co., and includes a micrometer 601 which controls the incremental distance the dresser slide is moved in response to each electric pulse. In the illustrated embodiment the setting is such that each electric pulse produces one mil of movement of the dresser slide toward the grinding wheel. The dress increment switch 472, FIG. 8, controls how many pulses are produced in each dress cycle, and can be set to produce any number of such pulses between zero and nine.

In setting up a new dress cycle handwheel 304 is first turned to move the slide carrying dresser 302 away from the grinding wheel until a gage stop 602, FIG. 4, abuts the slide. The handwheel 304 is then turned in the opposite direction until a dial calibrated in one-thousands of an inch shows that the dresser has been moved a predetermined number of mils. The new wheel switch 473 is then actuated to cause the dresser slide to be advanced a predetermined distance, say 0.175 inch, to provide the new grinding wheel with a given diameter, in readiness for subsequent operation in grinding shapes. There may be a dwell of twelve seconds between successive pulses produced in the dresser assembly, once enabled by the computer, and such pulses each produce a one-mil advance of the roll dresser, and are also fed to the computer for update of the mechanical counter 504, FIG. 9 via 790.

The operation of the embodiment of FIGS. 4–12 is similar to that described with reference to FIGS. 1–3 except that the ½ X-size and ½ Y-size moves are executed at the time of manual entry when the associated date entry button (431 or 433) is depressed. the work is then advanced at a rapid rate a distance determined from the known distance to the grinding wheel 10 corresponding to $Z'_0$ in FIG. 1, adjusted by any Z-axis offset entered at 474 and the ½ blank size value entered at 422. When fully advance, the ½ blank size indicator 435, FIG. 8 is lit.

The system now proceeds to feed the work toward the grinding wheel at the Z feed rate entered at 433, FIG. 8, and feeds a distance as registered at 424, FIG. 8. When the move register 532, FIG. 9, signals that the Z move is complete (by means of the signal DTG = 0 supplied to the steering circuitry component 533, FIG. 9), the system is ready for a move parallel to the X-axis (in the negative X direction) so that the tool blank 288 moves to the left annd counter to the direction of wheel rotation indicated at 111 in FIG. 3A and FIG. 4.

Referring to FIG. 3A, once the initial Z-move is complete, the move register 532, FIG. 9, would be loaded with a value equal to twice the one-half X size as entered at 420, and the move executed at the feed rate entered at 442, FIG. 8. At the completion of this move, the axis of table 212 would be under point 802, FIG. 3A, and the rotary drive 216 would be energized to effect a 90° counterclockwise rotation.

Operation then proceeds as was described with reference to FIGS. 1–3. If the system is in auto dress mode as determined by button 471, the wheel dress mechanism will dress the wheel after each cycle by the amount set at 472 in FIG. 8, e.g., two mils, and the control will take this into account in the following cycle, by referring to the reading (of 0002) of the mechanical dress counter 475. In each cycle, the tool blank 288 always moves counter to the direction 111 of wheel surface movement and always contacts wheel 110 at the point about its periphery indicated at 620 in FIG. 3A. The feed of the successive axes in each cycle is sufficiently near continuous in relation to the time for a revolution of the grinding wheel so that the work is not subject to scratching during the final finish grinding cycles. The work may be retracted from the grinding wheel at the end of each cycle sufficiently quickly so that the work is not scratched (during the time when a dressing cycle is being initiated).

OPERATION OF THE GRINDER CONTROL SYSTEM OF FIGS. 8–12

The flow data and commands within the control system is as follows. the control computer 510–513, FIG. 9 selects a desired input of components 501–504 and sends its address to the decoder 506. Data on the selected port is gated through the data selector 505, through the buffer 507 and onto the input/output bus 730. The input/output bus 730 is an 8 bit parallel bus designated DD0-DD7. The control computer 510–513 can read data into its internal registers for manipulation or can put data or commands onto the bus to be output to the electronics which control the positioning systems. The computer's memory 512 in this example implemenation also is accessed via the input/output bus. The control program, an example of which being attached as an appendix to this specification, is stored in programmable read-only memory of component 512, and controls the flow of input and output data. The control means 511–513 controls the calculations of desired position-commands based on prestored program sequences capable of producing any one of a set of cross-secttional configurations in conjunction with lineal and radial dimensions input by the operator. As an extension of the present control system, the amount of data which would have to be input by an operator could be greatly reduced in cases where standard sizes were desired by storing in ROM's the dimensions of the several standard sizes. A size could then be called by an operator using a simple command. This command could be entered in numerous ways. An alpha-numeric keyboard or an existing parameter switch in conjunction with the manual/auto switch 400, FIG. 8, could be used.

Figure 11:
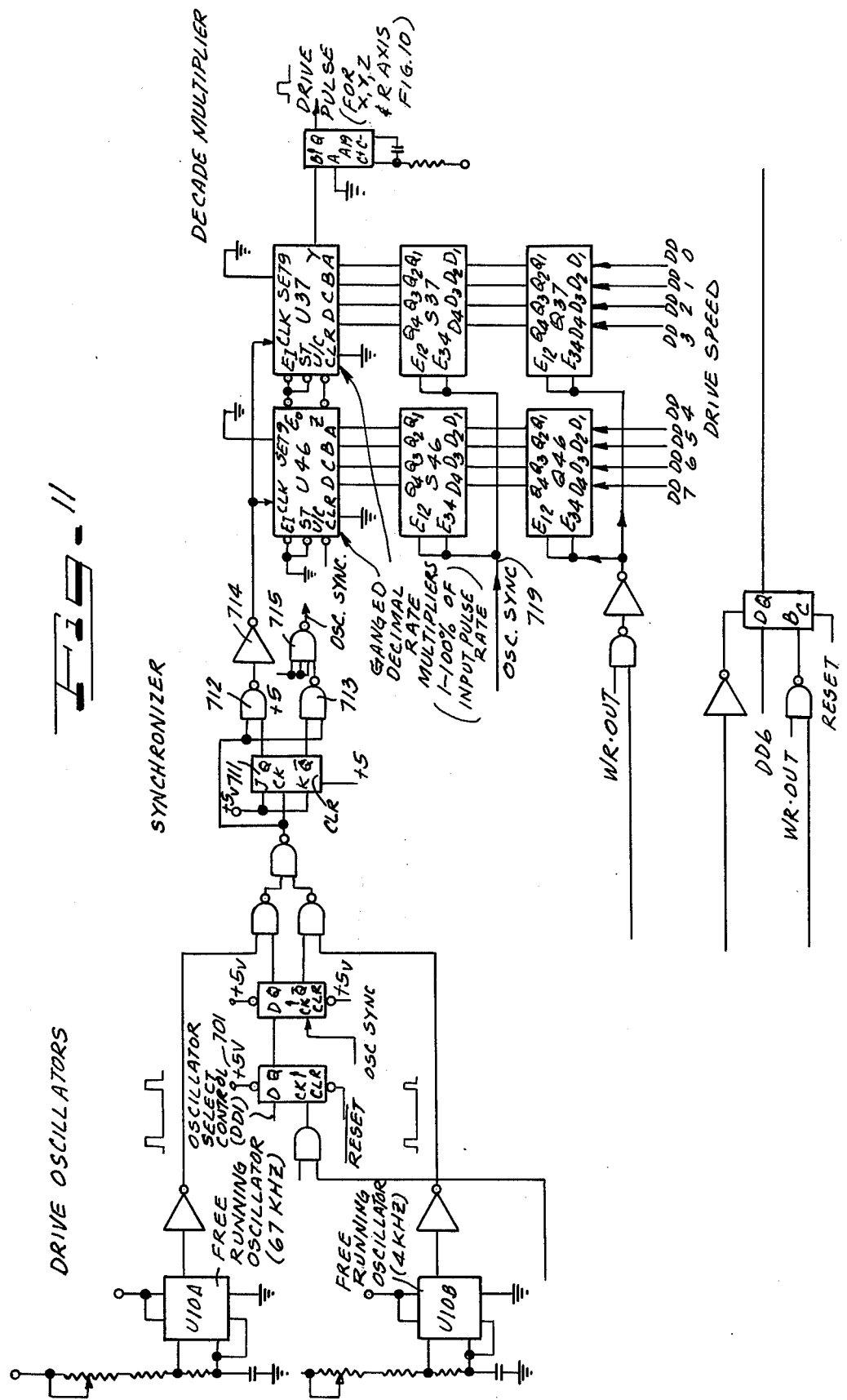
FIG. 11 is a detailed electric circuit diagram for the Indicator Buffer and Speed Control Components of the system of FIG. 9.

Once the previous move has been carried out and the calculations made for the next move as shown by the attached program, the move itself is executed as follows:

(1) Drive speed is output as an 8 bit binary-coded-decimal value from the computer 510–513, and loaded in a register Q46, Q37, in element 534, speed control, FIG. 11.

(2) An incremental move is output as a series of 8 bit binary-coded-decimal values from the computer 510–513 and loaded into the move register 532, FIG. 9

Figure 10:
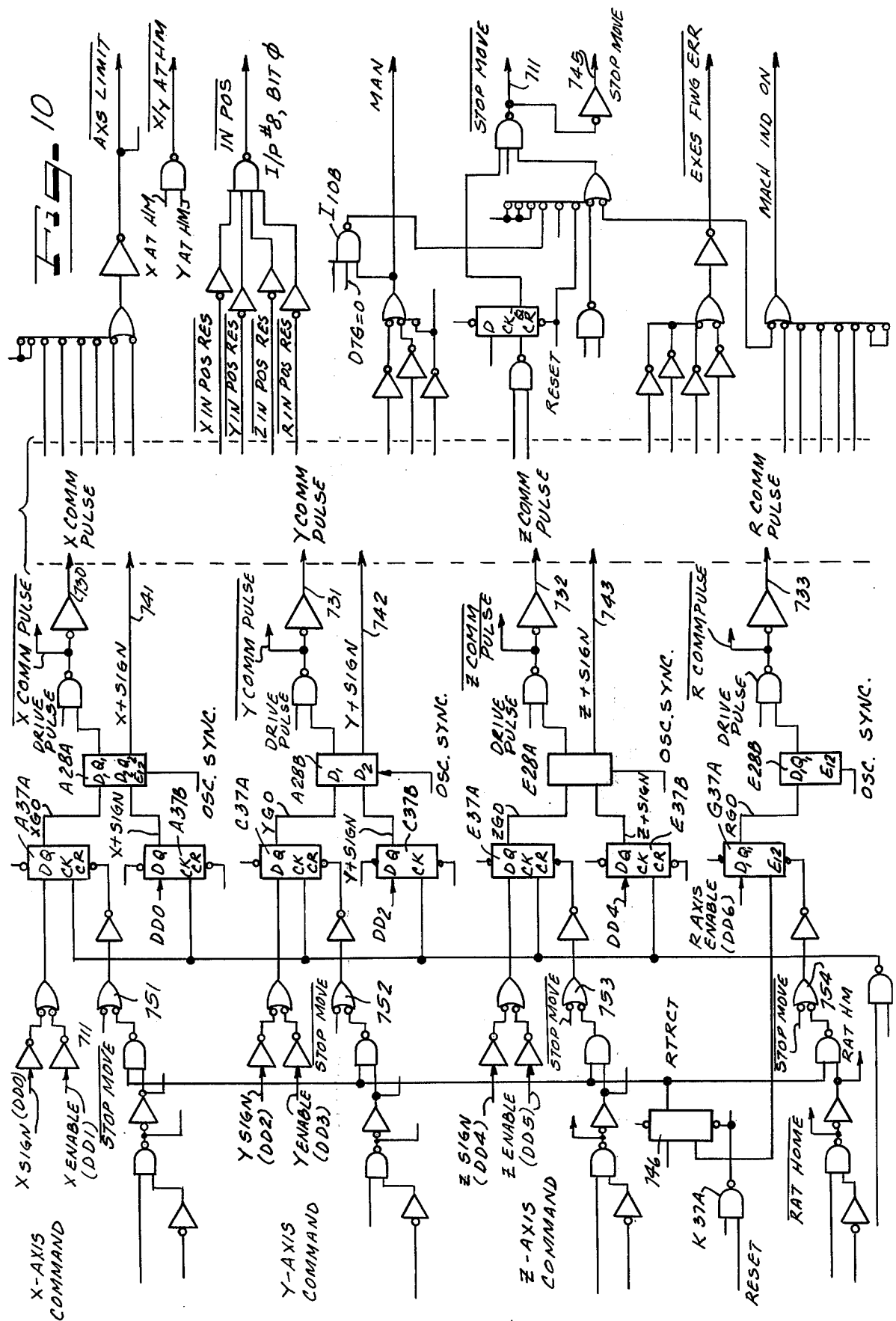
FIG. 10 is a detailed electric circuit diagram of the Steering Circuitry component of FIG. 9.

(3) A command defining axis and sign is then output to the steering circuitry 533, FIG. 10, by the computer 510–513. Assuming the machine is functioning properly, the appropriate displacement is initiated.

(4) Once the value corresponding to the position has been counted down to zero in move register 532, FIG. 9, a zero indicator is fed back to the computer 510–513 via port TBPOS, FIG. 9, and the input multiplexer 505.

(5) After a feedback signal INPOS, FIG. 10, is generated from information supplied by the active position loop of controls 551–554 indicating that the desired position has in fact been reached, a new increment may be output.

The actual operation can best be understood by first considering element 534, FIG. 9, the speed control system which is illustrated in detail in FIG. 11. Two free running oscillators U10A and U10B are required as different axes and speeds of movement require substantially different drive pulse periods. Selection of the appropriate oscillator is done under control of the computer 510–513 via means 701, FIG. 11, responsive to a signal corresponding to bit DD1 of the 8 bit input/output bus 730, FIG. 9. The output of the selected oscillator is fed through a synchronizer 711–715, FIG. 11, to insure that a speed change is not made in the middle of a pulse, resulting in pulse splitting and related inaccuracies. A synchronizing signal, OSC SYNC, is generated at the output of gate 715 and used to synchronize changes in other circuitry. The desired speed is input to the speed control 534, FIG. 9, via input/output bus lines DD0-DD7 of the DRIVE SPEED port 718, FIG. 9, and loaded into a pair of 4 bit storage resistores Q46 and Q37 of FIG. 11. This value of speed is transferred at a proper time using OSC SYNC at line 719 to a second set of registers S46, S37 which provide level inputs to a pair of ganged decimal rate multipliers U46 and U37. The output of the rate multipliers goes through a one-shot A19. The output of A19 is a standardized pulse train, DRIVE PULSE, used for the X, Y, Z and R axes. DRIVE PULSE is an input via line 720, FIG. 9, to the steering circuitry 533, FIG. 9, as is shown in the detailed circuitry for this component found in FIG. 10. Use of the decimal rate multipliers provides the operator 1–100% speed variations from the selected pulse period. Having set speed, the move register 532, FIG. 9, can be loaded with the desired displacement. The move register is composed of 6 binary-coded-decimal decade up-down counters. The move register is always counted down to zero. The move register is loaded two decades at a time and may require up to 3 load operations for a large displacement. The least significant decade of the move register represents one ten-thousandth of an inch displacement.

Since the move register can be loaded selectively by X, Y, Z or R values, it is counted down via line 722, FIG. 9, selectively by X COMM PULSE, Y COMM PULSE, R COMM PULSE or Z COMM PULSE which are generated by the steering circuity 533, FIG. 9.

The steering circuity 533, as shown in FIG. 10, receives as inputs a pair of bits for the respective active axes (one of four) on a corresponding pair of the input/output bus lines DD0-DD6 of port 724, FIG. 9, these inputs appearing at the left in FIG. 10. For the X axis, bit DD0 represents the sign bit, and bit DD1 represents the X enable bit. If the X sign bit or the X enable bit is set, the XGO flip/flop A37A is set. If the X sign bit is set, the X+SIGN flip/flop A37B is set. These outputs are synchronized with OSC SYNC AT A28A. DRIVE PULSE is ANDed with the Q side of A28A to finally produce X COMM PULSE at line 730. The two signals X COMM PULSE and X+SIGN are fed to the X axis positioning system 551 via a conductor of line 729, FIG. 9. As can be seen from FIG. 10, for each axis, except R, a sign and enable line are present. The R axis has only an enable bit DD6 as the table turns in one direction only. The sign and enable inputs are synchronized by OSC SYNC ang gated with DRIVE PULSE in each case as for the X axis to supply corresponding outputs at 731-733, respectively, which are conveyed to the respective pulse responsive controls 552, 554 and 553, FIG. 9, via respective conductors of lines 735, 737 and 739, FIG. 9. As a result, at the proper time, X, Y, Z or R displacement pulses (at one of conductors 730-733, FIG. 10) and a direction signal (at one of conductors 741-743, FIG. 10) are generated. These pulses and the polarity signal relative to the active axis are sent via lines 729, 735, 737 and 739 to the proper axis positioning system as shown in FIG. 9. The pulses are also sent to the move register (via line 722, FIG. 9) to count down the position counter. Each X, Y, Z or R command pulse counts the move register down once. When the move register goes to zero, then DTG=0 at line 740, FIG. 9, is sent to gate I10B shown centrally of the right-hand side of the steering circuitry of FIG. 10. The signal DTG=0 is composed with other signals to produce STOP MOVE at 745, at the lower right-hand side of FIG. 10. The signal STOP MOVE at 711 is fed back to each of the four GO flip/flops, specifically to gates 751-754 (shown at the lefthand part of FIG. 10), to block the generation of more displacement pulses. It should be noted that as a general rule for the illustrative embodiment herein shown by way of example, only one axis moves at any given time. It is the purpose of the steering circuit of FIG. 10 to multiplex the move register properly among the four axes.

There are miscellaneous control signals generated on or brought to the steering circuitry, such as STOP MOVE (see conductor 745, FIG. 10) which under appropriate conditions cause the current move to be terminated. Another signal is RESET (at K37A, lower left-hand corner of FIG. 10) which also terminates the current motion. RESET clears the RTRCT flip/flop 746, FIG. 10, which in turn clears the four GO flip/flops A37A, C37A, E37A and G37A. The need for these and other signals of a related type are well known and familiar to one ordinarily skilled in the art. They need not be described further.

There is in the system a second position register, the Z position register 535, FIG. 9. The purpose of the Z position register is to provide a readout of current Z axis position; or a readout of computer generated data depending on which the operator desires. The display component 760 indicated at the lower right in FIG. 9 is mounted on the front cabinet and comprises a display panel as represented at 444 at the lower right in FIG. 8.

Figure 12:
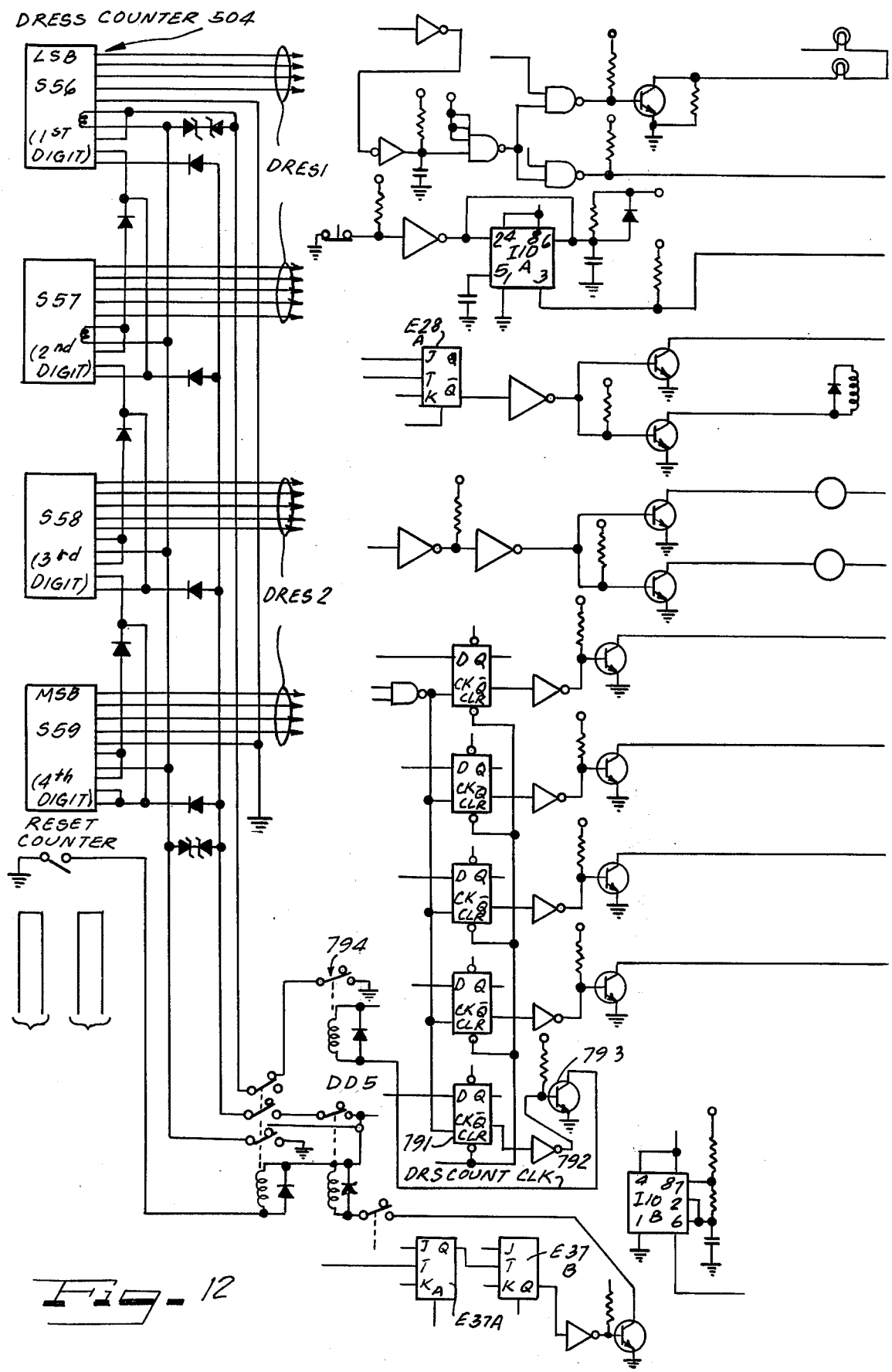
FIG. 12 is a circuit diagram showing the electrical connections to the mechanical dress cycle counter and other miscellaneous circuitry.

The machine feature control 537, represented at the lower center of FIG. 9, contains several miscellaneous control elements. The purpose of these elements is to enable or disable servo systems or brakes based on the condition of the grinder and based on what the processor system 510-513 is doing. The function and operation of these elements is well known and familiar to one ordinarily skilled in the art. They need not be described further, FIG. 12 illustrates the relationship between the dress counter 504 shown at the lower left in FIG. 9 and which has a counter panel as shown at 475 in FIG. 8, and the two 8 bit input ports DRES1 and DRES2 which are connected to the input multiplexer 505, FIG. 9.

The contents of the dress counter 504 may be read at any time by the compuer 510-513 by means of the input multiplexer 505. The dress counter can be incremented by the processor each time the wheel dress mechanism is advanced one mil. The dress counter 504 is treated as an input device for reading its contents and an output device for the purpose of incrementing its count. Signal line 790 FIG. 9 permits the computer 510-513 to output a logical one on DD5 to 791, found at the lower center of FIG. 12, which generates a signal, DRS COUNT CLK via 792 and 793. DRS COUNT CLK is fed to the incrementer 794 of the dress counter 504. After an appropriate interval of time, the processor returns and outputs a logical zero on DD5 to 791 to reset the dress counter incrementer 794.

The dresser assembly 300, FIG. 9, also is treated as both an input and output device. The computer 510-513 can request a dress cycle by sending a logical one on line DD2 to the machine feature control 537 which in turn communicates with the dresser 300. The dresser 300 feeds back, on line 800 through the machine switch filters 502, the completion of a one mil dress operation which the computer 510-513 can then detect.

SUMMARY OF OPERATION OF FIGS. 4-12

The operation of this system is best understood by first noting that in the automatic mode, four basic punch shapes are available to be selected. These are:
(1) Round
(2) Obround
(3) Square/Rectangle with square corners
(4) Square/Rectangule with rounded corner. To carry out a cutting sequence, the tool blank 288, FIGS. 3A and 4, is first mounted on the X slide 270, FIG. 4. The operator then selects which shape is desired using the manual-auto select switch 400, FIG. 8, or by entering the command for a standard size. If the desired shape is not round, and if a standard size has not been called, the operator must specify one-half of the linear length (excluding any length involving a curved corner or end, i.e. a non-zero radius) in the one-half X size switches 420 and one-half of the linear width in the one-half Y size switches 421. (By definition for the obround shape this latter dimension must be set equal to zero.) If the shape has a radius, it is specified in the Z size point switches 423. For a round punch, the X and Y size switches must be set to zero. Additionally, the depth of cut at any one pass, the Z feed increment 424, must be set as well as R, X/Y and Z feed rates 441, 442, 443. Also, one-half of the width of the blank size or the radius of the blank size must be set in the one-half blank size switch 422.

Once the dimensions and feed rates are specified, the X enter and move push buttom 431 is depressed. If one-half of the X displacement is non-zero, the tool blank 288, FIG. 3A, is moved the amount specified on the X switches and the light 432, FIG. 8, is then energized. A similar sequence is executed for the Y switches 421, the Y enter move push button 433 and associated light 434. The tool blank is moved in the positive X and negative Y directions. The operator then depresses the cycle start button 454 and the automatic grinding cycle commences.

The cycles commence with the rotary table 260 being rapidly moved by means of the Z axis slide 182 until the tool blank 288 is positioned so that the grinding wheel 110 reaches a point which would be just touching the tool blank 288 if the blank were cylindrical. This calculation takes into accounting the setting of the wheel offset 474, FIG. 8, and the count of the dress counter 504, FIG. 9. At that point the one-half blank size light 435 is energized and the machine commences feed of the blank 288 at the Z feed rate set by switch 443, FIG.

8. The rotary table 212 is moved toward the grinding wheel an amount equal to the Z feed increment 424. At this point, if a round shape has been selected, the X and Y displacements have been set to zero and the center of the tool blank is over the center of rotation of the table. The actual direction of rotation of the grinding wheel 110 is counterclockwise as indicated by element 111. The table 212 starts to rotate counterclockwise causing the grinding wheel to cut into the tool blank and grind a circular cross section.

After one complete revolution, if the auto dress switch 471 has been depressed, the processor executes a dress cycle based on the setting of the dress increment switch 472. The dress counter 475 is also incremented properly.

At the completion of the dress cycle, the rotary table 212 is moved by means of Z slide 182 toward the grinding wheel 10 an amount equal to the dress increment plus the feed increment and again rotated 360°. This process repeats until the computer determines that the tool has been ground to the desired final radius at which point it terminates. After the last grinding cycle, the Z axis slide together with the rotary table moves to home position before the final dress cycle is initiated. It should be noted that the center of curvature of the desired tool blanks always coincides with the center of rotation of the rotary table 16.

Grinding of other shapes is similar except that linear and rotary motions are required. This can best be seen by considering the production of an obround shape. The obround tool has a linear length X and width 2R with two semicircles at each end of radius R. The total length of the tool can be seen to be X+2R. The Y dimension is by definition set to zero and the radius is entered into the Z size point switches 423. In this case, upon pressing the X enter move button 431, a positive displacement of one-half X occurs. The center of one end semicircle (of the final obround shape) is now over the axis of rotation of the rotary table 212. The first move of the grinding cycle is a linear move along the X axis (in the minus X direction). The second move is a 180° counterclockwise rotation of the table. The third move is a linear move along the X axis (in the plus X direction). The fourth move is another 180° counterclockwise rotaton and the grinding wheel is back to its starting point. At each rotation, the center of curvature of the semicircle to be ultimately formed is over the center of rotation of the rotary table 16. A dress cycle would be automatically executed followed by another cutting cycle until the tool blank had achieved the desired size.

A square or rectangular shape results from motions along the X and Y axes separated by 90° rotations. In this case, the Z size point 423 is set to zero resulting in square corners.

To produce a square or rectangle with a corner having a non-zero radius, the Z size point 423 is set to the value of that radius. The ½ X and ½ Y size switches 420, 421 are set to one-half the distances between the centers of curvature such as 801-804, FIG. 3A, of the corners. The X and Y motions are the same as for the case of no corners except that the X and Y motions take place between the centers of curvature of the final shape 815 (such as from 801 to 802, FIG. 3A) of the radius specified by the Z size point 423. In this case, similarly to the case of obround shapes, during each rotation of the table, the tool blank is positioned by the X and Y slides so that the center of curvature (such as 801, 802, 803 and 804) of the desired corner is over the center of rotation of the rotary table.

The operational sequence is as follows:

(1) Move positive X and negative Y the amount specified by the one-half X and one-half Y switches 432, 434 of FIG. 8. After this translation the axis of rotation of the table coincides with the center of the radius of curvature 801 of FIG. 3A.

(2) The grinding wheel 10 is relatively moved into the tool blank by the magnitude of the Z feed increment 424, FIG. 8.

(3) The tool blank 288 is then moved in the negative X direction counter to the direction of rotation of the grinder an amount twice that set in the one-half X switches. After the X move, the center of rotation of the table 212 coincides with the center of the next radius of curvature 802, FIG. 3A on the tool blank.

(4) A 90° counterclockwise rotation of the table commences forming a first curvature 818.

(5) The tool blank is then moved linearly an amount equal to twice the setting of the one-half Y switches 421, FIG. 8. After this move, the third center of curvature 803, FIG. 3A, coincides with the axis of rotation of the table 212.

(6) A 90° counterclockwise rotation of the table 16 is then made forming the next corner.

(7) This process is repeated for the remaining two corners having centers of curvature 804 and 801.

(8) After the pass around the tool blank is completed a dress cycle can be executed if the auto dress button 471, FIG. 8, has been depressed.

(9) The process is reinitiated at step (2) for the next pass, with account being taken of any dress cycle.

If the excess of the length of the blank 288, over the final tool size 815, as indicated at G in FIG. 3A, should exceed the value F, the one-half blank size value entered at 422 in FIG. 8 is increased by the operator by such difference, for the specific machine which has been successfully operated.

Referring to FIG. 3A, it will be understood that with the type of operation described for FIGS. 1–3, the initial position of the rotary table axis would be offset inwardly of an edge portion 810 of the tool blank 288, FIG. 3A, and would underlie a point 811, FIG. 3A, on the work 288. The initial X axis move would shift the work 288 so that point 818 would overlie the table axis. Rotation of the table would then produce a rounded corner with its center at 818. On the other hand, with the simplified operation actually employed with the embodiment of FIGS. 3A and 4—12, the rotary table axis is initially at 801, and the initial X-move shifts the work so that point 802 overlies the table axis. The rotary table rotational movement then produces a rounded corner as indicated at 820. Again, however, the rotary table axis is located inwardly of the edge portion 810 of the tool blank which is to be removed during the associated grinding cycle.

The preferred mode as disclosed herein is suitable for use as a special purpose production machine for producing a given high volume part of particular dimensions.

It will be apparent that many modifications and variations may be effected without departing from the scope of the novel concepts of the present invention.

APPENDIX

The following is a listing of an exemplary control program stored in memory 512, FIG. 9, for a shape grinder system now in production operation for producing punching tools of obround and rectilinear shape and a range of sizes. Said program is stored in read-only memory. With the use of a non-erasable read-only memory, the program becomes a part of the wired hardware of the control system.

```
         October 9, 1975, Version B
;
;PUNCH GRINDER
;
;SYMBOL TABLE
;
;BLSZ    17D
;
;CONS1   5
;CONS2   25H
;CONS3   15H
;CONS4   5
;CPUDS1  3
;CTRSW   2
;
;DRIVS   10D
;DRSINC  29D
;DSST1   125D
;DSST2   50D
;DRES1   30D
;DRES2   31D
;
;FDINC   20D
;FNCTR   7
;
;GATE0   00000001B
;GATE1   00000010B
;GATE2   00000100B
;GATE3   00001000B
;GATE4   00010000B
;GATE5   00100000B
;GATE6   01000000B
;GATE7   10000000B
;
;INPOS   8
;
;JOGPB   7
;
;LITE1   6
;
;MVCT1   8
;MVCT2   9
;MODE    6
;MCSW1   3
;MCSW2   4
;MVRG1   11D
;MVRG2   12D
;MVRG3   13D
;MSK0    11111110B
;MSK1    11111101B
;
;SYMBOL TABLE CONTINUE
;
;MSK2    11111011B
;MSK3    11110111B
;MSK4    11101111B
;MSK5    11011111B
;MSK6    10111111B
;MSK7    01111111B
;
;PZLD1   0
;
;RRATE   26D
;
;TOTDIS  00,00,27
;TBPOS   5
;
```

```
;WLSIZE 50H,00,12H
;WLOFST 28D
;
;XYRATE 25D
;XSIZE  11D
;
;YSIZE  14D
;
;ZRATE  27D
;ZSZPT  22D
;
;
;
;PUNCH GRINDER
;
;RAM STORAGE
;============
;L1BYT  1000H    <4096D
;MVCTBT 1001H
;TMPBT  1002H
;FLGBT  1003H
;FNBYT  1004H
;DHWBT  1005H
;ZPSBT  1008H
;ZSZBT  100BH
;XSZBT  100EH
;YSZBT  1011H
;BLSBT  1014H
;FEEDBT 1017H
;MOVEBT 101AH
;TEMP1  101DH
;TEMP2  1020H
;
;TOTAL 35 MEMORY LOCATIONS
;ARE NEEDED FOR TEMPORARY STORAGE.
;
;MAXIMUM OF 24 STACK LEVELS
;ARE NEEDED TO IMPLEMENT ALL SUBROUTINES.
;
;STACK  L1BYT+254D       <TOP OF AVAILABLE RAM
;
;MEMORY MAPPING
;==============
;L1BYT  B0-CYCLE START
;       B1-FEED HLD
;       B2-DATA ENTER ERROR
;       B3-X SIZE
;       B4-Y SIZE
;       B5-BLANK SIZE
;       B6-Z IN FLASH
;       B7-Z HOME FLASH
;
;MVCTBT B0-X GO,X+SIGN
;       B1-X GO,X-SIGN
;       B2-Y GO,Y+SIGN
;       B3-Y GO,Y-SIGN
;       B4-Z GO,Z+SIGN(OUT)
;       B5-Z GO(IN)
;       B6-R GO,CCW
;       B7-AXES RETRACT
;
;MEMORY MAPPING CONTINUE
;=======================
;FLGBT  B0-DISABLE STOP SIGNAL(O/P CONTROL)
;       B1-OSC SELECT,1=HIGH FREQ (O/P CONTROL)
;       B2-LAST PASS FLAG
;       B3-
;       B4-
;       B5-
;       B6-
;       B7-EMERGENCY RETRACT
;
;FNBYT  B0-
;       B1-R HYDRAULIC BRAKE RELEASE(TRIAC)
;       B2-DRESS ENABLE(TRIAC)
```

```
;           B3-5 SEC DRESS(TRIAC)
;           B4-OPTION(TRIAC)
;           B5-DRESS COUNT CLK
;           B6-DRESS 1 COUNT(CLR)
;           B7-
;
;INPUT PORTS MAPPING
;===================
;MODE      B0-.0001 INC
;          B1-.001 INC
;          B2-MAN FEED
;          B3-OBROUND
;          B4-SQ/REC
;          B5-ROUND
;          B6-AUTO DRESS
;          B7-NEW WHEEL DRESS
;
;JOGPB     B0-X PLUS
;          B1-X MINUS
;          B2-Y PLUS
;          B3-Y MINUS
;          B4-Z OUT
;          B5-Z IN
;          B6-R CCW
;          B7-Z TO HOME
;
;CTRSW     B0-R TO HOME
;          B1-X/Y TO HOME
;          B2-X OFFSET
;          B3-Y OFFSET
;          B4-CYCLE START
;          B5-FEED HOLD
;          B6-EMR Z RETRACT
;          B7-SERVO ON RELAY SF
;
;
;I/P PORTS MAPPING COTINUE
;=========================
;MCSW1     B0-X+O.T SF/
;          B1-X-O.T SF/
;          B2-X ZERO SF/
;          B3-Y+O.T SF/
;          B4-Y-O.T SF/
;          B5-Y ZERO SF/
;          B6-R SLO DN SF/
;          B7-R ZERO SF/
;
;MCSW2     B0-Z+O.T SF/
;          B1-Z-O.T SF/
;          B2-Z SLO DN SF/
;          B3-Z ZERO SF/
;          B4-DRESS CYCLE ON SF
;          B5-R BRAKE ON SF
;          B6-DRESS 1 COUNT
;          B7-MACHINE INDICATOR ON
;
;TBPOS     B0-X AT HOME/
;          B1-Y AT HOME/
;          B2-Z AT HOME/
;          B3-R AT HOME/
;          B4-AXES LIMIT/
;          B5-STOP MOVE
;          B6-DTG=0
;          B7-EXES FWG ERR/
;
;
;
;PUNCH GRINDER
;
;SUBROUTINE LIST
;
;NAME      ADDRESS  PAGE #
;====      =======  ======
;ATODRS    05B5H    15
;ATOND     0952     29
```

```
;ATOLP   00E7    4
;
;BRAKNO  0B67   41
;BRAKON  0B41   40
;
;CYCLE   06A1   18
;CYCLR   0959   29
;CYFIN   06B0   26
;
;DHMWL   0A79   35
;DLY1S   0414    8
;DLY12   0400    8
;DLY3S   0420    8
;DL13S   042C    9
;DRSAUX  0592   14
;DCADD   09DC   32
;DCSUB   09F0   33
;
;ERRL2   0768   21
;ERRNO   00B5    3
;ERRGO   00A9    3
;ENTR1   0673   17
;ENTR2   0684   18
;ENTRX   05FF   16
;ENTRY   0639   17
;
;HMAUX   0521   12
;HLDLGO  0B13   38
;HLDLNO  0B1F   38
;
;JOG     00FD    5
;
;LPASS   090F   28
;LDTMP   09CB   32
;LDISP   09BD   31
;
;MVCLR   0968   29
;MVHLD   0972   29
;MALFN   0B8A   41
;MANFD   00C1    4
;
;
;SUBROUTINE LIST CONTINUE
;
;NAME    ADDRESS PAGE #
;====    ======= ======
;MANLP   00C9    4
;MOVLD   0A0A   34
;MONIT   068C   18
;
;NULL1   0A6B   35
;NWLDR   0531   13
;
;OSC2K   0A26   34
;OBRND   0810   24
;
;PASFLG  08FD   27
;PZLD    08EC   27
;
;RGO     0ADC   37
;RHOME   0483   10
;RGRIND  0868   26
;ROUND   076E   22
;
;SPB     018D    7
;SRVO    0BA4   42
;SQREC   07A3   22
;
;XYNULL  0A32   34
;XGRIND  0862   25
;XGOMS   0AF2   37
;XGOPS   0AE7   37
;XYHOM   04CC   11
;
```

```
                    ;YGOMS   0B08    38
                    ;YGOPS   0AFD    38
                    ;
                    ;ZHOME   0438    9
                    ;ZROCK   09AD    31           5
                    ;ZGOIN   0B2B    39
                    ;ZGOOUT  0B36    40
                    ;ZBITE   0845    25
                    ;
                    ;
                    ;                     10
                    ;
                    ;PUNCH GRINDER
                    ;
                    ;INTERRUPT ORGANIZATION
                    ;======================
                    ;
                    ;RESET P.B CAUSES JUMP TO BEGINNING
                    ;OF PROGRAM.
                    ;
0000                        ORG     0
0000 C31D00                 JMP     PROG
                    ;
                    ;RESTART 1 INTERRUPT CAUSES JUMP
                    ;TO CONTROL PANEL MONITOR
                    ;
0003                        ORG     8
0008 FB                     EI
0009 C30003                 JMP     300H        ;ADDR OF MONITOR
                    ;
                    ;RESTART 2 INTERRUPT IS EMERGENCY RETRACT.
                    ;
                    ;
                    ;
                    ;PUNCH GRINDER SHT 0    OCT 9 75
                    ;
                    ;SYMBOL TABLE
                    ;
000C                        ORG     10H         ;16D
0002                CTRSW   EQU     2
000A                DRIVS   EQU     10D
0001                GATE0   EQU     00000001B
0004                GATE2   EQU     00000100B
0008                GATE3   EQU     00001000B
0010                GATE4   EQU     00010000B
0020                GATE5   EQU     00100000B
0040                GATE6   EQU     01000000B
0080                GATE7   EQU     10000000B
0007                JOGPB   EQU     7
0006                LITE1   EQU     6
0008                MVCT1   EQU     8
0009                MVCT2   EQU     9
0006                MODE    EQU     6
0004                MCSW2   EQU     4
000B                MVRG1   EQU     11D
000C                MVRG2   EQU     12D
000D                MVRG3   EQU     13D
00FB                MSK2    EQU     11111011B
00BF                MSK6    EQU     10111111B
007F                MSK7    EQU     01111111B
0005                TBPOS   EQU     5
1000                L1BYT   EQU     1000H       ;LITE1 STATUS ADDR (4096D)
1001                MVCTBT  EQU     L1BYT+1 ;MOVE CTRL 1 ADDR
1003                FLGBT   EQU     L1BYT+3 ;FLAG BYTE
                    ;
10FE                STACK   EQU     L1BYT+254D ;SP LOCATION
                    ;
                    ;
                    ;
                    ;PUNCH GRINDER SHT 0A
                    ;                           65
0B67                BRAKNO  EQU     0B67H
06A1                CYCLE   EQU     06A1H
0414                DLY1S   EQU     0414H
05FF                ENTHX   EQU     05FFH
```

```
0639            ENTRY   EQU     0639H
0521            HMAUX   EQU     0521H
0B8A            MALFN   EQU     0B8AH
0972            MVHLD   EQU     0972H
0968            MVCLR   EQU     0968H
0531            NWLDR   EQU     0531H
0483            RHOME   EQU     0483H
04CC            XYHOM   EQU     04CCH
0438            ZHOME   EQU     0438H
                ;
                ;
                ;
                ;PUNCH GRINDER, SHT 1   OCT 9 75
                ;
                ;EMERGENCY RETRACT (RTN)
                ;
                RTRCT:
0010 CD6809             CALL    MVCLR   ;STOP MOVE
0013 210310             LXI     H,FLGBT
0016 7E                 MOV     A,M     ;GET FLAG BYTE
0017 F681               ORI     GATE7 OR GATE0 ;SET EMERGENCY RETRACT FL
0019 77                 MOV     M,A     ;AND DISABLE STOP SIGNAL.
001A CD3804             CALL    ZHOME   ;GOTO HOME
                ;
                ;PROGRAM INITIATION
                ;
                PROG:
001D FB                 EI              ;ENABLE INTERRUPT
001E 31FE10             LXI     SP,STACK
0021 210010             LXI     H,L1BYT
0024 06FF               MVI     B,0FFH  ;CLR 256 MEMORY LOCATIONS
                CLEAR:
0026 AF                 XRA     A
0027 77                 MOV     M,A
0028 23                 INX     H
0029 05                 DCR     B
002A C22600             JNZ     CLEAR
                ;
                ;AT START UP CAN ONLY SELECT "MAN FEED",
                ;"JOG Z IN" IF TABLE AT ZERO AND "Z AXIS HOME"
                ;ERROR LITE GOES ON IF MODE SELECTOR IS NOT SET
                ;ON "MAN FEED". "Z IN" FLASH LITE GOES ON WHEN
                ;Z AXIS AT ZERO."Z AXIS HOME" FLASH GOES ON
                ;TO IDENTIFY DESIRED COMMAND.
                ;
                START:
002D DB06               IN      MODE    ;CHECK MODE SELECTED
002F E63F               ANI     00111111B;ELIMINATE AUTO DRESS&NEW WHL D
0031 CD8D01             CALL    SPB     ;ONLY 1 P.B ?
0034 C28700             JNZ     ERRL1   ;NO,GO TO ERROR LITE
0037 E604               ANI     GATE2   ;YES.MAN FEED ?
0039 CA8700             JZ      ERRL1   ;NO,GO TO ERROR LITE
003C CDB500             CALL    ERRNO   ;YES,TURN ERROR LITE OFF
                ZJG:
003F DB04               IN      MCSW2   ;IN MACHINE SW.
0041 2F                 CMA             ;COMPLEMENT INPUT
0042 E60D               ANI     00001101B;Z AXIS IN ZERO ?
0044 C28D00             JNZ     JOGZ    ;YES,GO TO JOG Z
                ;
                ;
                ;SHT 2
                ;
                ;TURN Z IN FLASH OFF & Z AXIS HOME FLASH ON
                ;
                ZSHUT:
0047 DB04               IN      MCSW2   ;NO.
0049 2F                 CMA
004A E60D               ANI     00001101B ;Z AXIS IN ZERO ?
004C C24700             JNZ     ZSHUT   ;YES.WAIT
004F AF                 XRA     A
0050 D308               OUT     MVCT1   ;STOP MOVE
0052 210010             LXI     H,L1BYT
0055 7E                 MOV     A,M     ;GET LITE BYTE
0056 E6BF               ANI     MSK6    ;TURN Z IN FLASH OFF
0058 F680               ORI     GATE7   ;TURN Z AXIS HM FLASH ON
```

```
005A 77                       MOV     M,A       ;STORE LITE BYTE
005B D306                     OUT     LITE1
                              ;INITIATE FIRST Z AXIS HOME
                              ;
                              ZHM:
005D CDC100                   CALL    MANFD     ;IN MAN FEED ?
0060 D25D00                   JNC     ZHM       ;NO,WAIT
0063 DB07                     IN      JOGPB     ;YES
0065 E680                     ANI     GATE7     ;Z TO HOME P.B ?
0067 CA5D00                   JZ      ZHM       ;NO,WAIT
006A CD3804                   CALL    ZHOME     ;YES,GO TO Z RTRCT RTN
                              ;
                              ;TURN Z AXIS HOME FLASH OFF
                              ;
006D 210010                   LXI     H,L1BYT
0070 7E                       MOV     A,M       ;GET LITE BYTE
0071 E67F                     ANI     MSK7      ;TURN Z AXIS HM FLASH OFF
0073 77                       MOV     M,A       ;STORE LITE BYTE
0074 D306                     OUT     LITE1
                              ;
                              ;
                              ;MODE SELECT LOOP
                              ;
                              MAIN:
0076 DB06                     IN      MODE      ;GET "MODE" STATUS
0078 E607                     ANI     00000111B ;IS MANUAL ?
007A C4C900                   CNZ     MANLP     ;YES,GOTO MAN LOOP RTN
007D DB06                     IN      MODE      ;NO. AUTO MODE ?
007F E638                     ANI     GATE3 OR GATE4 OR GATE5
0081 C4E700                   CNZ     ATOLP     ;YES. GOTO RTN
0084 C37600                   JMP     MAIN      ;NO.RETURN TO MAIN
                              ;
                              ;
                              ;
                              ;SHT_3
                              ;
                              ERRL1:
0087 CDA900                   CALL    ERRGO
008A C32D00                   JMP     START
                              ;
                              ;Z JOG INWARD AFTER TURN ON WHEN Z AXIS IS AT ZERO.
                              ;
                              JOGZ:
008D 210010                   LXI     H,L1BYT   ;ADDRESS OF LITE 1 BYTE
0090 7E                       MOV     A,M       ;GET LITE BYTE
0091 F640                     ORI     GATE6     ;SET Z IN FLASH ON
0093 D306                     OUT     LITE1     ;LITE 1 O/P PORT
0095 3E02                     MVI     A,2H      ;OSC SELECT=33.3 KHZ
0097 D309                     OUT     MVCT2     ;OSC O/P PORT
0099 3E25                     MVI     A,25H     ;SET DRIVE SPEED=50 IPM
009B D30A                     OUT     DRIVS     ;DRIVE SPEED O/P PORT
                              LP4:
009D DB07                     IN      JOGPB
009F E620                     ANI     GATE5     ;Z IN P.B ?
00A1 CA9D00                   JZ      LP4       ;NO,WAIT FOR Z IN P.B
00A4 D308                     OUT     MVCT1     ;YES,SET Z GO INWARD
00A6 C34700                   JMP     ZSHUT     ;RETURN TO MAIN PROGRAM
                              ;
                              ;DATA ENTER ERROR LIGHT ON (RTN)
                              ;
                              ERRGO:
00A9 E5                       PUSH    H
00AA 210010                   LXI     H,L1BYT   ;ADDR OF LITE1 BYTE
00AD 7E                       MOV     A,M
00AE F604                     ORI     GATE2     ;"DATA ERROR" LT ON
00B0 77                       MOV     M,A
00B1 D306                     OUT     LITE1
00B3 E1                       POP     H
00B4 C9                       RET
                              ;
                              ;DATA ENTER ERROR LIGHT OFF (RTN)
                              ;
                              ERRNO:
00B5 E5                       PUSH    H
00B6 210010                   LXI     H,L1BYT
```

```
00B9 7E              MOV      A,M         ;GET LITE STATUS
00BA E6FB            ANI      MSK2        ;"DATA ERROR" LT OFF
00BC 77              MOV      M,A
00BD D306            OUT      LITE1
00BF E1              POP      H
00C0 C9              RET
                ;
                ;
                ;SHT 4
                ;
                ;CHECK FOR MANUAL FEED MODE (RTN)
                ;
                ;IF CARRY=1 IN MANUAL FEED.
                ;
                MANFD:
00C1 AF              XRA      A
00C2 DB06            IN       MODE        ;GET MODE STATUS
00C4 E604            ANI      GATE2       ;IN MAN FEED ?
00C6 C8              RZ                   ;NO.CARRY=0,RETURN
00C7 37              STC                  ;YES.SET CARRY
00C8 C9              RET
                ;
                ;MANUAL MODE FUNCTIONS (RTN)
                ;
                MANLP:
00C9 DB07            IN       JOGPB       ;GET JOG STATUS
00CB E67F            ANI      MSK7        ;IS JOG P.B ?
00CD C4FD00          CNZ      JOG         ;YES.GOTO JOG RTN
00D0 DB07            IN       JOGPB       ;NO.
00D2 07              RLC                  ;Z AXIS HOME P.B ?
00D3 DC3804          CC       ZHOME       ;YES.GOTO HOME RTN
00D6 DB02            IN       CTRSW       ;NO.GET CTRL SWITCH STATUS
00D8 0F              RRC                  ;R AXIS HOME P.B ?
00D9 DC8304          CC       RHOME       ;YES.GOTO R HOME RTN
00DC 0F              RRC                  ;NO.X/Y AXES HOME P.B ?
00DD DCCC04          CC       XYHOM       ;YES.GOTO X/Y HOME RTN
00E0 DB06            IN       MODE        ;NO.
00E2 07              RLC                  ;NEW WHEEL DRESS ?
00E3 DC3105          CC       NWLDR       ;YES.GOTO WHEEL DRESS RTN
00E6 C9              RET                  ;NO.
                ;
                ;AUTO MODE COMMANDS (RTN)
                ;
                ATOLP:
00E7 DB02            IN       CTRSW
00E9 E604            ANI      GATE2       ;X OFFSET P.B ?
00EB C4FF05          CNZ      ENTRX       ;YES. ENTER X OFFSET
00EE DB02            IN       CTRSW       ;NO.
00F0 E608            ANI      GATE3       ;Y OFFSET P.B ?
00F2 C43906          CNZ      ENTRY       ;YES.ENTER Y OFFSET
00F5 DB02            IN       CTRSW       ;NO.
00F7 E610            ANI      GATE4       ;CYCLE START P.B ?
00F9 C4A106          CNZ      CYCLE       ;YES.GOTO CYCLE
00FC C9              RET                  ;NO.
                ;
                ;
                ;SHT 5
                ;
                ;MANUAL JOG (RTN)
                ;
                JOG:
00FD D5              PUSH     D
00FE E5              PUSH     H
                JOGLP:
00FF DB07            IN       JOGPB
0101 E67F            ANI      7FH         ;ELIMINATE Z AXIS HOME P.B
0103 57              MOV      D,A         ;D=JOGPB
0104 FE00            CPI      0           ;ANY P.B DEPRESSED?
0106 EA8701          JPE      STPMV       ;NO. GO TO STOP MOVE (PARITY=1)
0109 CD8D01          CALL     SPB         ;YES.ONLY 1 P.B ?
010C C2FF00          JNZ      JOGLP       ;NO,GO BACK
010F CD2105          CALL     HMAUX       ;YES.OSC=33.3KHZ
0112 1E00            MVI      E,0         ;NO INCREMENTS IN MVRG
0114 DB06            IN       MODE
0116 0F              RRC                  ;.0001 INC?
```

```
0117 DA7501          JC      LD1         ;YES,MVRG=.0001
011A 0F              RRC                 ;NO,.001 INC ?
011B DA7901          JC      LD2         ;YES,MVRG=.001
011E 0F              RRC                 ;NO
011F D28701          JNC     STPMV       ;MAN FEED ?,NO,STOP MOVE
             LP1:
0122 7A              MOV     A,D         ;YES,A=JOGPB
0123 E640            ANI     40H         ;R JOG P.B?
0125 CA3C01          JZ      LP2         ;NO
0128 3E99            MVI     A,99H       ;YES,MVRG=044999=90 DEG MOVE
012A D30B            OUT     MVRG1
012C 3E49            MVI     A,49H
012E D30C            OUT     MVRG2
0130 3E04            MVI     A,04H
0132 D30D            OUT     MVRG3
0134 CD670B          CALL    BRAKNO      ;IS BRAKE RELEASED ?
0137 DC8A0B          CC      MALFN       ;NO,TRUBLE !
013A 1E01            MVI     E,01H       ;YES,INCREMENT IN MOVE REG
             LP2:
013C 7A              MOV     A,D
013D E60F            ANI     0FH         ;R OR Z AXIS ?
013F CA4901          JZ      LD3         ;YES,JUMP
0142 3E30            MVI     A,30H       ;NO,IT'S X OR Y
0144 D30A            OUT     DRIVS       ;DRIVE SPD=60 IPM
0146 C34D01          JMP     GO
             LD3:
0149 3E60            MVI     A,60H
014B D30A            OUT     DRIVS       ;DRIVE SPD=200 IPM
             ;
             ;
             ;SHT 6
             ;
             GO:
014D 7A              MOV     A,D
014E D308            OUT     MVCT1       ;DIRECTION&GO
0150 7B              MOV     A,E         ;E DETERMINES JOG NO JOG
0151 0F              RRC                 ;JOG?
0152 D2FF00          JNC     JOGLP       ;YES,GO TO BEGIN
0155 210110          LXI     H,MVCTBT    ;NO,IT'S INC (BIT 6=DTG)
0158 72              MOV     M,D         ;STORE MOVE DIRECTION
             LP3:
0159 CD7209          CALL    MVHLD       ;CHECK FEED HOLD
015C DB05            IN      TBPOS
015E 07              RLC                 ;DTG=0 ?
015F 07              RLC
0160 D25901          JNC     LP3         ;NO,WAIT
0163 CD6809          CALL    MVCLR       ;YES,CLR MOVE COMMAND
             ;
             ;REMOVE SEMI COLON IF BRAKE IS USED
             ;
             ;       CALL    BRAKON      ;SET BRAKE ON,BRAKE ENGAGED ?
             ;       CC      MALFN       ;NO,TRUBLE !
             L1:
0166 CD1404          CALL    DLY1S       ;YES,WAIT 1/2 SEC
0169 DB07            IN      JOGPB
016B E67F            ANI     7FH         ;ELIMINATE Z AXIS HOME P.B
016D FE00            CPI     0           ;P.B STILL DEPRESSED ?
016F C26601          JNZ     L1          ;YES,WAIT
0172 C3FF00          JMP     JOGLP       ;NO,RETURN TO BEGINNING
             LD1:
0175 AF              XRA     A
0176 C37B01          JMP     OUTPT       ;MVRG=.0001 INC
             LD2:
0179 3E09            MVI     A,9H        ;MVRG=.001 INC
             OUTPT:
017B D30B            OUT     MVRG1
017D AF              XRA     A
017E D30C            OUT     MVRG2
0180 D30D            OUT     MVRG3
0182 1E01            MVI     E,01H
0184 C32201          JMP     LP1
             STPMV:
0187 AF              XRA     A
0188 D308            OUT     MVCT1       ;STOP MOVE
```

```
018A E1                 POP     H
018B D1                 POP     D
018C C9                 RET
                ;
                ;
                ;SHT 7
                ;
                ;TEST FOR SINGLE P.B (RTN)
                ;
                ;REG A HAS DATA FOR RTN
                ;
                SPB:
018D C5                 PUSH    B
018E 0609               MVI     B,9H        ;RTN CALLED WHEN ONE OR
0190 0E00               MVI     C,0         ;MORE P.B'S ACTIVE.
                LOOP1:                      ;IF C=0 ONLY 1 P.B ACTIVE
0192 05                 DCR     B
0193 CA9E01             JZ      LOOP2
0196 07                 RLC                 ;PUT BIT IN CARRY.BIT=0 ?
0197 D29201             JNC     LOOP1       ;YES.JUMP
019A 0C                 INR     C           ;NO.
019B C39201             JMP     LOOP1
                LOOP2:
019E 0D                 DCR     C
019F C1                 POP     B
01A0 C9                 RET
                ;
                ;
                ;
0000            END
```

P=3

```
:03000000C31D001D
:04000800FBC3000333
:10001000CD680921031D7EF68177CD3804FB31FECF
:10002000102101006FFAF772305C22600DB06E68D
:100030003FCD8D01C28700E604CA8700CDB500DB45
:1000400000042FE60DC28D00DB042FE60DC24700AF82
:100050000D3082100107EE6BFF68077D306CDC1001D
:100060000D25D00DB07E680CA5D00CD3804210010B8
:100070007EE67F77D306DB06E607C4C900DB06E62B
:1000800038C4E700C37600CDA900C32D00210010BD
:100090007EF64D3063E02D3093E25D30ADB07E6AF
:1000A00020CA9D00D308C34700E52100107EF60456
:1000B00077D306E1C9E52100107EE6FB77D306E1A0
:1000C000C9AFDB06E604C837C9DB07E67FC4FD001D
:1000D000DB0707DC3804DB020FDC83040FDCCC0415
:1000E000DB0607DC3105C9DB02E604C4FF05DB02E1
:1000F000E608C43906DB02E610C4A106C9D5E5DB73
:1001000007E67F57FE00EA8701CD8D01C2FF00CDD3
:1001100021051E00DB060FDA75010FDA79010FD217
:10012000870170E640CA3C013E99D30B3E49D30C85
:100130003E04D30DCD670BDC8A0B1E017AE60FCA95
:1001400049013E30D30AC34D013E60D30A7AD30839
:100150007B0FD2FF00210110672CD7209DB0507076A
:10016000D25901CD6809CD1404DB07E67FFE00C239
:100170006601C3FF00AFC37B013E09D30BAFD30CB5
:10018000D30D1E01C32201AFD308E1D1C9C5060981
:100190000E005CA9E0107D292010CC392010DC147
:0101A000C995
:00000001FF
```

P=

```
                ;
                ;SHT 7A
                ;
                ;SYMBOL TABLE
                ;
0000                    ORG     0400H    ;1024D
0005            CONS1   EQU     5
0025            CONS2   EQU     25H
```

```
0015          CONS3     EQU    15H
0005          CONS4     EQU    5H
007D          DSST1     EQU    125D
0032          DSST2     EQU    50D
001E          DRES1     EQU    30D
001F          DRES2     EQU    31D
000A          DRIVS     EQU    10D
0007          FNCTR     EQU    7
0001          GATE0     EQU    00000001B
0002          GATE1     EQU    00000010B
0004          GATE2     EQU    00000100B
0008          GATE3     EQU    00001000B
0010          GATE4     EQU    00010000B
0020          GATE5     EQU    00100000B
0040          GATE6     EQU    01000000B
0080          GATE7     EQU    10000000B
00FE          MSK0      EQU    11111110B
00FB          MSK2      EQU    11111011B
00F7          MSK3      EQU    11110111B
00DF          MSK5      EQU    11011111B
00BF          MSK6      EQU    10111111B
0008          MVCT1     EQU    8
0009          MVCT2     EQU    9
0003          MCSW1     EQU    3
0004          MCSW2     EQU    4
0000          PZLD1     EQU    0
0005          TRPOS     EQU    5
              ;
1001          MVCTBT    EQU    1000H+1
1002          TMPBT     EQU    MVCTBT+1
1003          FLGBT     EQU    MVCTBT+2
1004          FNBYT     EQU    MVCTBT+3
1005          DHWBT     EQU    MVCTBT+4
1008          ZPSBT     EQU    MVCTBT+7
              ;
              ;
              ;SHT 7B
              ;
0B67          BRAKNO    EQU    0B67H
0A79          DHMWL     EQU    0A79H
09CB          LDTMP     EQU    09CBH
0B8A          MALFN     EQU    0B8AH
0968          MVCLR     EQU    0968H
0972          MVHLD     EQU    0972H
00C1          MANFD     EQU    00C1H
06EC          PZLD      EQU    06ECH
              ;
              ;
              ;
              ;SHT 8
              ;
              ;12 MSEC DELAY (RTN)
              ;
              ;DELAY CHANGED TO 17 MSEC
              ;
              DLY12:
0400 E5                 PUSH   H          ;STORE OLD MEMORY ADDRESS
0401 D5                 PUSH   D
0402 1605               MVI    D,CONS1    ;CONS1=5H,DLY=17MSEC
0404 210210             LXI    H,TMPBT    ;WHEN CONS1=1 DLY=3.4MSEC
              LP9:
0407 36FF               MVI    M,0FFH
              LP8:
0409 35                 DCR    M          ;INNER LOOP=1.92MSEC
040A C20904             JNZ    LP8
040D 15                 DCR    D
040E C20704             JNZ    LP9
0411 D1                 POP    D
0412 E1                 POP    H
0413 C9                 RET
              ;
              ;1 SEC DELAY (RTN)
              ;
              DLY1S:
```

```
0414 D5                 PUSH    D
0415 1E25               MVI     E,CONS2     ;E←25H=1/2 SEC DLY.
                LP10:
0417 CD0004             CALL    DLY12       ;WAIT 12MSEC
041A 1D                 DCR     E
041B C21704             JNZ     LP10
041E D1                 POP     D
041F C9                 RET
                ;
                ;3 SEC DELAY (RTN)
                ;
                DLY3S:
0420 D5                 PUSH D
0421 1E05               MVI     E,CONS4     ;E←5H=3 SEC DELAY
                LP52:
0423 CD1404             CALL    DLY1S       ;WAIT 1 SEC
0426 1D                 DCR     E
0427 C22304             JNZ     LP52
042A D1                 POP     D
042B C9                 RET
                ;
                ;
                ;SHT 8A
                ;ADDITION #1 NOV 25, 1975
                NOTE: ADDITION #1 CAUSES Z AXIS TO APPROACH HOME
                      IN THE IN DIRECTION

01A1 3E25               MVI     A,25H       ;SET SPEED=50 IPM
01A3 D30A               OUT     DRIVS
01A5 3E10               MVI     A,GATE4
01A7 D308               OUT     MVCT1       ;STOP RETRACT COMMAND
01A9 D308               OUT     MVCT1       ;SET: Z GO OUT FOR 60 MSEC
01AB 3E04               MVI     A,4
                LP54:
01AD CD0004             CALL    DLY12       ;DELAY 17 MSEC
01B0 3D                 DCR     A           ;60 MSEC DONE?
01B1 C2AD01             JNZ     LP54        ;NO.WAIT
01B4 AF                 XRA     A           ;YES.
01B5 D308               OUT     MVCT1       ;STOP MOVE
01B7 3E01               MVI     A,01
01B9 D30A               OUT     DRIVS       ;SET LOWEST SPEED FOR Z
01BB 3EA0               MVI     A,GATE5 OR GATE7
01BD D308               OUT     MVCT1       ;SET: -Z MOVE,RETRACT,GO
                LP55:
01BF DB05               IN      TBROS
01C1 2F                 CMA
01C2 E604               ANI     GATE2       ;IS Z AT HOME?
01C4 CABF01             JZ      LP55        ;NO.WAIT
01C7 C36E04             JMP     LP6         ;YES.GO BACK

;SHT 9
                ;
                ;13 SEC DELAY (RTN)
                ;
                DL13S:
042C D5                 PUSH    D
042D 1E15               MVI     E,CONS3     ;E←15H=13 SEC DELAY
                LP51:
042F CD1404             CALL    DLY1S       ;WAIT 1 SEC
0432 1D                 DCR     E
0433 C22F04             JNZ     LP51
0436 D1                 POP     D
0437 C9                 RET
                ;
                ;Z AXIS HOME (RTN)
                ;
                ;CALLED AFTER Z AXIS HOME P.B DEPRESSED.
                ;
                ZHOME:
0438 E5                 PUSH    H
0439 D5                 PUSH    D
043A CD2105             CALL    HMAUX       ;SET OSC=33.3 KHZ&DRIVS=200IPM
043D 210110             LXI     H,MVCTBT    ;GET MOVE CTRL BYTE
                LP5:
```

```
0440 110310           LXI     D,FLGBT
0443 1A               LDAX    D           ;A←FLAG BYTE
0444 E680             ANI     GATE7       ;EMERGENCY FLAG ON ?
0446 C24F04           JNZ     LD20        ;YES. JUMP
0449 CDC100           CALL    MANFD       ;NO.IN MAN FEED ?
044C D27D04           JNC     LP24        ;NO.RETURN
          LD20:
044F DB05             IN      TBPOS       ;YES.GET TABLE POSITION
0451 2F               CMA                 ;COMPLEMENT
0452 E604             ANI     GATE2       ;IS Z AT HOME?
0454 C2A101           JNZ     ADDITION #1 ;YES.RETURN
0457 3E90             MVI     A,GATE4 OR GATE7    ;NO.
0459 77               MOV     M,A         ;UPDATE MOVE CTRL BYTE
045A D308             OUT     MVCT1       ;SET:+ZMOVE,RETRACT,GO
045C CD7209           CALL    MVHLD       ;CHECK FEED HOLD
045F DB04             IN      MCSW2       ;GET Z SLO DN SW
0461 2F               CMA
0462 E604             ANI     GATE2       ;Z SLO DN SW HIT ?
0464 CA4004           JZ      LP5         ;NO.GO LOOP
0467 3E25             MVI     A,25H       ;YES.DRIVE SPEED=50IPM
0469 D30A             OUT     DRIVS
046B C34004           JMP     LP5         ;GO LOOP
          LP6:
046E CD790A           CALL    DHMWL       ;UPDATE DHMWL
          ;
          ;
          ;SHT 10
          ;
0471 210510           LXI     H,DHWBT     ;HL←DHMWL ADDR
0474 110810           LXI     D,ZPSBT     ;DE←ZPOSR
0477 CDCB09           CALL    LDTMP       ;ZPOSR←DHMWL
047A CDEC08           CALL    PZLD        ;LOAD EXT POSITION REG
          LP24:
047D CD6809           CALL    MVCLR       ;CLR MOVE COMMAND
0480 D1               POP     D
0481 E1               POP     H
0482 C9               RET
          ;
          ;R AXIS HOME (RTN)
          ;
          ;CALLED AFTER R AXIS HOME P.B DEPRESSED
          ;
          RHOME:
0483 E5               PUSH    H
0484 CD2105           CALL    HMAUX       ;SET OSC=33.3KHZ,DRIVS=200IPM
0487 210310           LXI     H,FLGBT
048A 7E               MOV     A,M
048B F601             ORI     GATE0       ;DISABLE HARDWARE STOP MOVE SIGN
048D 77               MOV     M,A
048E D309             OUT     MVCT2
0490 210110           LXI     H,MVCTBT
          LP25:
0493 CDC100           CALL    MANFD       ;IN MAN FEED ?
0496 D2BE04           JNC     LP26        ;NO.RETURN
0499 DB05             IN      TBPOS       ;YES.GET TABLE POSITION
049B 2F               CMA
049C E608             ANI     GATE3       ;IS R AT HOME ?
049E C2BE04           JNZ     LP26        ;YES.RETURN
04A1 CD670B           CALL    BRAKNO      ;NO.IS BRAKE RELEASED ?
04A4 DC6A0B           CC      MALFN       ;NO,TRUBLE !
04A7 3EC0             MVI     A,GATE6 OR GATE7    ;YES.
04A9 77               MOV     M,A
04AA D308             OUT     MVCT1       ;SET:RMOVE,RETRACT,GO
04AC CD7209           CALL    MVHLD       ;CHECK FEED HOLD
04AF DB03             IN      MCSW1       ;GET R SLO DN SW
04B1 2F               CMA
04B2 E640             ANI     GATE6       ;R SLO DN HIT ?
04B4 CA9304           JZ      LP25        ;NO.GO LOOP
04B7 3E25             MVI     A,25H       ;YES.SET DRIVS=500RPM
04B9 D30A             OUT     DRIVS
04BB C39304           JMP     LP25
          LP26:
04BE 210310           LXI     H,FLGBT
04C1 7E               MOV     A,M
```

;SHT 11
;

```
04C2 E6FE              ANI     MSK0    ;ENABLE HARDWARE STOP MOVE SIGNA
04C4 77                MOV     M,A
04C5 D309              OUT     MVCT2
                ;
                ;REMOVE SEMICOLON IF USING BRAKE
                ;
                ;       CALL    BRAKON  ;BRAKE ENGAGED ?
                ;       CC      MALFN   ;NO,TRUBLE !
04C7 CD6809            CALL    MVCLR   ;YES.
04CA E1                POP     H
04CB C9                RET
                ;
                ;X/Y AXES HOME (RTN)
                ;
                ;CALLED AFTER X/Y HOME P.B DEPRESSED
                ;
                XYHOM:
04CC E5                PUSH    H
04CD CD2105            CALL    HMAUX   ;SET OSC=33.3KHZ
04D0 3E30              MVI     A,30H   ;SET DRIVS=60IPM
04D2 D30A              OUT     DRIVS
04D4 210110            LXI     H,MVCTBT
04D7 3E81              MVI     A,GATE0 OR GATE7
04D9 77                MOV     M,A     ;SET:+XMOVE,RETRACT
                LP27:
04DA CDC100            CALL    MANFD   ;IN MAN FEED ?
04DD D21C05            JNC     LP29    ;NO.RETURN
04E0 DB05              IN      TBPOS   ;YES.GET TABLE POSITION
04E2 0F                RRC             ;IS X AT HOME ?
04E3 D2F804            JNC     LP28    ;YES.
04E6 7E                MOV     A,M     ;NO.
04E7 D308              OUT     MVCT1   ;SET:GO
04E9 CD7209            CALL    MVHLD   ;CHECK FEED HOLD
04EC DB03              IN      MCSW1
04EE 0F                RRC             ;X+O.T SW HIT ?
04EF DADA04            JC      LP27    ;NO.GO LOOP
04F2 3E82              MVI     A,GATE1 OR GATE7 ;YES.
04F4 77                MOV     M,A     ;SET:-XMOVE
04F5 C3DA04            JMP     LP27    ;GO LOOP
                LP28:
04F8 3E84              MVI     A,GATE2 OR GATE7
04FA 77                MOV     M,A     ;SET:+YMOVE,RETRACT
                LP31:
04FB CDC100            CALL    MANFD   ;IN MAN FEED ?
04FE D21C05            JNC     LP29    ;NO.RETURN
0501 DB05              IN      TBPOS   ;YES.GET TABLE POSITION
```

;SHT 12
;

```
0503 2F                CMA
0504 E602              ANI     GATE1   ;IS Y AT HOME ?
0506 C21C05            JNZ     LP29    ;YES.RETURN
0509 7E                MOV     A,M     ;NO.
050A D308              OUT     MVCT1   ;SET:GO
050C CD7209            CALL    MVHLD   ;CHECK FEED HOLD
050F DB03              IN      MCSW1
0511 E608              ANI     GATE3   ;Y+O.T SW HIT ?
0513 C2FB04            JNZ     LP31    ;NO.GO LOOP
0516 3E88              MVI     A,GATE3 OR GATE7 ;YES.
0518 77                MOV     M,A     ;SET:-YMOVE
0519 C3FB04            JMP     LP31    ;GO LOOP
                LP29:
051C CD6809            CALL    MVCLR   ;CLR RETRACT&MOVE F.F
051F E1                POP     H
0520 C9                RET
                ;
                ;AXES HOME AUXILIARY (RTN)
                ;
                ;REFFERD TO BY ZHOME,RHOME,XYHOM RTNS
                ;
                HMAUX:
```

```
0521 E5              PUSH    H
0522 210310          LXI     H,FLGBT ;GET FLAG BYTE
0525 7E              MOV     A,M
0526 F602            ORI     GATE1   ;SET OSC=33.3KHZ
0528 77              MOV     M,A
0529 D309            OUT     MVCT2
052B 3E60            MVI     A,60H   ;SET DRIVE SPEED=120IPM
052D D30A            OUT     DRIVS
052F E1              POP     H
0530 C9              RET
                     ;
0000                 END
```

P=3

```
:10040000E5D5160521021036FF35C2090415C207CD
:10041000004D1E1C9D51E25CD00041DC21704D1C9E0
:10042000D51E05CD14041DC22304D1C9D51E15CD7A
:10043000014041DC22F04D1C9E5D5CD210521011019
:100440001103101AE680C24F04CDC100D27D04DB37
:1004500052FE604C26E043E9077D308CD7209DB07
:1004600042FE604CA40043E25D30AC34004CD79D4
:100470000A210510110810CDCB09CDEC08CD680973
:10048000D1E1C9E5CD210521031107EF60177D3091D
:100490000210110CDC100D2BE04DB052FE608C2BE8B
:1004A00004CD670BDC8A0B3EC077D308CD7209DB25
:1004B00032FE640CA93043E25D30AC393042103C5
:1004C000107EE6FE77D309CD6809E1C9E5CD2105A7
:1004D0003E30D30A2101103E8177CDC100D21C05E8
:1004E000DB050FD2F8047ED308CD7209DB030FDAE7
:1004F000DA043E8277C3DA043E8477CDC100D21C91
:10050000005DB052FE602C21C057ED308CD7209DB90
:100510003E608C2FB043E8877C3FB04CD6809E10B
:10052000C9E52103107EF60277D3093E60D30AE1C4
:010530000C901
:00000001FF
```

P=

```
                     ;
                     ;SHT_12A
                     ;
                     ;SYMBOL TABLE
                     ;
0000                 ORG     0531H
001E    DRES1        EQU     30D
001F    DRES2        EQU     31D
007D    DSST1        EQU     125D
0032    DSST2        EQU     50D
001D    DRSINC       EQU     29D
0007    FNCTR        EQU     7
0001    GATE0        EQU     00000001B
0004    GATE2        EQU     00000100B
0008    GATE3        EQU     00001000B
0010    GATE4        EQU     00010000B
0020    GATE5        EQU     00100000B
0006    LITE1        EQU     6
0004    MCSW2        EQU     4
00FB    MSK2         EQU     11111011B
00F7    MSK3         EQU     11110111B
00DF    MSK5         EQU     11011111B
00BF    MSK6         EQU     10111111B
0005    TBPOS        EQU     5
000B    XSIZE        EQU     11D
                     ;
1000    L1BYT        EQU     1000H
1004    FNBYT        EQU     L1BYT+4
1008    ZPSBT        EQU     L1BYT+8
100E    XSZBT        EQU     L1BYT+0EH
101D    TEMP1        EQU     L1BYT+1DH
                     ;
0420    DLY3S        EQU     0420H
0400    DLY12        EQU     0400H
09DC    DCADD        EQU     09DCH
```

```
0673              ENTR1      EQU     0673H
0684              ENTR2      EQU     0684H
00C1              MANFD      EQU     00C1H
0972              MVHLD      EQU     0972H
0B8A              MALFN      EQU     0B8AH
0AF2              XGOMS      EQU     0AF2H
                  ;
                  ;
                  ;SHT 13
                  ;
                  ;NEW WHEEL DRESS (RTN)
                  ;
                  NWLDR:
0531 E5                      PUSH    H
0532 C5                      PUSH    B
0533 D5                      PUSH    D
0534 DB1E                    IN      DRES1           ;GET DRESS COUNTER STATUS
0536 FEFF                    CPI     0FFH            ;COUNTER 1=0 ?
0538 C28E05                  JNZ     LP12            ;NO.RETURN
053B DB1F                    IN      DRES2           ;YES.
053D FEFF                    CPI     0FFH            ;COUNTER 2=0 ?
053F C28E05                  JNZ     LP12            ;NO.RETURN
0542 0E02                    MVI     C,2D            ;YES.C=2-5SEC,C=1-10SEC DRESS
0544 167D                    MVI     D,DSST1         ;DRESS 125 COUNTS
0546 210410                  LXI     H,FNBYT
0549 7E                      MOV     A,M             ;GET FUNC CTRL BYTE
054A F60C                    ORI     GATE2 OR GATE3  ;SET DRES ENABLE&5SEC ON
054C 77                      MOV     M,A             ;STORE FUNC INFO
054D D307                    OUT     FNCTR
                  LP7:
054F CDC100                  CALL    MANFD           ;IN MAN FEED ?
0552 D28805                  JNC     LP30            ;NO.RETURN
0555 CD7209                  CALL    MVHLD           ;YES.CHECK FEED HOLD
0558 DB04                    IN      MCSW2           ;GET DRESS INFEED COUNT STATUS
055A 07                      RLC
055B 07                      RLC
055C D24F05                  JNC     LP7             ;1 COUNT ? NO,WAIT
055F CD9205                  CALL    DRSAUX          ;YES.(DRES CNTR)=(DRES CNTR)+1
0562 15                      DCR     D               ;DRES CNTR IN DESIRED STATE ?
0563 C24F05                  JNZ     LP7             ;NO.GO LOOP
0566 0D                      DCR     C               ;YES.DRESSING DONE ?
0567 CA7505                  JZ      LD4             ;YES.GOTO DRES SHUT OFF
056A 7E                      MOV     A,M             ;NO.GET FUNC CTRL BYTE
056B E6F7                    ANI     MSK3            ;REMOVE 5 SEC SIGNAL
056D 77                      MOV     M,A
056E D307                    OUT     FNCTR
0570 1632                    MVI     D,DSST2         ;SET COUNTER=50
0572 C34F05                  JMP     LP7
                  ;
                  ;DRESS CYCLE SHUT OFF
                  ;
                  LD4:
0575 7E                      MOV     A,M             ;A-FUNC CONTROL
0576 E6F3                    ANI     MSK2 AND MSK3   ;SHUT DRESS ENABLE
0578 D307                    OUT     FNCTR           ;& 5SEC DRESS
                  ;
                  ;
                  ;SHT 14
                  ;
                  LP11:
057A DB1F                    IN      DRES2           ;WAIT TILL DRESS COUNTER
057C FEFF                    CPI     0FFH            ;IS BACK TO ZERO
057E C27A05                  JNZ     LP11            ;BEFORE LEAVING RTN.
0581 DB1E                    IN      DRES1
0583 FEFF                    CPI     0FFH
0585 C27A05                  JNZ     LP11
                  LP30:
0588 7E                      MOV     A,M             ;A-FUNC CTRL
0589 E6F3                    ANI     MSK2 AND MSK3   ;SHUT DRESS ENABLE
058B 77                      MOV     M,A             ;& 5SEC DRESS.
058C D307                    OUT     FNCTR
                  LP12:
058E D1                      POP     D
058F C1                      POP     B
0590 E1                      POP     H
```

```
0591 C9                    RET
                    ;
                    ;DRESS CYCLE AUXILIARY (RTN)
                    ;
                    ;GENERATES COUNT PULSE TO DRESS COUNTER
                    ;FOR EVERY PULSE FROM DRESSER.
                    ;
                    DRSAUX:
0592 E5                    PUSH    H
0593 CD2004                CALL    DLY3S       ;WAIT 3 SEC
0596 210410                LXI     H,FNBYT
0599 7E                    MOV     A,M
059A E6BF                  ANI     MSK6        ;CLR DRES INFEED COUNT F.F
059C 77                    MOV     M,A
059D D307                  OUT     FNCTR
059F DB04                  IN      MCSW2       ;GET DRES INFEED COUNT STATUS
05A1 07                    RLC
05A2 07                    RLC                 ;COUNT STILL ON ?
05A3 DA8A0B                JC      MALFN       ;YES.TROUBLE !
05A6 7E                    MOV     A,M         ;NO.
05A7 F620                  ORI     GATE5       ;DRES CNTR=DRES CNTR+1
05A9 D307                  OUT     FNCTR
05AB CD0004                CALL    DLY12       ;WAIT 12MSEC
05AE 7E                    MOV     A,M         ;GET FUNC CTRL BYTE
05AF E6DF                  ANI     MSK5        ;REMOVE PULSE FROM DRES CNTR
05B1 D307                  OUT     FNCTR
05B3 E1                    POP     H
05B4 C9                    RET
                    ;
                    ;
                    ;
                    ;SHT 15
                    ;
                    ;AUTO DRESS (RTN)
                    ;
                    ;RTN UPDATES ZPOS REG AND IS CALLED AFTER
                    ;EVERY PASS WHEN "AUTO DRESS" P.B IS ACTIVE
                    ;
                    ATODRS:
05B5 D5                    PUSH    D
05B6 E5                    PUSH    H
05B7 DB1D                  IN      DRSINC      ;GET DRESS INCREMENT
05B9 FE00                  CPI     0           ;IS DRS INC=0 ?
05BB CAFC05                JZ      LD24        ;YES.RETURN
05BE 57                    MOV     D,A         ;NO.
05BF 07                    RLC
05C0 07                    RLC
05C1 07                    RLC
05C2 07                    RLC
05C3 5F                    MOV     E,A         ;A IS STORED TO UPDATE ZPOSR
05C4 210410                LXI     H,FNBYT
05C7 7E                    MOV     A,M         ;GET FUNC CTRL BYTE
05C8 F604                  ORI     GATE2       ;SET DRESS ENABLE
05CA 77                    MOV     M,A
05CB D307                  OUT     FNCTR
                    LP37:
05CD CD7209                CALL    MVHLD       ;CHECK FEED HOLD
05D0 DB04                  IN      MCSW2       ;GET DRES INFEED COUNT STATUS
05D2 07                    RLC
05D3 07                    RLC
05D4 D2CD05                JNC     LP37        ;1 COUNT ?,NO.WAIT
05D7 CD9205                CALL    DRSAUX      ;YES.DRES CNTR=DRES CNTR+1
05DA 15                    DCR     D           ;DRESSING DONE ?
05DB C2CD05                JNZ     LP37        ;NO.GO LOOP
05DE 7E                    MOV     A,M         ;YES.
05DF E6FB                  ANI     MSK2        ;SHUT DRES ENABLE
05E1 77                    MOV     M,A
05E2 D307                  OUT     FNCTR
05E4 211D10                LXI     H,TEMP1
05E7 73                    MOV     M,E         ;STORE DRES INC IN TEMP1
05E8 23                    INX     H
05E9 AF                    XRA     A
05EA 77                    MOV     M,A         ;STORE ZERO IN TEMP1+1&TEMP1+2
05EB 23                    INX     H
05EC 77                    MOV     M,A
05ED 2B                    DCX     H
```

```
05EE 2B                DCX     H
05EF 110810            LXI     D,ZPSBT  ;DE-ZPOSR ADDR
05F2 CDDC09            CALL    DCADD    ;ZPOSR=ZPOSR+DRES INCREMENT
                ;
                ;SHT 16
                ;
                LP53:
05F5 DB04              IN      MCSW2
05F7 E610              ANI     GATE4    ;DRS CYCLE STILL ON ?
05F9 C2F505            JNZ     LP53     ;YES.WAIT
                LD24:
05FC E1                POP     H
05FD D1                POP     D
05FE C9                RET
                ;
                ;ENTER 1/2 X SIZE (X OFFSET) AND MOVE (RTN)
                ;
                ENTRX:
05FF E5                PUSH    H
0600 D5                PUSH    D
0601 C5                PUSH    B
0602 DB05              IN      TBPOS
0604 E601              ANI     GATE0    ;X AXIS AT HOME ?
0606 C23506            JNZ     LD15     ;NO.RETURN
0609 210010            LXI     H,L1BYT  ;YES.
060C 7E                MOV     A,M      ;GET LITE STATUS
060D E608              ANI     GATE3    ;X SIZE LITE ON ?
060F C23506            JNZ     LD15     ;YES.RETURN
0612 110E10            LXI     D,XSZBT  ;NO.DE-X SIZE ADDR
0615 DB0B              IN      XSIZE    ;A-I/P
0617 12                STAX    D        ;M-A
0618 13                INX     D        ;DE-DE+1
0619 DB0C              IN      XSIZE + 1
061B 12                STAX    D
061C 13                INX     D
061D DB0D              IN      XSIZE + 2
061F 12                STAX    D        ;LOAD 1/2 XSIZE INTO MEMORY
0620 210E10            LXI     H,XSZBT  ;HL-XSIZE
0623 CD7306            CALL    ENTR1    ;CALL AUXILIARY RTN TO LOAD
                                        ;MOVE REG & SET FREQUENCY.
0626 CDF20A            CALL    XGOMS    ;SET X GO MINUS
0629 CD8406            CALL    ENTR2    ;AUX RTN TO CHECK IN POSITION
                                        ;AND SET DISPLAY=1/2 X SIZE.
062C 210010            LXI     H,L1BYT
062F 7E                MOV     A,M      ;GET LITE STATUS
0630 F608              ORI     GATE3    ;TURN X SIZE LITE ON
0632 77                MOV     M,A
0633 D306              OUT     LITE1
                LD15:
0635 C1                POP     B
0636 D1                POP     D
0637 E1                POP     H
0638 C9                RET
0000                   END
P=3

:10053100E5C5D5DB1EFEFFC28E05DB1FFEFFC28EA9
:10054100050E02167D2104107EF608C77D307CDC16E
:100551000D28805CD7209DB040707D24F05CD9281
:100561000515C24F050DCA75057EE6F777D3071647
:10057100032C34F057EE6F3D307DB1FFEFFC27A05C8
:10058100DB1EFEFFC27A057EE6F377D307D1C1E118
:10059100C9E5CD20042104107EE6BF77D307DB0433
:1005A1000707DA8A0B7EF620D307CD00047EE6DF4B
:1005B100D307E1C9D5E5DB1DFE00CAFC05570707D6
:1005C10007075F2104107EF60477D307CD7209DB9C
:1005D10040707D2CD05CD920515C2CD057EE6FBF8
:1005E10077D307211D107323AF7723772B2B1108A6
:1005F10010CDDC09DB04E610C2F505E1D1C9E5D572
:10060100C5DB05E601C235062100107EE608C235CC
:100611000E10DB0B1213DB0C1213DB0D122172
:10062100E10CD7306CDF20ACD840621000107EF6A0
:080631009877D306C1D1E1C92D
:00000001FF

P=
```

```
                ;
                ;SHT 16A
                ;
                ;SYMBOL TABLE
                ;
0000            ORG     639H
0011    BLSZ    EQU     17D
000A    DRIVS   EQU     10D
0014    FDINC   EQU     20D
0001    GATE0   EQU     00000001B
0002    GATE1   EQU     00000010B
0004    GATE2   EQU     00000100B
0008    GATE3   EQU     00001000B
0010    GATE4   EQU     00010000B
0020    GATE5   EQU     00100000B
0040    GATE6   EQU     01000000B
0008    INPOS   EQU     8
0006    LITE1   EQU     6
0004    MCSW2   EQU     4
0006    MODE    EQU     6
0005    TBPOS   EQU     5
000E    YSIZE   EQU     14D
0016    ZSZPT   EQU     22D
                ;
1000    L1BYT   EQU     1000H
1003    FLGBT   EQU     L1BYT+3
1008    ZPSBT   EQU     L1BYT+8
100B    ZSZBT   EQU     L1BYT+0BH
101A    MOVEBT  EQU     L1BYT+1AH
1011    YSZBT   EQU     L1BYT+11H
1017    FEEDBT  EQU     L1BYT+17H
101D    TEMP1   EQU     L1BYT+1DH
1014    BLSBT   EQU     L1BYT+14H
                ;
0959    CYCLR   EQU     0959H
09F0    DCSUB   EQU     09F0H
00A9    ERRGO   EQU     00A9H
00B5    ERRNO   EQU     00B5H
0521    HMAUX   EQU     0521H
09BD    LDISP   EQU     09BDH
09CB    LDTMP   EQU     09CBH
0A0A    MOVLD   EQU     0A0AH
0972    MVHLD   EQU     0972H
0968    MVCLR   EQU     0968H
0810    OBRND   EQU     0810H
076E    ROUND   EQU     076EH
07A3    SQREC   EQU     07A3H
0AFD    YGUPS   EQU     0AFDH
09AD    ZROCK   EQU     09ADH
0B2B    ZGOIN   EQU     0B2BH
                ;
                ;SHT 17
                ;
                ;ENTER 1/2 Y SIZE (Y OFFSET) AND MOVE (RTN)
                ;
                ENTRY:
0639 E5                 PUSH    H
063A D5                 PUSH    D
063B C5                 PUSH    B
063C DB05               IN      TBPOS
063E E602               ANI     GATE1   ;Y AXIS AT HOME ?
0640 C26F06             JNZ     LD16    ;NO.RETURN
0643 210010             LXI     H,L1BYT ;YES.
0646 7E                 MOV     A,M     ;GET LITE STATUS
0647 E610               ANI     GATE4   ;Y SIZE LITE ON ?
0649 C26F06             JNZ     LD16    ;YES.RETURN
064C 111110             LXI     D,YSZBT ;DE-Y SIZE ADDR
064F DB0E               IN      YSIZE
0651 12                 STAX    D
0652 13                 INX     D
0653 DB0F               IN      YSIZE + 1
0655 12                 STAX    D
0656 13                 INX     D
0657 DB10               IN      YSIZE + 2
0659 12                 STAX    D       ;LOAD 1/2 Y SIZE INTO MEMORY
```

```
065A 211110           LXI    H,YSZBT   ;HL←Y SIZE
065D CD7306           CALL   ENTR1     ;AUX RTN TO LOAD MOVER&SET FREQ
0660 CDFD0A           CALL   YGOPS     ;SET Y GO PLUS
0663 CD8406           CALL   ENTR2     ;AUX RTN TO CHECK IN POSITION
                                       ;AND SET DISPLAY=1/2 Y SIZE 0666 210010           LXI    H,L1BYT
0669 7E               MOV    A,M       ;GET LITE STATUS
066A F610             ORI    GATE4     ;TURN Y SIZE LITE ON
066C 77               MOV    M,A
066D D306             OUT    LITE1
              LD16:
066F C1               POP    B
0670 D1               POP    D
0671 E1               POP    H
0672 C9               RET
;
;ENTER OFFSET MOVE AUX 1 (RTN)
;
;LOAD EXT MOVER WITH OFFSET MOVE & SET FREQUENCY.
;
              ENTR1:
0673 111A10           LXI    D,MOVEBT  ;DE←MOVER ADDR
0676 CDCB09           CALL   LDTMP     ;MOVER= OFFSET
0679 CD0A0A           CALL   MOVLD     ;EXT MOVER=OFFSET

;SHT 17A
;ADDITION #6 DEC 4, 1975
NOTE: IF DURING CYCLE, MODE SELECTOR IS PUT ON
      MAN FEED, STOP MOVE AND RETRACT HOME

0C38 DB06             IN     MODE
0C3A E604             ANI    GATE2     ;IN MAN FEED ?
0C3C CA450C           JZ     LP59      ;NO.GO BACK
0C3F CD6809           CALL   MVCLR     ;YES.STOP MOVE
0C42 C31000           JMP    RTRCT     ;RETRACT AND START FROM BEGINNING
              LP59:
0C45 CD7209           CALL   MVHLD
0C48 C38F06           JMP    BACK

;SHT 18
;
067C CD2105           CALL   HMAUX     ;OSC=33.3KHZ
067F 3E30             MVI    A,30H     ;DRIVS=60IPM
0681 D30A             OUT    DRIVS
0683 C9               RET

;ENTER OFFSET MOVE AUX 2 (RTN)
;
;WAITS TILL AXES IN POSITIN & SET DISPLAY=OFFSET.
;
              ENTR2:
0684 CD8C06           CALL   MONIT     ;CALL MOVE MONITOR
0687 EB               XCHG             ;DE←OFFSET ADDR
0688 CDBD09           CALL   LDISP     ;CPU DISPLAY=OFFSET
068B C9               RET

;MOVE MONITOR (RTN)
;
              MONIT:
068C C3380C           JMP    ADDITION #6  ;CHECK FEED HOLD
068F DB05             IN     TBPOS
0691 E640             ANI    GATE6     ;DTG=0 ?
0693 CA8C06           JZ     MONIT     ;NO.GO LOOP
0696 DB08             IN     INPOS     ;YES.
0698 E601             ANI    GATE0     ;AXES IN POSITION ?
069A C28C06           JNZ    MONIT     ;NO.GO LOOP
069D CD6809           CALL   MVCLR     ;YES.CLR MOVE COMMAND
06A0 C9               RET

;CYCLE TO EXECUTE ROUND,SQUARE/RECTANGLE,OBROUND (RTN)
;ENTERED AFTER "CYCLE START" P.B ACTIVATED.
;
```

```
                CYCLE:
06A1 E5         PUSH    H
06A2 D5         PUSH    D
06A3 C5         PUSH    B
06A4 DB05       IN      TBPOS       ;Z AXIS AT HOME ?
06A6 E604       ANI     GATE2
06A8 C26107     JNZ     LD5         ;NO.RETURN
06AB DB05       IN      TBPOS       ;YES.
06AD E608       ANI     GATE3       ;R AXIS AT HOME ?
06AF C26107     JNZ     LD5         ;NO.RETURN
06B2 210010     LXI     H,LIBYT     ;YES.
06B5 7E         MOV     A,M         ;GET LITE BYTE
06B6 F601       ORI     GATE0       ;TURN CYCLE START LT ON
06B8 D306       OUT     LITE1
06BA 77         MOV     M,A
                ;
                ;SHT 19
                ;
06BB E618       ANI     GATE3 OR GATE4 ;X&Y SIZE ENTERED ?
06BD FE18       CPI     GATE3 OR GATE4
06BF C26807     JNZ     ERRL2       ;NO.TURN "DATA ERROR" LT ON
06C2 CDB500     CALL    ERRNO       ;YES.SHUT "DATA ERROR" LT
06C5 DB04       IN      MCSW2       ;MACHINE IND ON ?
06C7 07         RLC
06C8 DA6107     JC      LD5         ;YES.RETURN
06CB 111710     LXI     D,FEEDBT    ;NO.DE-Z FEED INC ADDR
06CE DB14       IN      FDINC       ;A-Z FEED INCREMENT
06D0 12         STAX    D
06D1 13         INX     D
06D2 DB15       IN      FDINC +1
06D4 12         STAX    D           ;LOAD Z FEED INC INTO MEMORY
06D5 13         INX     D
06D6 AF         XRA     A
06D7 12         STAX    D
06D8 1B         DCX     D
06D9 1B         DCX     D           ;DE-Z FEED INC
06DA EB         XCHG                ;HL-Z FEED INC ADDR
06DB 0602       MVI     B,2
06DD CDAD09     CALL    ZROCK       ;Z FEED INC=0 ?
06E0 D2EA06     JNC     LD6         ;NO.JUMP
06E3 210310     LXI     H,FLGBT     ;YES.
06E6 7E         MOV     A,M         ;GET FLAGS STATUS
06E7 F604       ORI     GATE2       ;SET LAST PASS FLAG !
06E9 77         MOV     M,A
                LD6:
06EA 111410     LXI     D,BLSBT     ;NO.DE-BLANK SIZE ADDR
06ED DB11       IN      BLSZ        ;A-BLANK SIZE
06EF 12         STAX    D
06F0 13         INX     D
06F1 DB12       IN      BLSZ +1
06F3 12         STAX    D
06F4 13         INX     D
06F5 DB13       IN      BLSZ +2
06F7 12         STAX    D           ;LOAD BLANK SIZE INTO MEMORY
06F8 110B10     LXI     D,ZSZBT     ;DE-Z SIZE POINT ADDR
06FB DB16       IN      ZSZPT       ;A-Z SIZE PT
06FD 12         STAX    D
06FE 13         INX     D
06FF DB17       IN      ZSZPT +1
0701 12         STAX    D
0702 13         INX     D
0703 DB18       IN      ZSZPT +2
0705 12         STAX    D           ;LOAD Z SIZE PT INTO MEMORY
0706 111D10     LXI     D,TEMP1     ;DE-TEMP1 ADDR
                ;
                ;SHT 20
                ;
0709 211410     LXI     H,BLSBT     ;HL-BLANK SIZE ADDR
070C CDCB09     CALL    LDTMP       ;LOAD TEMP WITH BLANK SIZE !
070F 210B10     LXI     H,ZSZBT     ;HL-Z SIZE PT ADDR
0712 CDF009     CALL    DCSUB       ;TEMP1=BLANK SIZE-Z SIZE PT !
0715 D26807     JNC     ERRL2       ;BLNK SIZE-Z SIZE PT<0? YES,JUMP
0718 CDB500     CALL    ERRNO       ;NO.SHUT "DATA ERROR" LT
                ;
```

;MOVE Z AXIS TO Z FEED POINT.
;

```
071B 211410          LXI    H,BLSBT  ;HL←BLANK SIZE BYTE
071E CDCB09          CALL   LDTMP    ;TEMP1←BLANK SIZE !
0721 211110          LXI    H,YSZBT  ;HL←Y SIZE ADDR
0724 CDF009          CALL   DCSUB    ;TEMP1(ZFEEDPT)=BLNK SIZE-Y SIZE
0727 210810          LXI    H,ZPSBT  ;HL←ZPOSR ADDR
072A 111A10          LXI    D,MOVEBT ;DE←MOVER ADDR
072D CDCB09          CALL   LDTMP    ;MOVER←ZPOSR !
0730 211D10          LXI    H,TEMP1
0733 CDF009          CALL   DCSUB    ;MOVER=ZPOSR-Z FEED PT !
0736 CD0A0A          CALL   MOVLD    ;EXT MOVER←MOVER !
0739 110810          LXI    D,ZPSBT  ;DE←ZPOSR ADDR
073C CDCB09          CALL   LDTMP    ;ZPOSR←Z FEED PT !
073F CD2105          CALL   HMAUX    ;OSC=33.3KHZ,DRIVS=200IPM
0742 CD2B0B          CALL   ZGOIN    ;SET Z GO INWARD !
0745 CD8C06          CALL   MONIT    ;CALL MOVE MONITOR
0748 210010          LXI    H,L1BYT
074B 7E              MOV    A,M
074C F620            ORI    GATE5    ;TURN "BLANK SIZE" LT ON
074E 77              MOV    M,A
074F D306            OUT    LITE1
```

;
;CHECK PUNCH SHAPE
;

```
0751 DB06            IN     MODE     ;IS SHAPE ROUND ?
0753 07              RLC
0754 07              RLC
0755 07              RLC
0756 DA6E07          JC     ROUND    ;YES.GO ROUND SHAPE SECTION
0759 07              RLC             ;NO.IS SHAPE SQ/REC ?
075A DAA307          JC     SQREC    ;YES.GO SQ/REC SECTION
075D 07              RLC             ;NO.IS SHAPE OBROUND ?
075E DA1008          JC     OBRND    ;YES.GO OBROUND SECTION
            LD5:                     ;NO.
0761 CD5909          CALL   CYCLR    ;CLR CYCLE FLAGS
0764 C1              POP    B
0765 D1              POP    D
0766 E1              POP    H
0767 C9              RET
```

;
;
;SHT 21
;
;
ERRL2:

```
0768 CDA900          CALL   ERRGO    ;TURN "DATA ERROR" LT ON
076B C36107          JMP    LD5      ;RETURN TO MAIN
```

;
;
;

```
0000            END
```

P=3

```
:100639000E5D5C5DB05E602C26F062100107EE6108E
:100649000C26F06111110DB0E1213DB0F1213DB1030
:10065900122111110CD7306CDFD0ACD84062100109B
:100669007EF61077D306C1D1E1C9111A10CDCB0995
:10067900CD0A0ACD21053E30D30AC9CD8C06EBCD72
:10068900BD09C9CD7209DB05E640CA8C06DB08E65F
:1006990001C28C06CD6809C9E5D5C5DB05E604C2EA
:1006A906107DB05E608C261072100107EF601D368
:1006B9000677E618FE18C26807CDB500DB0407DA2D
:1006C906107111710DB141213DB151213AF121B7C
:1006D9001BEB0602CDAD09D2EA062103107EF60412
:1006E9007711410DB111213DB121213DB13121121
:1006F9000B10DB161213DB171213DB1812111D1066
:10070900211410CDCB09210B10CDF009D26807CDFA
:10071900B500211410CDCB09211110CDF009210804
:10072900101111A10CDCB09211D10CDF009CD0A0ADF
:10073900110810CDCB09CD2105CD2B0BCD8C062170
:100749000107EF62077D306DB06070707DA6E0767
:100759007DAA30707DA1008CD5909C1D1E1C9CDD4
```

:05076900A900C36107B7
:00000001FF

P=

```
               ;
               ;SHT 21A
               ;
               ;SYMBOL TABLE
               ;
0000                       ORG     76EH
000A           DRIVS       EQU     10D
0004           GATE2       EQU     00000100B
0040           GATE6       EQU     01000000B
00FB           MSK2        EQU     11111011B
0006           MODE        EQU     6
0008           MVCT1       EQU     8
0000           PZLD1       EQU     0
001A           RRATE       EQU     26D
0019           XYRATE      EQU     25D
001B           ZRATE       EQU     27D
               ;
1001           MVCTBT      EQU     1001H
100E           XSZBT       EQU     MVCTBT+0DH
1011           YSZBT       EQU     MVCTBT+10H
101A           MOVEBT      EQU     MVCTBT+19H
1008           ZPSBT       EQU     MVCTBT+7
1005           DHWBT       EQU     MVCTBT+4
1003           FLGBT       EQU     MVCTBT+2
100B           ZSZBT       EQU     MVCTBT+0AH
1017           FEEDBT      EQU     MVCTBT+16H
101D           TEMP1       EQU     MVCTBT+1CH
               ;
05B5           ATODRS      EQU     05B5H
0B67           BRAKNO      EQU     0B67H
09DC           DCADD       EQU     09DCH
09F0           DCSUB       EQU     09F0H
0A79           DHMWL       EQU     0A79H
0768           ERRL2       EQU     0768H
0521           HMAUX       EQU     0521H
0761           LD5         EQU     0761H
09CB           LDTMP       EQU     09CBH
09BD           LDISP       EQU     09BDH
0A0A           MOVLD       EQU     0A0AH
068C           MONIT       EQU     068CH
0B8A           MALFN       EQU     0B8AH
0A26           OSC2K       EQU     0A26H
0ADC           RGO         EQU     0ADCH
0A32           XYNULL      EQU     0A32H
09AD           ZROCK       EQU     09ADH
0B2B           ZGOIN       EQU     0B2BH
0B36           ZGOOUT      EQU     0B36H
               ;
               ;
               ;SHT 22
               ;
               ;GRIND ROUND PUNCH
               ;
               ROUND:
               ;
               ;FEED Z INTO GRINDING WHEEL
               ;
076E 210E10                LXI     H,XSZBT ;HL←X SIZE
0771 0603                  MVI     B,3
0773 CDAD09                CALL    ZROCK   ;X SIZE=0 ?
0776 D26807                JNC     ERRL2   ;NO.DATA ERROR LITE
0779 211110                LXI     H,YSZBT ;YES.HL←Y SIZE
077C 0603                  MVI     B,3
077E CDAD09                CALL    ZROCK   ;Y SIZE=0 ?
0781 D26807                JNC     ERRL2   ;NO. SET DATA ERROR LT
0784 CD4508                CALL    ZBITE   ;YES.
               ;
               ;GRIND ALONG R AXIS FOR 360 DEGREES
               ;
```

```
0787 21AD08            LXI      H,ROT360   ;HL-360 DEG ADDR
078A CD8808            CALL     RGRIND
                 ;
                 ;IF IN AUTO DRESS GOTO DRESS CYCLE
                 ;
078D CDFD08            CALL     PASFLG     ;LAST PASS FLAG ?
0790 DA9D07            JC       LD21       ;YES.GOTO CYFIN
0793 DB06              IN       MODE       ;NO
0795 E640              ANI      GATE6      ;IN AUTO DRESS ?
0797 C4B505            CNZ      ATODRS     ;YES.GOTO DRESS RTN
079A C36E07            JMP      ROUND      ;NO.GOTO ROUND BEGIN
                 ;
                 ;GRINDING IS COMPLETE,SEND Z,X,Y AXES HOME,
                 ;UPDATE INTERNAL ZPOSR AND DISPLAY IT.
                 ;
                 LD21:
079D CDB008            CALL     CYFIN      ;YES.CALL CYCLE FINISH
07A0 C36107            JMP      LD5        ;CLR CYCLE CONDITIONS&RETURN
                 ;
                 ;GRIND SQUARE/RECTANGLE PUNCH
                 ;
                 SQREC:
                 ;
                 ;FEED Z INTO GRINDING WHEEL
                 ;
07A3 210E10            LXI      H,XSZBT
07A6 0603              MVI      B,3
07A8 CDAD09            CALL     ZROCK      ;X SIZE=0 ?
                 ;
                 ;
                 ;SHT 23
                 ;
07AB DA6807            JC       ERRL2      ;YES.DATA ERROR LT
07AE 211110            LXI      H,YSZBT    ;NO.
07B1 0603              MVI      B,3
07B3 CDAD09            CALL     ZROCK      ;Y SIZE=0 ?
07B6 DA6807            JC       ERRL2      ;YES.DATA ERROR LT
07B9 CD4508            CALL     ZBITE      ;NO.
07BC 0E80              MVI      C,80H      ;C-DETERMINES DIRECTION FOR X AX
07BE 0610              MVI      B,10H      ;B-    "            "      " Y "
                 LP50:
                 ;
                 ;GRIND ALONG X AXIS
                 ;
07C0 CD6208            CALL     XGRIND
                 ;
                 ;ROTATE R AXIS 90 DEGREES
                 ;
07C3 21A708            LXI      H,ROT90    ;HL-90 DEG ADDR
07C6 CD8808            CALL     RGRIND
                 ;
                 ;GRIND ALONG Y AXIS
                 ;
07C9 211110            LXI      H,YSZBT    ;HL-Y SIZE ADDR
07CC 111A10            LXI      D,MOVEBT   ;DE-MOVER
07CF CDCB09            CALL     LDTMP      ;MOVER-Y SIZE !
07D2 211A10            LXI      H,MOVEBT   ;HL-MOVER
07D5 CDDC09            CALL     DCADD      ;MOVER=Y SIZE+Y SIZE !
07D8 CD0A0A            CALL     MOVLD      ;EXT MOVER=MOVER !
07DB CD260A            CALL     OSC2K      ;OSC=2KHZ
07DE DB19              IN       XYRATE
07E0 D30A              OUT      DRIVS      ;DRIVS=X/Y FEED RATE
07E2 210110            LXI      H,MVCTBT
07E5 78                MOV      A,B
07E6 0F                RRC
07E7 47                MOV      B,A
07E8 77                MOV      M,A
07E9 D308              OUT      MVCT1      ;SET Y GO(PLUS OR MINUS)
07EB CD8C06            CALL     MONIT      ;CALL MOVE MONITOR
                 ;
                 ;ROTATE R AXIS 90 DEGREES
                 ;
07EE 21A708            LXI      H,ROT90    ;HL-90 DEG ADDR
07F1 CD8808            CALL     RGRIND
07F4 78                MOV      A,B
```

```
07F5 E604              ANI     GATE2   ;IS GRINDING PASS COMPLETE ?
07F7 CAC007            JZ      LP50    ;NO,JUMP BACK
                       ;
                       ;
                       ;SHT 24
                       ;
                       ;
                       ;IF IN AUTO DRESS GOTO DRESS CYCLE
                       ;
07FA CDFD08            CALL    PASFLG  ;LAST PASS FLAG ?
07FD DA0A08            JC      LD22    ;YES.GOTO CYFIN
0800 DB06              IN      MODE    ;NO.
0802 E640              ANI     GATE6   ;IN AUTO DRESS ?
0804 C4D505            CNZ     ATODRS  ;YES.GOTO DRESS RTN
0807 C3A307            JMP     SQREC   ;NO.GOTO SQ/REC BEGIN
                       ;
                       ;GRINDING IS COMPLETE,SEND Z,X,Y HOME,
                       ;UPDATE INTERNAL ZPOSR AND DISPLAY IT.
                       ;
                       LD22:
080A CDB008            CALL    CYFIN   ;CALL CYCLE FINISH
080D C36107            JMP     LD5     ;CLR CYCLE CONDITIONS
                       ;
                       ;GRIND OBROUND PUNCH
                       ;
                       OBRND:
                       ;
                       ;FEED Z INTO GRINDING WHEEL
                       ;
0810 211110            LXI     H,YSZBT ;HL-Y SIZE BYTE
0813 0603              MVI     B,3
0815 CDAD09            CALL    ZROCK   ;Y SIZE=0 ?
0818 D26807            JNC     ERRL2   ;NO.DATA ERROR LT
081B CD4508            CALL    ZBITE
081E 0E80              MVI     C,80H   ;C-DETERMINES DIRECTION FOR X AX
0820 0602              MVI     B,2     ;B=# OF REPEATITIONS IN 1 PASS
                       LP44:
                       ;
                       ;GRIND ALONG X AXIS
                       ;
0822 CD6208            CALL    XGRIND
                       ;
                       ;GRIND ALONG R AXIS FOR 180 DEGREES
                       ;
0825 21AA08            LXI     H,ROT180 ;HL-180 DEG ADDR
0828 CD8808            CALL    RGRIND
082B 05                DCR     B       ;IS GRINDING PASS COMPLETE ?
082C C22208            JNZ     LP44    ;NO.JUMP BACK
                       ;
                       ;IF IN AUTO DRESS GOTO DRESS RTN
                       ;
082F CDFD08            CALL    PASFLG  ;YES.LAST PASS FLAG ?
                       ;
                       ;
                       ;SHT 24A
                       ;ADDITION #3 NOV 26, 1975
                       NOTE: SLOWS Z FEED RATE TO MINIMUM SPEED
                             0.0500" BEFORE SIZE

0BAB 112010            LXI     D,TEMP2
0BAE CDCB09            CALL    LDTMP   ;TEMP2<-MOVER
0BB1 21E50B            LXI     H,K0500 ;STORAGE=000500
0BB4 CDF009            CALL    DCS0B   ;TEMP2=MOVER-00.0500
0BB7 D2DF0B            JNC     LP56    ;MOVER<0.0500"? YES.JUMP
0BBA 0603              MVI     B,3     ;NO.
0BBC EB                XCHG            ;HL<-TEMP2
0BBD CDAD09            CALL    ZROCK   ;MOVER=0.0500"?
0BC0 DADF0B            JC      LP56    ;YES.JUMP
0BC3 111A10            LXI     D,MOVEBT ;NO.MOVER>0.0500"
0BC6 CDCB09            CALL    LDTMP   ;MOVER<-TEMP2 (MOVER-0.0500)
0BC9 CD0A0A            CALL    MOVLD   ;EXT MOVER<-MOVER
0BCC CD260A            CALL    OSC2K   ;OSC=2KHZ
0BCF DB1B              IN      ZRATE
0BD1 D30A              OUT     DRIVS   ;FREQ=Z FEED RATE
0BD3 CD2B0B            CALL    ZGOIN   ;SET Z GO INWARD
```

```
0BD6 CD8C06              CALL    MONIT       ;CALL MOVE MONITOR
0BD9 21E50B              LXI     H,K0500
0BDC CDCB09              CALL    LDTMP       ;MOVER←0.0500"
              LP56:
0BDF CD0A0A              CALL    MOVLD       ;EXT MOVER←MOVER
0BE2 C35408              JMP     BACK
              K0500:
0BE5 000500              DB      0,05,0      ;00.0500"
              ;
              ;SHT 25
              ;
0832 DA3F08              JC      LD23        ;YES.GOTO CYFIN
0835 DB06                IN      MODE        ;NO.
0837 E640                ANI     GATE6       ;IN AUTO DRESS ?
0839 C4B505              CNZ     ATODRS      ;YES.GOTO DRESS RTN
083C C31008              JMP     OBRND       ;NO.GOTO OBROUND BEGIN

;GRINDING IS COMPLETE,SEND Z,X,Y HOME,
              ;UPDATE INTERNAL ZPOSR AND DISPLAY IT.
              ;
              LD23:
083F CDB008              CALL    CYFIN       ;CALL CYCLE FINISH
0842 C36107              JMP     LD5         ;CLR MOVE COMMANDS

;FEED Z INTO GRINDING WHEEL (RTN)
              ;RTN SETS GRINDING BITE.
              ;
              ZBITE:
0845 CD0F09              CALL    LPASS       ;CHECK IF LAST PASS
                                             ;& SET MOVER=DTG IN Z AXIS.
0848 211A10              LXI     H,MOVEBT
084B 110810              LXI     D,ZPSBT
084E CDF009              CALL    DCSUB       ;ZPOSR=ZPOSR-MOVER
0851 C3AB0B              JMP                 ;ADDITION #3
0854 CD260A              CALL    OSC2K       ;OSC=2KHZ
0857 3E01                MVI     A,01
0859 D30A                OUT     DRIVS       ;FREQ=LOWEST Z FEED RATE
085B CD2B0B              CALL    ZGOIN       ;SET Z GO INWARD
085E CD8C06              CALL    MONIT       ;CALL MOVE MONITOR
0861 C9                  RET

;GRIND ALONG X AXIS (RTN)
              ;
              XGRIND:
0862 210E10              LXI     H,XSZBT     ;HL←X SIZE ADDR
0865 111A10              LXI     D,MOVEBT    ;DE←MOVER
0868 CDCB09              CALL    LDTMP       ;MOVER←X SIZE
086B 211A10              LXI     H,MOVEBT    ;HL←MOVER
086E CDDC09              CALL    DCADD       ;MOVER=X SIZE+X SIZE !
0871 CD0A0A              CALL    MOVLD       ;EXT MOVER=MOVER
0874 CD260A              CALL    OSC2K       ;OSC=2KHZ
0877 DB19                IN      XYRATE
0879 D30A                OUT     DRIVS       ;DRIVS=X/Y FEED RATE
087B 210110              LXI     H,MVCTBT
087E 79                  MOV     A,C
087F 07                  RLC
0880 4F                  MOV     C,A

;
              ;SHT 25A
              ;ADDITION #4
              NOTE: SLOWS R AXIS FOR THE LAST 15° GRIND

0BE8 210A0C              LXI     H,K7500     ;15DEG=7500
0BEB CDF009              CALL    DCSUB       ;MOVER=MOVER-7500
0BEE CD0A0A              CALL    MOVLD       ;EXT MOVER←MOVER
0BF1 C39908              JMP     BACK
0BF4 CD8C06              CALL    MONIT       ;CALL MOVE MONITOR
0BF7 CDCB09              CALL    LDTMP       ;MOVER=7500
0BFA CD0A0A              CALL    MOVLD       ;EXT MOVER←MOVER
0BFD 3E01                MVI     A,01
0BFF D30A                OUT     DRIVS       ;DRIVS=LOWEST FEED RATE
0C01 CDDC0A              CALL    RGO         ;SET R GO
```

```
0C04 CD8C06              CALL    MONIT
0C07 C3A508              JMP     BACK
                K7500:
0C0A 007500              DB      0,75,0      ;15DEG=007500
                ;
                ;SHT 26
                ;
0881 77                  MOV     M,A
0882 D308                OUT     MVCT1       ;SET X GO(PLUS OR MINUS)
0884 CD8C06              CALL    MONIT       ;CALL MOVE MONITOR
0887 C9                  RET
                ;
                ;GRIND ALONG R AXIS 90,180 OR 360 DEGREES (RTN)
                ;
                ;BEFORE ENTERING RTN:
                ;HL=ADDR OF # TO BE LOADED INTO MOVER.
                ;
                RGRIND:
0888 D5                  PUSH    D
0889 CD2105              CALL    HMAUX       ;OSC=33.3KHZ
088C DB1A                IN      RRATE
088E D30A                OUT     DRIVS       ;DRIVS=R FEED RATE
0890 111A10              LXI     D,MOVEBT    ;DE←MOVER
0893 CDCB09              CALL    LDTMP       ;MOVER=90 OR 180 OR 360 DEG !
0896 C3E80B              JMP                 ;ADDITION #4
0899 CD670B              CALL    BRAKNO      ;IS BRAKE RELEASED ?
089C DC8A0B              CC      MALFN       ;NO,TRUBLE !
089F CDDC0A              CALL    RGO         ;YES.SET R GO
08A2 C3F40B              JMP                 ;ADDITION #4
                ;
                ;REMOVE SEMICOLON IF BRAKE IS USED
                ;
                ;        CALL    BRAKON      ;SET BRAKE ON,BRAKE ENGAGED ?
                ;        CC      MALFN       ;NO,TRUBLE !
08A5 D1                  POP     D           ;YES.
08A6 C9                  RET
                ;
08A7 005004     ROT90:   DB      0,50H,4     ;90 DEG=45000
08AA 000009     ROT180:  DB      0,0,9       ;180 DEG=90000
08AD 000018     ROT360:  DB      0,0,18H     ;360 DEG=180000
                ;
                ;TERMINATE GRINDING CYCLE (RTN)
                ;
                ;SEND Z,X,Y AXES HOME,
                ;UPDATE INTERNAL ZPOSR AND DISPLAY IT.
                ;
                CYFIN:
08B0 CD790A              CALL    DHMWL       ;UPDATE DHMWL
08B3 111D10              LXI     D,TEMP1     ;DE←ADDR OF DHMWL RESULT
08B6 210810              LXI     H,ZPSBT     ;HL←ZPOSR
08B9 CDF009              CALL    DCSUB       ;TEMP1=DHMWL-ZPOSR
08BC EB                  XCHG                ;HL←TEMP1
08BD 111A10              LXI     D,MOVEBT    ;DE←MOVER
                ;
                ;SHT 27
                ;
08C0 CDCB09              CALL    LDTMP       ;MOVER=DHMWL-ZPOSR !
08C3 CD0A0A              CALL    MOVLD       ;EXT MOVER=MOVER
08C6 CD2105              CALL    HMAUX       ;OSC=33.3KHZ,DRIVS=200IPM
08C9 CD360B              CALL    ZGOOUT      ;SET Z GO OUT !
08CC CD8C06              CALL    MONIT
08CF DB06                IN      MODE
08D1 E640                ANI     GATE6       ;IN AUTO DRESS ?
08D3 C4B505              CNZ     ATODRS      ;YES.GOTO DRESS RTN
08D6 CD790A              CALL    DHMWL       ;NO.UPDATE DHMWL
08D9 210510              LXI     H,DHWBT     ;HL←DHMWL ADDR
08DC 110810              LXI     D,ZPSBT     ;DE←ZPOSR
08DF CDCB09              CALL    LDTMP       ;ZPOSR-DHMWL !
08E2 CDBD09              CALL    LDISP       ;CPU DISPLAY-VALUE ZPOSR AT HOME
08E5 CDEC08              CALL    PZLD        ;LOAD EXT POS REG
08E8 CD320A              CALL    XYNULL      ;RETURN X&Y TO HOME !
08EB C9                  RET
                ;
                ;LOAD EXT POSITION REG (RTN)
```

```
        ;
        PZLD:
08EC D5             PUSH    D
08ED 110810         LXI     D,ZPSBT  ;DE←ZPOSR
08F0 1A             LDAX    D        ;A←M
08F1 D300           OUT     PZLD1    ;O/P←A
08F3 13             INX     D
08F4 1A             LDAX    D
08F5 D301           OUT     PZLD1 +1
08F7 13             INX     D
08F8 1A             LDAX    D
08F9 D302           OUT     PZLD1 +2
08FB D1             POP     D
08FC C9             RET
        ;
        ;CHECK LAST PASS FLAG (RTN)
        ;
        ;IF LAST PASS,SET CARRY AND CLR FLAG.
        ;
        PASFLG:
08FD E5             PUSH    H
08FE AF             XRA     A        ;CLR CARRY
08FF 210310         LXI     H,FLGBT
0902 7E             MOV     A,M
0903 E604           ANI     GATE2    ;LAST PASS FLAG=1 ?
0905 CA0D09         JZ      LD14     ;NO.RETURN
0908 7E             MOV     A,M      ;YES.
0909 E6FB           ANI     MSK2     ;CLR LAST PASS FLAG
        ;
        ;
        ;SHT 28
        ;
090B 77             MOV     M,A
090C 37             STC
        LD14:
090D E1             POP     H
090E C9             RET
        ;
        ;LAST PASS DECISION (RTN)
        ;
        ;DECIDES IF MOVE TO REACH SIZE IS SMALLER
        ;THAN Z FEED INCREMENT. IF SO,MOVER=Z DISTANCE TO GO,
        ;OTHERWISE MOVER=FEED INCREMENT.
        ;
        LPASS:
090F D5             PUSH    D
0910 E5             PUSH    H
0911 111D10         LXI     D,TEMP1  ;DE←TEMP1 ADDR
0914 210810         LXI     H,ZPSBT  ;HL←ZPOSR ADDR
0917 CDCB09         CALL    LDTMP    ;TEMP1=ZPOS REG
091A 210B10         LXI     H,ZSZBT  ;HL←Z SIZE POINT ADDR
091D CDF009         CALL    DCSUB    ;TEMP1=ZPOSR-ZSZPT (ALWAYS +)
0920 211710         LXI     H,FEEDBT ;HL←Z FEED INC ADDR
0923 CDF009         CALL    DCSUB    ;TEMP1=ZPOSR-ZSZPT-FEED INC
0926 D23209         JNC     LD8      ;ZPOSR-ZSZPT-FEEDINC<0?,YES.JUMP
0929 111A10         LXI     D,MOVEBT ;NO.DE←MOVER ADDR
092C CDCB09         CALL    LDTMP    ;MOVER=Z FEED INC
092F C34F09         JMP     LD9
        LD8:
0932 111D10         LXI     D,TEMP1
0935 210810         LXI     H,ZPSBT  ;HL←ZPOSR ADDR
0938 CDCB09         CALL    LDTMP    ;TEMP1=ZPOSR
093B 210B10         LXI     H,ZSZBT  ;HL←Z SIZE PT ADDR
093E CDF009         CALL    DCSUB    ;TEMP1=ZPOSR-ZSIZEPT
0941 211A10         LXI     H,MOVEBT ;HL←MOVER ADDR
0944 EB             XCHG             ;HL←TEMP1,DE←MOVEBT
0945 CDCB09         CALL    LDTMP    ;MOVER=ZPOSR-ZSIZEPT
0948 210310         LXI     H,FLGBT
094B 7E             MOV     A,M      ;GET CYCLE FLAG STATUS
094C F604           ORI     GATE2    ;SET LAST PASS FLAG
094E 77             MOV     M,A
        LD9:
094F E1             POP     H
0950 D1             POP     D
0951 C9             RET
```

```
                ;
                ;
                ;
                ; .
0000            END

P=3

:10076E00210E100603CDAD09D268072111110060324
:10077E00CDAD09D26807CD450821AD08CD8808CD8D
:10078E00FD08DA9D07DB06E640C4B505C36E07CD4E
:10079E00B008C36107210E100603CDAD09DA680754
:1007AE002111100603CDAD09DA6807CD45080E807C
:1007BE000610CD620821A708CD880821111011A144 (hard to read)
:1007CE0010CDCB09211A10CDDC09CD0A0ACD260A8F
:1007DE00DB19D30A210110780F4777D308CD8C0689
:1007EE0021A708CD880878E604CAC007CDFD08DA2F
:1007FE000A08DB06E640C4B505C3A307CDB008C39F
:10080E006107211110060 3CDAD09D26807CD450849
:10081E00E800602CD620821AA08CD880805C222E4
:10082E0008CDFD08DA3F08DB06E640C4B505C31067
:10083E0008CDB008C36107CD0F09211A1011081099 (approx)
:10084E00CDF009CD0A0ACD260ADB1BD30ACD2B0B20
:10085E00CD8C06C9210E10111A10CDCB09211A10FC
:10086E00CDDC09CD0A0ACD260ADB19D30A210110E7
:10087E0079074F77D308CD8C06C9D5CD2105DB1A64
:10088E00D30A111A10CDCB09CD0A0ACD670BDC8A1B
:10089E00BCDDC0ACD8C06D1C9005004000009 0036
:1008AE000018CD790A111D10210810CDF009EB1199
:1008BE001A10CDCB09CD0A0ACD2105CD360BCD8C24
:1008CE0006DB06E640C4B505CD790A2105101108F0
:1008DE0010CDCB09CDBD09CDEC08CD320AC9D5114D
:1008EE0008101AD300131AD301131AD302D1C9E573
:1008FE00AF2103107EE604CA0D097EE6FB7737E1D1
:10090E00C9D5E5111D10210810CDCB09210B10CD35
:10091E00F009211710CDF009D23209111A10CDCBE2
:10092E0009C34F09111D10210810CDCB09210B1041
:10093E00CDF009211A10EBCDCB092103107EF60460
:04094E0077E1D1C9B3
:00000001FF

P=

;
                ;SHT 28A
                ;
                ;SYMBOL TABLE
                ;
0000            ORG     952H
0002    CTRSW   EQU     2
0007    FNCTR   EQU     7
0008    GATE3   EQU     00001000B
0010    GATE4   EQU     00010000B
0020    GATE5   EQU     00100000B
0006    LITE1   EQU     6
0008    MVCT1   EQU     8
0004    MCSW2   EQU     4
00FB    MSK2    EQU     11111011B
00F7    MSK3    EQU     11110111B
0006    MODE    EQU     6
                ;
1000    L1BYT   EQU     1000H
1001    MVCTBT  EQU     L1BYT+1
1004    FNBYT   EQU     L1BYT+4

0B13    HLDLGO  EQU     0B13H
0B1F    HLDLNO  EQU     0B1FH
                ;
                ;
                ;
                ;SHT 29
                ;
```

```
                        ;CHECK FOR AUTO MODE (RTN)
                        ;
                        ;IF CARRY=1 IN AUTO MODE
                        ;
                        ATOMD:
0952 DB06                       IN      MODE    ;GET MODE STATUS
0954 E638                       ANI     GATE3 OR GATE4 OR GATE5
0956 C8                         RZ              ;IN AUTO MODE ?,NO.RETURN
0957 37                         STC             ;YES.SET CARRY
0958 C9                         RET
                        ;
                        ;CYCLE CLEAR (RTN)
                        ;
                        ;CLEAR CYCLE LITES & STOP MOVE.
                        ;
                        CYCLR:
0959 E5                         PUSH    H
095A CD6809                     CALL    MVCLR   ;STOP MOVE
095D 210010                     LXI     H,L1BYT
0960 7E                         MOV     A,M
0961 E6C6                       ANI     11000110B ;CLR CYCLE START &
0963 77                         MOV     M,A       ;BLANK SIZE LITES,X & Y SIZE
0964 D306                       OUT     LITE1
0966 E1                         POP     H
0967 C9                         RET
                        ;
                        ;MOVE CLEAR (RTN)
                        ;
                        MVCLR:
0968 E5                         PUSH    H
0969 210110                     LXI     H,MVCTBT
096C AF                         XRA     A
096D 77                         MOV     M,A       ;CLR MOVE COMMAND
096E D308                       OUT     MVCT1
0970 E1                         POP     H
0971 C9                         RET
                        ;
                        ;MOVE HOLD/START (RTN)
                        ;
                        ;STOPS WHEN:1)FEED HOLD P.B ACTIVE
                        ;           2)MACHINE INDICATORS ARE ON
                        ;STARTS WHEN: CYCLE START P.B ACTIVE
                        ;
                        MVHLD:
0972 E5                         PUSH    H
0973 DB04                       IN      MCSW2   ;MACH IND ON ?
                        ;
                        ;
                        ;SHT 29A
                        ;ADDITION #5 NOV 26, 1975
                        NOTE: PREVENTS ALL STOP WHEN IN XYHOM RTN AND X+0,T
                              OR Y+0,T ARE HIT, AND ALSO WHEN IN AUTO DRESS
                              OR NEW WHEEL DRESS AND DRESSER IS TURNED ON.

0C0D DB06                       IN      MODE
0C0F E638                       ANI     00111000B ;IN AUTO MODE ?
0C11 CA280C                     JZ      LP57    ;NO.
0C14 DB08                       IN      I/P#8   ;YES.GET DRESSER STATUS
0C16 E610                       ANI     GATE4   ;DRESSER FAULT ?
0C18 C28209                     JNZ     LP18    ;NO.TROUBLE STOP MOVE
                        LP58:
0C1B CD1404                     CALL    DLY1S   ;YES.WAIT 1 SEC
0C1E DB08                       IN      I/P#8
0C20 E610                       ANI     GATE4   ;STILL DRESSER FAULT ?
0C22 CA8209                     JZ      LP18    ;YES.TROUBLE STOP MOVE
0C25 C38009                     JMP     LP23    ;NO.NO PROBLEM GO BACK
                        LP57:
0C28 DB05                       IN      TBPOS
0C2A 07                         RLC             ;EXES FWG ERROR ?
0C2B D28209                     JNC     LP18    ;YES.TROUBLE STOP MOVE
0C2E DB08                       IN      I/P#8   ;NO.
0C30 E610                       ANI     GATE4   ;DRESSER FAULT ?
0C32 C28009                     JNZ     LP23    ;NO.NO PROBLEM GO BACK
0C35 C31B0C                     JMP     LP58    ;YES.
```

```
                ;
                ;SHT 30
                ;
0975 07                 RLC
0976 0D0C               JC      ADDITION #5  ;YES.STOP MOVE
0979 DB02               IN      CTRSW        ;NO.
097B E620               ANI     GATE5        ;FEED HOLD ?
097D C28209             JNZ     LP18         ;YES.STOP MOVE
        LP23:
0980 E1                 POP     H            ;NO.RETURN
0981 C9                 RET
        LP18:
0982 AF                 XRA     A            ;CLR ACC
0983 D308               OUT     MVCT1        ;STOP MOVE !!!
0985 210410             LXI     H,FNBYT      ;GET ADDR OF FUNC CTRL
0988 7E                 MOV     A,M          ;A←FUNC CTRL
0989 E6F3               ANI     MSK2 AND MSK3  ;SHUT DRESS ENABLE
098B D307               OUT     FNCTR        ;& 5SEC DRESS.
098D CD130B             CALL    HLDLGO       ;TURN FEED HOLD LT ON
        LP19:
0990 DB02               IN      CTRSW        ;CYCLE START ?
0992 E610               ANI     GATE4
0994 CA9009             JZ      LP19         ;NO.WAIT
0997 CD1F0B             CALL    HLDLNO       ;SHUT FEED HOLD LT
099A 210110             LXI     H,MVCTBT     ;GET MOVE CTRL BYTE
099D 7E                 MOV     A,M
099E D308               OUT     MVCT1        ;RESUME MOVE !!!
09A0 210410             LXI     H,FNBYT      ;GET FUNC CTRL BYTE
09A3 7E                 MOV     A,M
09A4 D307               OUT     FNCTR        ;RESUME DRESS CYCLE !!!
09A6 C38009             JMP     LP23         ;GO BACK TO LOOP
                ;
                ;
0000            END

P=3

:100952000DB06E638C837C9E5CD68092100107EE616
:10096200C677D306E1C9E5210110AF77D308E1C903
:10097200E5DB0407DA8209DB02E620C28209E1C96B
:10098200AFD3082104107EE6F3D307CD130BDB02AD
:10099200E610CA9009CD1F0B2101107ED308210455
:0709A200107ED307C380099A
:00000001FF

P=

;
                ;SHT 30A
                ;
                ;SYMBOL TABLE
                ;
0000                    ORG     09ADH
0003            CPUDS1  EQU     3
000A            DRIVS   EQU     10D
001E            DRES1   EQU     30D
0001            GATE0   EQU     00000001B
0002            GATE1   EQU     00000010B
0004            GATE2   EQU     00000100B
0008            GATE3   EQU     00001000B
0020            GATE5   EQU     00100000B
0040            GATE6   EQU     01000000B
0006            LITE1   EQU     6
0008            MVCT1   EQU     8
0009            MVCT2   EQU     9
000B            MVRG1   EQU     11D
00FD            MSK1    EQU     11111101B
001C            WLOFST  EQU     28D
                ;
1000            L1BYT   EQU     1000H
1001            MVCTBT  EQU     L1BYT+1
1003            FLGBT   EQU     L1BYT+3
1005            DHWBT   EQU     L1BYT+5
```

```
100E            XSZBT       EQU     L1BYT+0EH
1011            YSZBT       EQU     L1BYT+11H
101A            MOVERT      EQU     L1BYT+1AH
101D            TEMP1       EQU     L1BYT+1DH
1020            TEMP2       EQU     L1BYT+20H
                ;
0521            HMAUX       EQU     0521H
068C            MONIT       EQU     068CH
                ;
                ;
                ;
                ;SHT 31
                ;
                ;ZERO CHECK (RTN)
                ;
                ;BEFORE ENTERING RTN:
                ;B=# OF DIGIT PAIRS TO CHECK
                ;HL=MEM ADDR OF DATA TO BE CHECKED
                ;SET CARRY=1 IF # IS ZERO
                ;
                ZROCK:
09AD  E5                    PUSH    H
09AE  C5                    PUSH    B
09AF  AF                    XRA     A           ;CLR CARRY & ACC
                LP41:
09B0  B6                    ORA     M           ;DIGIT PAIR=0 ?
09B1  C2BA09                JNZ     LD18        ;NO.RETURN
09B4  23                    INX     H           ;YES.
09B5  05                    DCR     B           ;ALL DIGIT PAIRS CHECKED ?
09B6  C2B009                JNZ     LP41        ;NO.GO LOOP
09B9  37                    STC                 ;YES.
                LD18:
09BA  C1                    POP     B
09BB  E1                    POP     H
09BC  C9                    RET
                ;
                ;LOADING DISPLAY FROM MEMORY (RTN)
                ;
                ;BEFORE ENTERING RTN:
                ;DE=MEMORY ADDR OF DATA
                ;
                LDISP:
09BD  D5                    PUSH    D
09BE  1A                    LDAX    D
09BF  D303                  OUT     CPUDS1
09C1  13                    INX     D
09C2  1A                    LDAX    D
09C3  D304                  OUT     CPUDS1 +1
09C5  13                    INX     D
09C6  1A                    LDAX    D
09C7  D305                  OUT     CPUDS1 +2
09C9  D1                    POP     D
09CA  C9                    RET
                ;
                ;
                ;SHT 32
                ;
                ;LOAD TEMPORARY LOCATION IN MEMORY (RTN)
                ;
                ;BEFORE ENTERING RTN:
                ;HL=ADDR OF # TO BE MOVED
                ;DE=ADDR OF DESTINATION
                ;(DE)-(HL)
                ;
                LDTMP:
09CB  C5                    PUSH    B
09CC  D5                    PUSH    D
09CD  E5                    PUSH    H
09CE  0603                  MVI     B,3D        ;# OF DIGIT PAIRS
                LP14:
09D0  7E                    MOV     A,M         ;A-(H)(L)
09D1  12                    STAX    D           ;(D)(E)-A
09D2  23                    INX     H
09D3  13                    INX     D
09D4  05                    DCR     B           ;I/P DONE ?
```

```
09D5 C2D009           JNZ     LP14    ;NO.GO LOOP
09D8 E1               POP     H       ;YES.
09D9 D1               POP     D
09DA C1               POP     B
09DB C9               RET
                ;
                ;DECIMAL ADDITION (RTN)
                ;
                ;BEFORE ENTERING RTN:
                ;DE=ADDR OF AUGEND
                ;HL=ADDR OF ADDEND
                ;RESULT IN AUGEND
                ;(DE)<-(DE)+(HL)
                ;
                DCADD:
09DC D5               PUSH    D
09DD E5               PUSH    H
09DE C5               PUSH    B
09DF 0E03             MVI     C,3     ;C<-# OF DIGIT PAIRS
                                      ;TO BE OPERATED UPON.
09E1 AF               XRA     A       ;CLR CARRY&ACC
                LP16:
09E2 1A               LDAX    D       ;A<-AUGEND
09E3 8E               ADC     M       ;AUGEND+ADDEND
09E4 27               DAA
09E5 12               STAX    D       ;STORE INSTEAD OF AUGEND
09E6 23               INX     H
09E7 13               INX     D
                ;
                ;SHT 33
                ;
09E8 0D               DCR     C       ;ADDITION DONE ?
09E9 C2E209           JNZ     LP16    ;NO.GO LOOP
09EC C1               POP     B       ;YES.
09ED E1               POP     H
09EE D1               POP     D
09EF C9               RET
                ;
                ;DECIMAL SUBTRACTION (RTN)
                ;
                ;BEFORE ENTERING RTN:
                ;DE=ADDR OF MINUEND & RESULT
                ;HL=ADDR OF SUBTRAHEND
                ;(DE)<-(DE)-(HL)
                ;
                DCSUB:
09F0 D5               PUSH    D
09F1 E5               PUSH    H
09F2 C5               PUSH    B
09F3 0E03             MVI     C,3     ;C<-# OF DIGIT PAIRS
                                      ;TO BE OPERATED UPON.
09F5 37               STC
                LP15:
09F6 3E99             MVI     A,99H   ;A<-99 HEX
09F8 CE00             ACI     0       ;ADD W/CARRY
09FA 96               SUB     M       ;SUBTRACT M FROM A
09FB EB               XCHG            ;EXCHANGE DE & HL
09FC 86               ADD     M       ;ADD M TO A
09FD 27               DAA             ;DECIMAL ADJUST
09FE 77               MOV     M,A     ;RESULT INTO MEMORY
09FF EB               XCHG            ;EXCHANGE DE & HL
0A00 13               INX     D
0A01 23               INX     H
0A02 0D               DCR     C       ;SUBTRACTION DONE ?
0A03 C2F609           JNZ     LP15    ;NO.GO LOOP
0A06 C1               POP     B
0A07 E1               POP     H       ;YES.
0A08 D1               POP     D
0A09 C9               RET
                ;
                ;
                ;
                ;SHT 34
                ;
                ;MOVE REGISTER LOAD (RTN)
```

```
        ;
        ;LOADS (MOVER-1) INTO EXTERNAL MOVE REG
        ;
                MOVLD:
0A0A D5                 PUSH    D
0A0B E5                 PUSH    H
0A0C 111A10             LXI     D,MOVEBT ;DE=MOVER ADDR
0A0F 21230A             LXI     H,K001BT ;HL=CONSTANT=0001" ADDR
0A12 CDF009             CALL    DCSUB    ;MOVER=MOVER-1
0A15 1A                 LDAX    D
0A16 D30B               OUT     MVRG1
0A18 13                 INX     D
0A19 1A                 LDAX    D
0A1A D30C               OUT     MVRG1+1
0A1C 13                 INX     D
0A1D 1A                 LDAX    D
0A1E D30D               OUT     MVRG1+2
0A20 E1                 POP     H
0A21 D1                 POP     D
0A22 C9                 RET
0A23 010000     K001BT: DB      1,0,0    ;CONSTANT=.0001"
        ;
        ;SET OSCILLATOR TO 2KHZ (RTN)
        ;
                OSC2K:
0A26 E5                 PUSH    H
0A27 210310             LXI     H,FLGBT
0A2A 7E                 MOV     A,M      ;GET CYCLE FLAGS
0A2B E6FD               ANI     MSK1     ;OSC=2KHZ
0A2D 77                 MOV     M,A
0A2E D309               OUT     MVCT2
0A30 E1                 POP     H
0A31 C9                 RET
        ;
        ;RETURN X AND Y TO HOME (RTN)
        ;
                XYNULL:
0A32 E5                 PUSH    H
0A33 D5                 PUSH    D
0A34 C5                 PUSH    B
0A35 210E10             LXI     H,XSZBT  ;HL=X SIZE ADDR
0A38 0603               MVI     B,3
0A3A CDAD09             CALL    ZROCK    ;X SIZE=0 ?
0A3D DA4C0A             JC      LD17     ;YES.GOTO Y AXIS
0A40 111A10             LXI     D,MOVEBT ;NO.DE=MOVER ADDR
        ;
        ;SHT-35
        ;
0A43 CD6B0A             CALL    NULL1    ;LOAD MOVER,SET FREQ.
0A46 CDE70A             CALL    XGOPS    ;SET X GO PLUS
0A49 CD8C06             CALL    MONIT    ;WAIT TILL AXIS IN POSITION
                LD17:
0A4C 211110             LXI     H,YSZBT  ;HL=Y SIZE ADDR
0A4F CDAD09             CALL    ZROCK    ;Y SIZE=0 ?
0A52 DA5E0A             JC      LD19     ;YES.RETURN
0A55 CD6B0A             CALL    NULL1    ;LOAD MOVER & SET FREQ
0A58 CD080B             CALL    YGOMS    ;SET Y GO MINUS
0A5B CD8C06             CALL    MONIT    ;WAIT TILL AXIS IN POSITION
                LD19:
0A5E 210010             LXI     H,L1BYT
0A61 7E                 MOV     A,M
0A62 E6E7               ANI     11100111B
0A64 77                 MOV     M,A
0A65 D306               OUT     LITE1    ;SHUT X SIZE & Y SIZE LITES
0A67 C1                 POP     B
0A68 D1                 POP     D
0A69 E1                 POP     H
0A6A C9                 RET
        ;
        ;AUX 1 TO XYNULL (RTN)
        ;
                NULL1:
0A6B CDCB09             CALL    LDTMP    ;MOVER=X OR Y SIZE
0A6E CD0A0A             CALL    MOVLD    ;EXT MOVER=MOVER
0A71 CD2105             CALL    HMAUX    ;OSC=33.3KHZ
```

```
0A74 3E30              MVI     A,30H       ;DRIVS=60IPM
0A76 D30A              OUT     DRIVS
0A78 C9                RET
                ;
                ;DISTANCE HOME WHEEL UPDATE (RTN)
                ;
                ;DHMWL=TOTDIS-12.0000"-.0050"+WHL OFFSET+DRES COUNTER
                ;
                DHMWL:
0A79 C5                PUSH    B
0A7A D5                PUSH    D
0A7B E5                PUSH    H
0A7C 111D10            LXI     D,TEMP1     ;DE←TEMP1
0A7F 21D60A            LXI     H,TOTDIS    ;HL←TOTAL DISTANCE ADDR
0A82 CDCB09            CALL    LDTMP       ;TEMP1←TOTDIS
0A85 21D90A            LXI     H,WLSIZE    ;HL←WLSIZE
0A88 CDF009            CALL    DCSUB       ;TEMP1=TOTDIS-WLSIZE
0A8B EB                XCHG                ;HL←TEMP1,DE←WLSIZE
0A8C 112010            LXI     D,TEMP2     ;DE←TEMP2
                ;
                ;
                ;SHT 36
                ;
0A8F DB1C              IN      WLOFST      ;A←WHEEL OFFSET
0A91 12                STAX    D
0A92 13                INX     D
0A93 AF                XRA     A
0A94 12                STAX    D
0A95 13                INX     D
0A96 12                STAX    D           ;LOAD WHEEL OFFSET INTO TEMP2
0A97 1B                DCX     D
0A98 1B                DCX     D
0A99 CDDC09            CALL    DCADD       ;TEMP2=TOTDIS-WLSIZE+WLOFST
0A9C EB                XCHG                ;HL←TEMP2,DE←TEMP1
0A9D DB1E              IN      DRES1       ;A←DRESS COUNTER
0A9F 2F                CMA
0AA0 47                MOV     B,A
0AA1 E60F              ANI     0FH
0AA3 07                RLC
0AA4 07                RLC
0AA5 07                RLC
0AA6 07                RLC                 ;SHIFT 4 POS LEFT&ENTER ZEROS
0AA7 12                STAX    D           ;STORE
0AA8 78                MOV     A,B         ;GET DRESS COUNTER 1
0AA9 E6F0              ANI     0F0H
0AAB 0F                RRC
0AAC 0F                RRC
0AAD 0F                RRC
0AAE 0F                RRC                 ;SHIFT 4 POS RIGHT&ENTER ZEROS
0AAF 4F                MOV     C,A         ;STORE TEMPORARY
0AB0 DB1F              IN      DRES1+1
0AB2 2F                CMA
0AB3 47                MOV     B,A
0AB4 E60F              ANI     0FH
0AB6 07                RLC
0AB7 07                RLC
0AB8 07                RLC
0AB9 07                RLC
0ABA 81                ADD     C           ;COMBINE 2ND & 3RD DIGITS TO BE
0ABB 13                INX     D           ;3RD & 4TH
0ABC 12                STAX    D           ;STORE
0ABD 78                MOV     A,B         ;GET DRES COUNTER 2
0ABE E6F0              ANI     0F0H
0AC0 0F                RRC
0AC1 0F                RRC
0AC2 0F                RRC
0AC3 0F                RRC
0AC4 13                INX     D
0AC5 12                STAX    D
                ;
                ;SHT 37
                ;
0AC6 1B                DCX     D
0AC7 1B                DCX     D
0AC8 CDDC09            CALL    DCADD       ;TEMP1=TOTDIS-WLSIZE+WLOFST+DRSC
```

```
0ACB EB              XCHG              ;HL←TEMP1
0ACC 110510          LXI     D,DHWBT   ;DE-DISTANCE HOME WHEEL ADDR
0ACF CDCB09          CALL    LDTMP     ;DHWBT-DISTANCE HOME WHEEL
0AD2 E1              POP     H
0AD3 D1              POP     D
0AD4 C1              POP     B
0AD5 C9              RET
0AD6 000027  TOTDIS: DB      00,00,27H ;1ST#=LSB,3RD#=MSB OF TOTAL
                                       ;DISTANCE FROM HOME TO WHL CEN
0AD9 500012  WLSIZE: DB      50H,00,12H ;INCLUDES NEW WHL SIZE 12" &
                                       ;.0050" WHEEL OFFSET.
             ;
             ;SET R GO (RTN)
             ;
             RGO:
0ADC E5              PUSH    H
0ADD 210110          LXI     H,MVCTBT
0AE0 3E40            MVI     A,GATE6   ;SET R GO
0AE2 77              MOV     M,A
0AE3 D308            OUT     MVCT1
0AE5 E1              POP     H
0AE6 C9              RET
             ;
             ;SET X GO PLUS (RTN)
             ;
             XGOPS:
0AE7 E5              PUSH    H
0AE8 210110          LXI     H,MVCTBT
0AEB 3E01            MVI     A,GATE0   ;SET X GO PLUS
0AED 77              MOV     M,A
0AEE D308            OUT     MVCT1
0AF0 E1              POP     H
0AF1 C9              RET
             ;
             ;SET X GO MINUS (RTN)
             ;
             XGOMS:
0AF2 E5              PUSH    H
0AF3 210110          LXI     H,MVCTBT
0AF6 3E02            MVI     A,GATE1   ;SET X GO MINUS
0AF8 77              MOV     M,A
0AF9 D308            OUT     MVCT1
0AFB E1              POP     H
0AFC C9              RET
             ;SHT 38
             ;
             ;
             ;SET Y GO PLUS (RTN)
             ;
             YGOPS:
0AFD E5              PUSH    H
0AFE 210110          LXI     H,MVCTBT
0B01 3E04            MVI     A,GATE2   ;SET Y GO PLUS
0B03 77              MOV     M,A
0B04 D308            OUT     MVCT1
0B06 E1              POP     H
0B07 C9              RET
             ;
             ;SET Y GO MINUS (RTN)
             ;
             YGOMS:
0B08 E5              PUSH    H
0B09 210110          LXI     H,MVCTBT
0B0C 3E08            MVI     A,GATE3   ;SET Y GO MINUS
0B0E 77              MOV     M,A
0B0F D308            OUT     MVCT1
0B11 E1              POP     H
0B12 C9              RET
             ;
             ;SET FEED HOLD LITE ON (RTN)
             ;
             HLDLGO:
0B13 E5              PUSH    H
0B14 210010          LXI     H,L1BYT
```

```
0B17 7E              MOV    A,M      ;GET LITE STATUS
0B18 F602            ORI    GATE1    ;SET FEED HOLD LITE ON
0B1A 77              MOV    M,A
0B1B D306            OUT    LITE1
0B1D E1              POP    H
0B1E C9              RET
                ;
                ;SHUT FEED HOLD LITE OFF (RTN)
                ;
                HLDLNO:
0B1F E5              PUSH   H
0B20 210010          LXI    H,L1BYT
0B23 7E              MOV    A,M
0B24 E6FD            ANI    MSK1     ;SHUT FEED HOLD LITE
0B26 77              MOV    M,A
0B27 D306            OUT    LITE1
0B29 E1              POP    H
0B2A C9              RET
                ;
                ;SHT 39
                ;
                ;SET Z GO INWARD (RTN)
                ;
                ZGOIN:
0B2B E5              PUSH   H
0B2C 210110          LXI    H,MVCTBT
0B2F 3E20            MVI    A,GATE5  ;SET Z GO INWARD
0B31 77              MOV    M,A
0B32 D308            OUT    MVCT1
0B34 E1              POP    H
0B35 C9              RET
                ;
                ;
0000            END
```

P=3

:1009AD00E5C5AFB6C2BA092305C2B00937C1E1C961
:1009BD00D51AD303131AD304131AD305D1C9C5D528
:1009CD00E506037E12231305C2D009E1D1C1C9D5B5
:1009DD00E5C50E03AF1A8E271223130DC2E209C10E
:1009ED00E1D1C9D5E5C50E03373E99CE0096EBB60C
:1009FD002777EB13230DC2F609C1E1D1C9D5E51156
:100A0D001A1021230ACDF0091AD30B131AD30C1384
:100A1D001AD30DE1D1C9010000E52103107EE6FDD9
:100A2D0077D309E1C9E5D5C5210E100603CDAD0972
:100A3D00DA4C0A111A10CD6B0ACDE70ACD8C0621BE
:100A4D001110CDAD09DA5E0ACD6B0ACD080BCD8C38
:100A5D0062100107EE6E777D306C1D1E1C9CDCBE3
:100A6D0009CD0A0ACD21053E30D30AC9C5D5E511F8
:100A7D001D1021D60ACDCB0921D90ACDF009EB11D4
:100A8D002010DB1C1213AF1213121B1BCDDC09EB54
:100A9D00DB1E2F47E60F070707071278E6F00F0F4B
:100AAD000F0F4FDB1F2F47E60F07070707811312A5
:100ABD0078E6F00F0F0F0F13121B1BCDDC09EB1196
:100ACD00510CDCB09E1D1C1C9000027500012E5B9
:100ADD002101103E4077D308E1C9E52101103E0107
:100AED0077D308E1C9E52101103E0277D308E1C9AA
:100AFD00E52101103E0477D308E1C9E52101103E3F
:100B0D000877D308E1C9E52100107EF60277D306F8
:100B1D00E1C9E521001 07EE6FD77D306E1C9E521A7
:090B2D0001103E2077D308E1C954
:00000001FF

P=

```
                ;
                ;SHT 39A
                ;
                ;SYMBOL TABLE
                ;
0000                 ORG    0B36H
0015            CONS3    EQU  15H
```

```
0002            CTRSW       EQU     2
0007            FNCTR       EQU     7
0002            GATE1       EQU     00000010B
0010            GATE4       EQU     00010000B
0020            GATE5       EQU     00100000B
0080            GATE7       EQU     10000000B
0008            MVCT1       EQU     8
0004            MCSW2       EQU     4
00FD            MSK1        EQU     11111101B
00FB            MSK2        EQU     11111011B
00F7            MSK3        EQU     11110111B
                ;
1001            MVCTBT      EQU     1001H
1004            FNBYT       EQU     MVCTBT+3
                ;
0959            CYCLR       EQU     0959H
0400            DLY12       EQU     0400H
0414            DLY1S       EQU     0414H
0B13            HLDLGO      EQU     0B13H
0B1F            HLDLNO      EQU     0B1FH
                ;
                ;
                ;
                ;SHT 40
                ;
                ;SET Z GO OUT (RTN)
                ;
                ZGOOUT:
0B36 E5                     PUSH    H
0B37 210110                 LXI     H,MVCTBT
0B3A 3E10                   MVI     A,GATE4     ;SET Z GO OUT
0B3C 77                     MOV     M,A
0B3D D308                   OUT     MVCT1
0B3F E1                     POP     H
0B40 C9                     RET
                ;
                ;R HYDRAULIC BRAKE ON (RTN)
                ;
                ;ENGAGES BRAKE AND WAITS FOR "BRAKE ON" SIGNAL.
                ;SET CARRY=1 IF BRAKE DOES NOT ENGAGE.
                ;
                BRAKON:
0B41 E5                     PUSH    H
0B42 D5                     PUSH    D
0B43 AF                     XRA     A           ;RESET CARRY
0B44 210410                 LXI     H,FNBYT     ;HL-FUNC CTRL BYTE
0B47 7E                     MOV     A,M
0B48 F602                   ORI     GATE1       ;ENGAGE R HYD BRAKE
0B4A 77                     MOV     M,A
0B4B D307                   OUT     FNCTR
0B4D 1E15                   MVI     E,CONS3     ;E-10D, WAIT MAX 150MSEC
                LP36:
0B4F CD0004                 CALL    DLY12       ;WAIT 12MSEC
0B52 DB04                   IN      MCSW2
0B54 E620                   ANI     GATE5       ;R BRAKE ON ?
0B56 CA640B                 JZ      LD11        ;YES.
0B59 1D                     DCR     E           ;NO.
0B5A C24F0B                 JNZ     LP36
0B5D CD130B                 CALL    HLDLGO      ;SET FEED HOLD LITE ON
0B60 CD5909                 CALL    CYCLR       ;CLR CYCLE COMMANDS
0B63 37                     STC                 ;SET CARRY
                LD11:
0B64 D1                     POP     D
0B65 E1                     POP     H
0B66 C9                     RET
                ;
                ;SHT 41
                ;
                ;R HYDRAULIC BRAKE RELEASE (RTN)
                ;
                ;RELEASES BRAKE AND WAITS FOR "BRAKE ON" SIGNAL
                ;TO BE REMOVED. SET CARRY=1 IF BRAKE DOES NOT RELEASE.
                ;
                BRAKNO:
0B67 E5                     PUSH    H
0B68 D5                     PUSH    D
```

```
0B69 AF                 XRA     A           ;RESET CARRY
0B6A 210410             LXI     H,FNBYT     ;HL-FUNC CTRL BYTE
0B6D 7E                 MOV     A,M
0B6E E6FD               ANI     MSK1        ;RELEASE R HYD BRAKE
0B70 77                 MOV     M,A
0B71 D307               OUT     FNCTR
0B73 1E15               MVI     E,CONS3     ;E-10D,WAIT MAX 150MSEC
              LP35:
0B75 CD0004             CALL    DLY12       ;WAIT 12MSEC
0B78 DB04               IN      MCSW2
0B7A E620               ANI     GATE5       ;R BRAKE ON ?
0B7C C2870B             JNZ     LD10        ;NO.JUMP
0B7F 1D                 DCR     E           ;YES.
0B80 C2750B             JNZ     LP35
0B83 CD5909             CALL    CYCLR       ;CLR CYCLE COMMANDS
0B86 37                 STC                 ;SET CARRY
              LD10:
0B87 D1                 POP     D
0B88 E1                 POP     H
0B89 C9                 RET
              ;
              ;MALFUNCTION (RTN)
              ;
              ;MALFUNCTION THAT PROGRAM DETECTS
              ;AND IS NOT DISPLAYED BY FAULT INDICATOR
              ;TAKES CONTROL TO THIS RTN.
              ;
              MALFN:
0B8A CD5909             CALL    CYCLR       ;CLR CYCLE COMMAND
0B8D 210410             LXI     H,FNBYT
0B90 7E                 MOV     A,M
0B91 E6F3               ANI     MSK2 AND MSK3 ;SHUT DRESS CYCLE
0B93 D307               OUT     FNCTR
0B95 CD130B             CALL    HLDLGO      ;TURN FEED HOLD LT ON !
0B98 CD1404             CALL    DLY1S       ;WAIT 1 SEC
0B9B CD1F0B             CALL    HLDLNO      ;SHUT FEED HOLD LT !
0B9E CD1404             CALL    DLY1S
0BA1 C38A0B             JMP     MALFN       ;STAY IN LOOP UNTILL
                                            ;COMPUTER IS RESET!!!
              ;
              ;SHT_42
              ;
              ;SERVO SENSE (RTN)
              ;
              ;CARRY=1 - SERVO ON
              ;CARRY=0 - SERVO OFF
              ;
              SRVO:
0BA4 DB02               IN      CTRSW       ;GET SRVO STATUS
0BA6 E680               ANI     GATE7       ;IS SERVO ON ?
0BA8 C8                 RZ                  ;NO.CARRY=0,RETURN
0BA9 37                 STC                 ;YES.CARRY=1
0BAA C9                 RET
              ;
0000          END
```

P=

`3

:100B360GE52101103E1077D308E1C9E5D5AF2104C0
:100B4600107EF60277D3071E15CD0004DB04E620DF
:100B5600CA640B1DC24F0BCD130BCD590937D1E11A
:100B6600C9E5D5AF2104107EE6FD77D3071E15CD66
:100B760000004DB04E620C2870B1DC2750BCD5909A4
:100B860037D1E1C9CD59092104107EE6F3D307CD4B
:100B9600130BCD1404CD1F0BCD1404C38A0EDB023B
:050BA600E680C837C91C
:00000001FF

P=

We claim as our invention:

1. In a multi-axis punch grinding system suitable for the high speed grinding of punches, having a material removing element symmetrical about its axis of rotation, means to rotate said material removing element at a controlled rate, a Z slide, having a Z axis of relative movement perpendicular to and intersecting the axis of rotation of said material removing element with drive means to effect movement of said Z slide, rotary table means having an axis of rotation parallel to that of said material removing element with drive means to effect rotary movement; said rotary table means being mounted on said Z slide; slide means mounted on said rotary table with drive means to effect movement of said slide means; said slide means supporting the workpiece, the improvement comprising:

a control system for said multi-axis punch grinding system comprising input means selectively operable for selecting one of a plurality of closed cross-sectional punch configurations, so as to define a selected final shape for the workpiece, and for pre-specifying a set of dimensional parameters defining a selected final size for the workpiece, axes positioning system means, logic means to control said axes positioning system means, and computer means constructed and arranged to receive data from said input means thereby to digitally pre-store data from the input means including the selected one of the plurality of closed cross-sectional punch configurations and the set of pre-specified dimensional parameters, and having control means for controlling said computer means to produce outputs for said logic means which control said axes positioning system means; said computer means producing said outputs based on the selected one of a plurality of closed cross-sectional punch configurations digitally pre-stored in said computer means and the set of pre-specified dimensional parameters, and the axes positioning system means being controlled automatically to effect movement relative to one axis at a time so that the material removing element repeatedly moves relatively about the perimeter of the workpiece a number of times determined by the data from said input means, each arcuate movement being effected by rotation of the rotary table while the slide and slide means are stationary, such that said workpiece is automatically ground to the selected shape and size.

2. A control system according to claim 1 wherein said outputs are such that all intermediate curvilinear material removal operations are carried out with said slide means being positioned so that said axis of rotation of said rotary table coincides with the axis of rotation of the desired final curve to be formed on said subject workpiece.

3. The control system according to claim 1 wherein said input means is operable to generate linear and radial dimensions and feedrates for a selected cross-sectional configuration as specified by an operator, and said control system being responsive to said dimensions and feedrates to automatically produce a tool of such selected cross-sectional configuration.

4. The machine tool system according to claim 1 wherein said computer means comprises microprocessor computer means for addressing and controlling said input means and said logic means.

5. The machine tool system according to claim 4 wherein said control means comprises read-write memory means.

6. The machine tool system according to claim 5 wherein said computer means has a single input/output data bus and signals from said input means are multiplexed onto said single input/output data bus under control of said computer means.

7. In a multi-axis punch grinding system suitable for the high speed grinding of punches having a material removing element symmetrical about its axis of rotation, means to rotate said material removing element at a controlled rate, Z axis drive means having a Z axis perpendicular to and intersecting the axis of rotation of said material removing element to effect movement along said Z axis, rotary table means having an axis of rotation parallel to that of said material removing element with drive means to effect rotary movement; said rotary table means being mounted for displacement with respect to said material removing element relative to said Z axis; slide means mounted on said rotary table with drive means to effect movement of said slide means; said slide means supporting the workpiece, the improvement comprising:

a control system for said multi-axis punch grinding system comprising controlling means coupled with said drive means for controlling the translational and rotational motions of said slide and table means relative to the respective axes such that the material removing element is automatically relatively moved repeatedly about rthe perimeter of the workpiece with movement relative to one axis at a time and with all arcuate movement being effected by rotary movement of said rotary table means, and said controlling means being operable to selectively digitally store a selected one of a plurality of closed punch outlines for defining a desired final shape for the workpiece and a selected set of pre-specified dimensions for defining a selected final size for the workpiece, so that said workpiece is ground to the shape and size of a selected one of a plurality of digitally stored, closed, punch outlines based on a set of pre-specified dimensions.

8. The control system according to claim 7 wherein said control means includes input means, axes positioning system means, and computer means constructed and arranged to receive data from said input means, and having means for controlling said computer means to produce outputs which control said axes positioning system means.

9. The control system according to claim 8 wherein said computer means comprises digital computer means for addressing said input means and said axes positioning system means.

10. In a multi-axis grinding system for the grinding of punches by movement relative to one axis at a time to traverse about a desired punch cross section in each of a plurality of grinding cycles, having a material removing element symmetrical about its axis of rotation, means to rotate said material removing element at a controlled rate to effect a grinding operation, work feed means with drive means to effect an increment of feed of a workpiece toward the material removing element after each of a plurality of grinding cycles, rotary table means having an axis of rotation parallel to that of said material removing element with drive means to effect rotary movement; said rotary table being mounted on said work feed means; slide means mounted on said rotary table means with drive means to effect movement of said slide means; said slide means supporting the workpiece, the improvement comprising: a control system for said multi-axis punch grinding system comprising input means including manual selector means manually operable to produce selectively a first selection signal for selecting an obround configuration and a second selection signal to select a rectangular configuration, and further including manually operable initial size, feed increment and final size indicator means for respectively selecting initial workpiece size, a feed increment for the work feed means, and a desired final size of the workpiece, axes positioning system means, logic means to control said axes positioning system means, and computer means constructed and arranged to receive and store data from said input means including said first and second selection signals, and having control means responsive to said initial size, said feed increment and said final size indicator means for automatically controlling said computer means to produce outputs for said logic means which control said axes positioning system means to produce movement relative to one axis at a time for causing said material removing element to traverse the workpiece in conformity with the manually selected selection signal, and offset successively from the initial size indicated by the manually operable initial size indicator means toward the final size determined by the manually operable final size indicator means in successive increments in accordance with the manually selected feed increment; said control system producing a punch configuration from said workpiece based on the manually selected selection signal and producing punch cross-sectional dimensions according to the manually selected initial size, feed increment and final size, by automatically sequentially activating said drive means until a workpiece of the manually selected initial size is ground to the manually selected final size.

11. In a multi-axis punch grinding system for the high speed grinding of punches, having a material removing element symmetrical about its axis of rotation, means to rotate said material removing element at a controlled rate, work feed drive means having an axis perpendicular to and intersecting the axis of rotation of said material removal element to effect work feed movement, rotary table means with drive means to effect rotary movement; slide means mounted on said rotary table means with drive means to effect movement of said slide means; said slide means supporting the workpiece, the improvement comprising:

manual input means for selective manual operation to produce an initial size indication for indicating the initial size of a workpiece, manually selectively operable to provide a feed increment indication for determining the increment of work feed movement per traverse of the workpiece perimeter, and manually selectively operable to provide a final size indication for determining the total number of traverses of the perimeter of the workpiece, and control system means for said multi-axis punch grinding system coupled with said manual input means for storing said initial size, feed increment and final size indications and comprising controlling means, coupled with said drive means for automatically sequentially controlling the translational and rotational motions of said slide means and table means relative to the respective axes such that the material removing element moves relatively in successive paths all in the same direction about the workpiece with an initial path being determined in accordance with the manually selected initial size indicator and with the offset between successive paths being determined in accordance with the manually selected feed increment indicator, and such that said workpiece is ground to a shape and size in accordance with the manually selected final size indicator as stored by said control system means.

12. In a multi-axis punch grinding system for the high speed grinding of punches, having a material removing element symmetrical about its axis of rotation, means to rotate said material removing element at a controlled rate, work feed means having an axis of relative movement perpendicular to and intersecting the axis of rotation of said material removal element with drive means to effect work feed movement, rotary table means having an axis of rotation parallel to that of said material removing element with drive means to effect rotary movement; plural axis slide means mounted on said rotary table means with drive means to effect movement of said slide means relative to respective axes thereof; said slide means supporting the workpiece, the improvement comprising:

control system means for said multi-axis punch grinding system comprising input means comprising a manual input control panel with manually controlled data inputs manually operable to select one of a plurality of closed cross-sectional configurations, a set of dimensional parameters for indicating final size and shape and to select a dress increment indicator for indicating the amount to be removed from the material removing element in each dressing cycle therefor, axes positioning system means, logic means to control said axes positioning system means, and computer means constructed and arranged to receive and store data from said input means indicating digitally the selected one of the plurality of closed cross-sectional punch configurations, said dimensional parameters, and the dress increment indicator, and having control means for controlling said computer means to produce outputs for said logic means which control said axes positioning system means for effecting grinding by means of a plurality of traverses about the perimeter of the workpiece with alternating dressing cycles in accordance with the manually selected dress increment indicator; said computer means producing said outputs based on the selected one of the plurality of closed cross-sectional punch configurations as indicated digitally and the set of final dimensional parameters stored thereby such that the workpiece is automatically ground to the selected shape and to the final size in accordance with the stored dimensional parameters.

13. In a multi-axis punch grinding system for the high speed grinding of punches, having a material removing element symmetrical about its axis of rotation, means to rotate said material removing element at a controlled rate, work feed means having a work feed axis perpendicular to and intersecting the axis of rotation of said material removal element and having drive means to effect work feed movement, rotary table means having an axis of rotation parallel to that of said material removing element with drive means to effect rotary movement; plural axis slide means mounted on said rotary table with drive means to effect movement of said slide means relative to the respective axes thereof; said slide means supporting the workpiece, the improvement comprising:

a manual input control panel with manually controlled data inputs manually operable to select one of a plurality of digitally stored, closed, punch outlines, manually operable to select a set of final dimensions with respect to the selected punch outline, and manually operable to select a dress increment indicator for indicating the amount to be removed from the material removal element in each dressing cycle, and control system means for said multi-axis punch grinding system coupled with said manual input control for digitally storing signals in accordance with the selected one of the plurality of closed punch outlines and in accordance with the set of final dimensions and in accordance with the dress increment indicator, and comprising controlling means coupled with said drive means for controlling the translational and rotational motions of said slide and table means relative to the respective axes, and for controlling dressing of the material removing element in accordance with the manually selected dress increment indicator, such that said workpiece is ground to a shape in accordance with the manually selected punch outline and is ground to a final size based on the manually selected set of final dimensions.

14. Apparatus for forming closed cross sections on an object having circular surfaces with multiple, separate centers of curvature joined by non-circular surfaces comprising:

computer means;

a tool operatively connected to said computer means and having a rotary material removing means.

an orthogonal coordinate system carried upon a rotary axis which is parallel to an axis of rotation of said rotary material removal means and means for movably mounting the object for linear motion relative to said orthogonal coordinate system;

said computer means being operative to sequence the object through a plurality of predetermined non-circular and circular displacements to form a predetermined closed cross section such that each circular displacement is achieved by locating the object by means of said means for linear motion such that the center of curvature desired for the selected circular displacement coincides with said rotary axis and the circular displacement being achieved by rotating said axis.

15. The method of automatically forming punches of a predetermined, closed cross-sectional configuration from tool blanks utilizing a computer controlled, grinding system having a rotary grinding tool, an orthogonal coordinate system mounted on a rotary axis which is parallel to the axis of rotation of the grinding tool wherein the operator selects one of a plurality of pre-stored punch cross section defining grinding sequences defining respective ones of a set of punch cross section configurations including at least one of rectangular with rounded corners and specifies a set of linear and radial parameters for such desired cross-sectional configuration within the limits of the multi axis grinder comprising the steps of:

calculating the necessary displacements to position the tool blank with respect to the rotary grinding tool at an initial grinding position;

moving the tool blank to the initial grinding position; calculating a first and second linear displacement of the tool blank;

moving the tool blank linearly in a first direction parallel to a first axis of the orthogonal coordinate system an amount corresponding to the first calculated displacement;

sensing a predetermined angle; rotating the orthogonal coordinate system and the tool blank an amount corresponding to the sensed angle;

moving the tool blank linearly in a first direction parallel to a second axis of the orthogonal coordinate system an amount corresponding to the second calculated displacement;

rotating the orthogonal coordinate system and the tool blank an amount corresponding to the sensed angle;

moving the tool blank linearly opposite to the first direction parallel to the first axis of the orthogonal coordinate system a distance corresponding to the first calculated displacement;

rotating the orthogonal coordinate system and the tool blank an amount corresponding to the sensed angle;

moving the tool blank linearly in a direction opposite to the first direction parallel to the second axis of the orthogonal coordinate system an amount corresponding to the second calculated displacement;

rotating the orghogonal coordinate system and the tool blank an amount corresponding to the sensed angle;

comparing the desired physical dimensions of the tool blank with the actual physical dimensions to determine whether or not the tool blank has achieved the desired physical and repeating the alternate lineal and rotary movements of the tool blank until the comparison step indicates that the desired physical size of the tool blank has been reached.

16. A method of forming on an object a closed external cross section having circular surfaces with at least two different centers of curvature, joined by non-circular surfaces, utilizing a computer controlled tool with a rotary material removing means, and an orthogonal coordinate system carried upon a rotary axis which is parallel to the axis of rotation of the tool removal means comprising the steps of:

moving the object past the material removing means along a predetermined path corresponding to a selected non-circular surface;

positioning the object so that a selected one of the desired centers of curvature corresponding to a selected desired circular section coincides with the rotary axis;

rotating the object past the tool removal means through a predetermined angular displacement;

moving, positioning, and rotating the object through displacements corresponding to successive predefined non-circular and circular surfaces until a complete closed cross section having predetermined dimensions is formed.

* * * * *

UNITED STATES PATENT AND TRADEMARK OFFICE
CERTIFICATE OF CORRECTION

PATENT NO. : 4,136,390

DATED : January 23, 1979

INVENTOR(S) : John H. Farrell, Eugene George Lawrie and Zeev Sagi

It is certified that error appears in the above-identified patent and that said Letters Patent are hereby corrected as shown below:

Col. 3, line 5, "dresser will" should be changed to
-- dresser 36 will --
Col. 5, line 38, delete "7"
Col. 6, line 54, "18,110" should be changed to -- 18.110 --
line 60, "apertures" should be -- aperture --
Col. 7, lines 51-53, delete all "°"
line 61, "FIg." should be changed to -- FIG. --
Col.10, line 16, omitted -- Control Switch Input Port (CTRSW) --
line 31, word should be "EMRGNCY"
Col. 12, line 49, "procexs" should be -- process --
Col.14, line 42, "433" should be -- 443 --
line 49, change "annd" to -- and --
Col. 15, line 14, "the" should be changed to -- The --
line 33, "secttional" should be -- sectional --
line 67, put bar over INPOS
Col.16, line 22, change "resistores" to -- resistors --
last line, change "ang" to -- and --
Col.18, lines 26 & 27, "To carry" etc. should be started on another line
Col.100, line 28, "rthe perimeter" should be -- the perimeter --
Col.104, line 31, "orghogonal" should be changed to -- orthogonal --

Signed and Sealed this

Third Day of July 1979

[SEAL]

Attest:

LUTRELLE F. PARKER

*Attesting Officer*   *Acting Commissioner of Patents and Trademarks*